(12) United States Patent
Kato

(10) Patent No.: US 10,121,420 B2
(45) Date of Patent: Nov. 6, 2018

(54) DISPLAY DEVICE

(71) Applicant: Japan Display Inc., Tokyo (JP)

(72) Inventor: Hirofumi Kato, Tokyo (JP)

(73) Assignee: Japan Display Inc., Tokyo (JP)

( * ) Notice: Subject to any disclaimer, the term of this patent is extended or adjusted under 35 U.S.C. 154(b) by 60 days.

(21) Appl. No.: 15/421,554

(22) Filed: Feb. 1, 2017

(65) Prior Publication Data

US 2017/0256210 A1    Sep. 7, 2017

(30) Foreign Application Priority Data

Mar. 1, 2016 (JP) ................................ 2016-038609

(51) Int. Cl.
| | |
|---|---|
| *G09G 3/34* | (2006.01) |
| *G02F 1/1334* | (2006.01) |
| *G02F 1/1343* | (2006.01) |
| *G02F 1/13* | (2006.01) |
| *G09G 3/36* | (2006.01) |
| *G02F 1/137* | (2006.01) |

(52) U.S. Cl.
CPC ........... *G09G 3/3426* (2013.01); *G02F 1/137* (2013.01); *G02F 1/1326* (2013.01); *G02F 1/1334* (2013.01); *G02F 1/134309* (2013.01); *G09G 3/342* (2013.01); *G09G 3/3648* (2013.01); *G02F 2001/13756* (2013.01); *G09G 2310/024* (2013.01); *G09G 2320/0646* (2013.01); *G09G 2360/121* (2013.01); *G09G 2360/16* (2013.01)

(58) Field of Classification Search
CPC .... G09G 3/342; G09G 3/3426; G09G 3/3648; G09G 2310/024; G09G 2360/024; G09G 2360/16; G09G 2360/121; G09G 2320/0646; G02F 1/1326; G02F 1/137; G02F 1/134309; G02F 1/1334

See application file for complete search history.

(56) References Cited

U.S. PATENT DOCUMENTS 6,023,277 A  *  2/2000  Osaka ................ G02B 27/2214
                                                 345/419
6,608,657 B2 *  8/2003  Hiyama ............... G02B 6/0033
                                                 349/62

(Continued)

FOREIGN PATENT DOCUMENTS

JP        2014-102295 A    6/2014

*Primary Examiner* — Ariel Balaoing
(74) *Attorney, Agent, or Firm* — K&L Gates LLP

(57) ABSTRACT

In a display device, an image display panel updates an image in a frame cycle including an image scanning period and a vertical blanking period, a light modulation layer is disposed at a back of the panel and switched to a scattering or transmission state depending on an electric field applied, a light source emits light which enters the light modulation layer from its side and travels therethrough, electrodes are formed according to divided areas of the light modulation layer arranged in a direction of the light and apply the electric field to the light modulation layer, and a controller drives the electrodes in synchronization with image scanning to switch the divided areas to the scattering state in order during the image scanning period, and drives the electrodes according to distances from the side to control the scattering state on the individual divided areas during the vertical blanking period.

5 Claims, 44 Drawing Sheets

(56) References Cited

U.S. PATENT DOCUMENTS

| | | | | |
|---|---|---|---|---|
| 7,465,104 B2* | 12/2008 | Tokui | ............... | G02B 6/0055 385/62 |
| 2010/0066923 A1* | 3/2010 | Imai | ............... | G09G 3/3648 348/792 |
| 2010/0165450 A1* | 7/2010 | Okuyama | ............... | B29C 35/0894 359/315 |
| 2010/0315324 A1* | 12/2010 | Nam | ............... | G02F 1/133615 345/102 |
| 2012/0069063 A1* | 3/2012 | Sato | ............... | H04N 13/31 345/690 |
| 2013/0107164 A1* | 5/2013 | Verslegers | ............... | G02B 6/0065 349/61 |
| 2014/0139461 A1* | 5/2014 | Furukawa | ............... | G09G 3/342 345/173 |
| 2015/0187268 A1* | 7/2015 | Tani | ............... | G09G 3/3233 345/77 |
| 2016/0231497 A1* | 8/2016 | Kato | ............... | G02B 6/0035 |

* cited by examiner

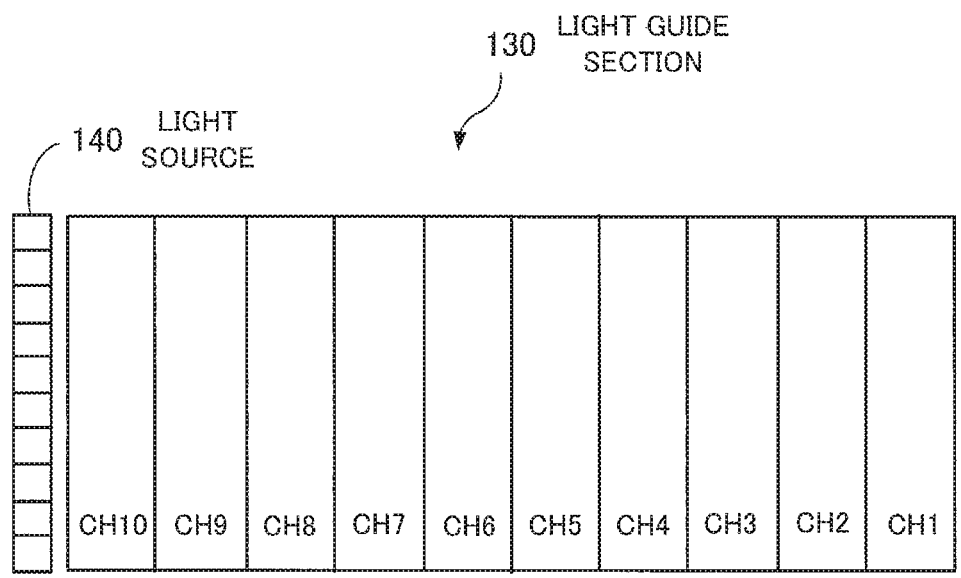
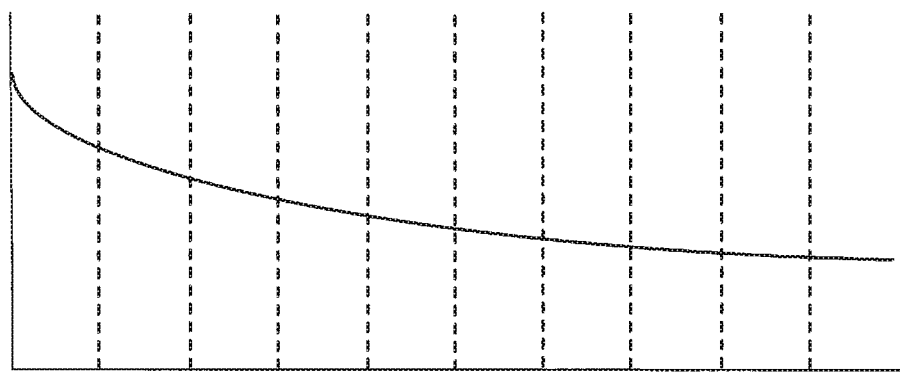
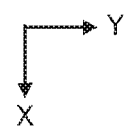
FIG. 7

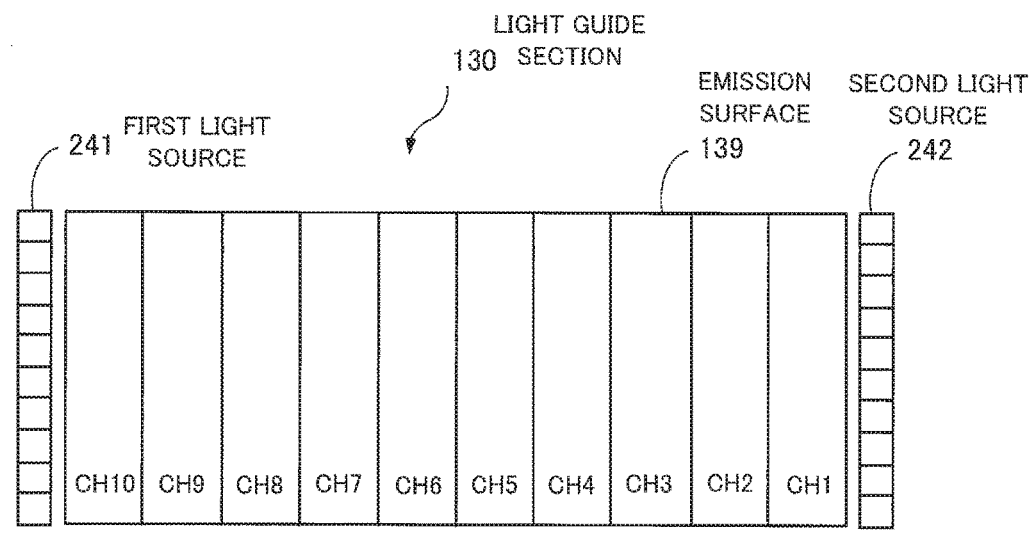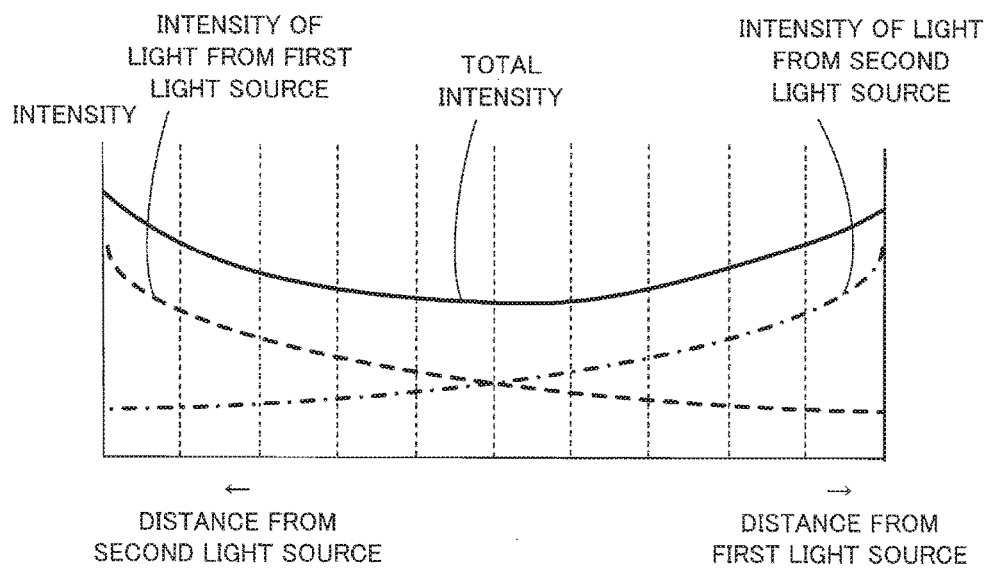
FIG. 18
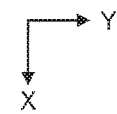

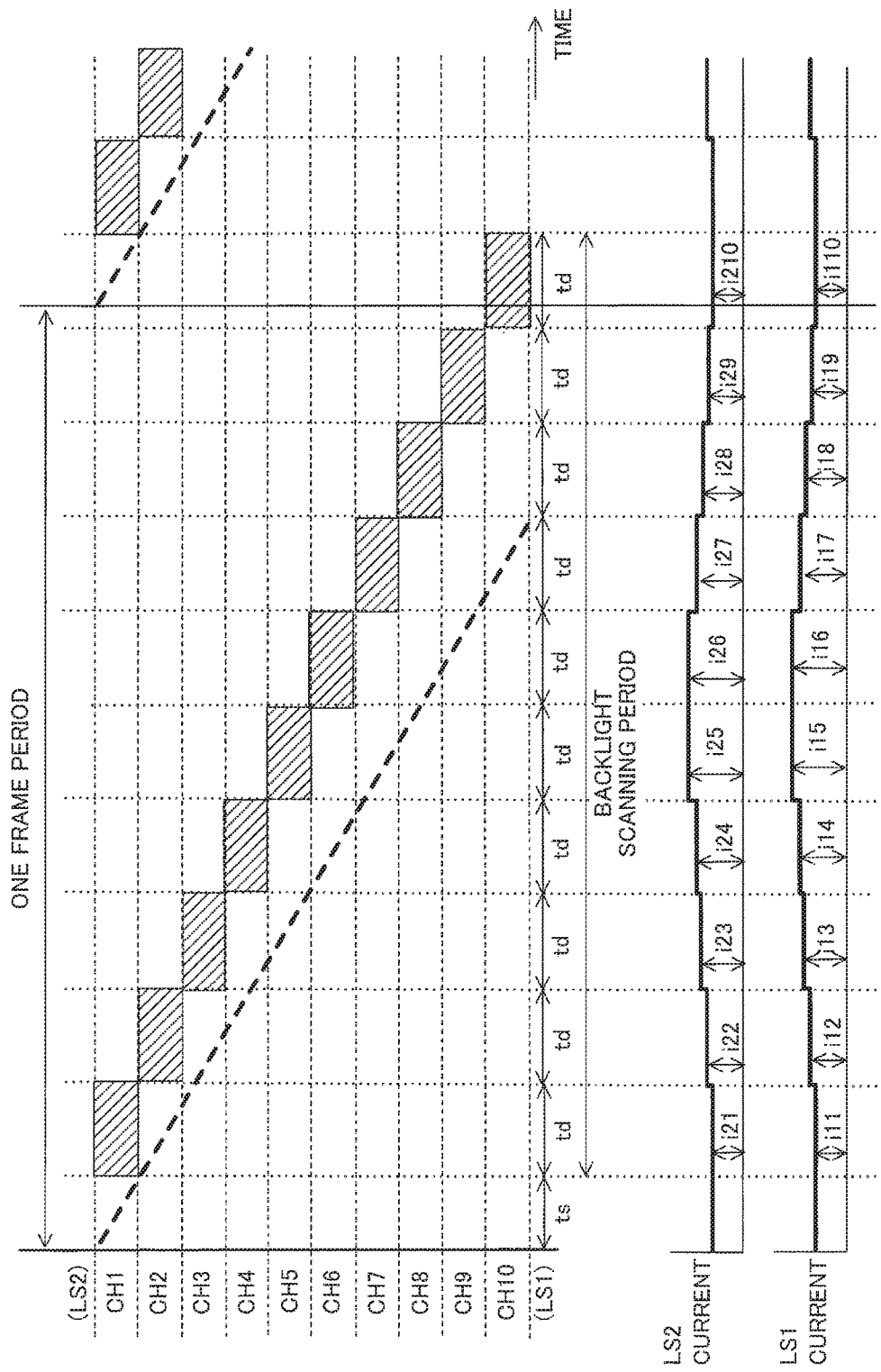

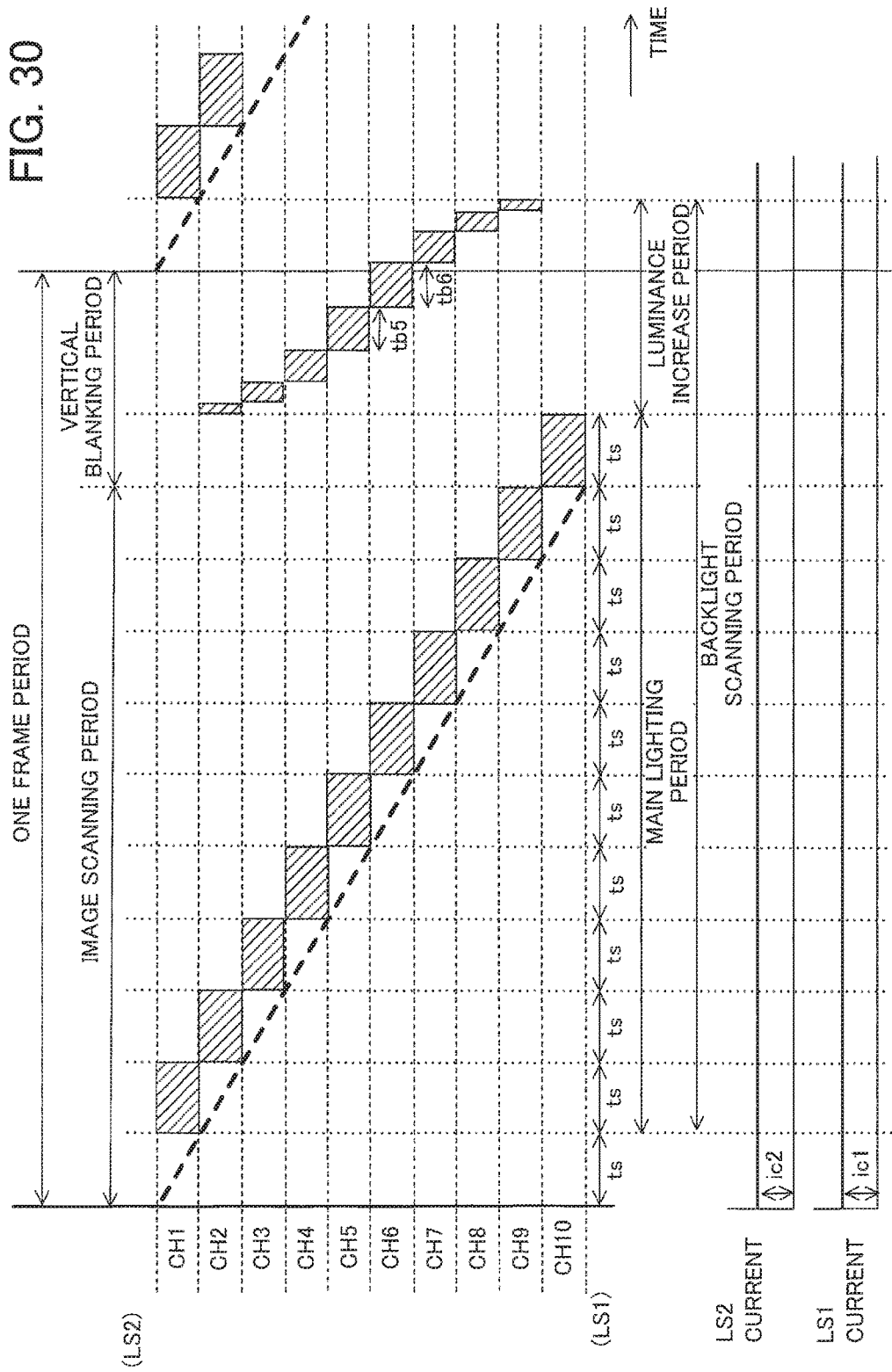

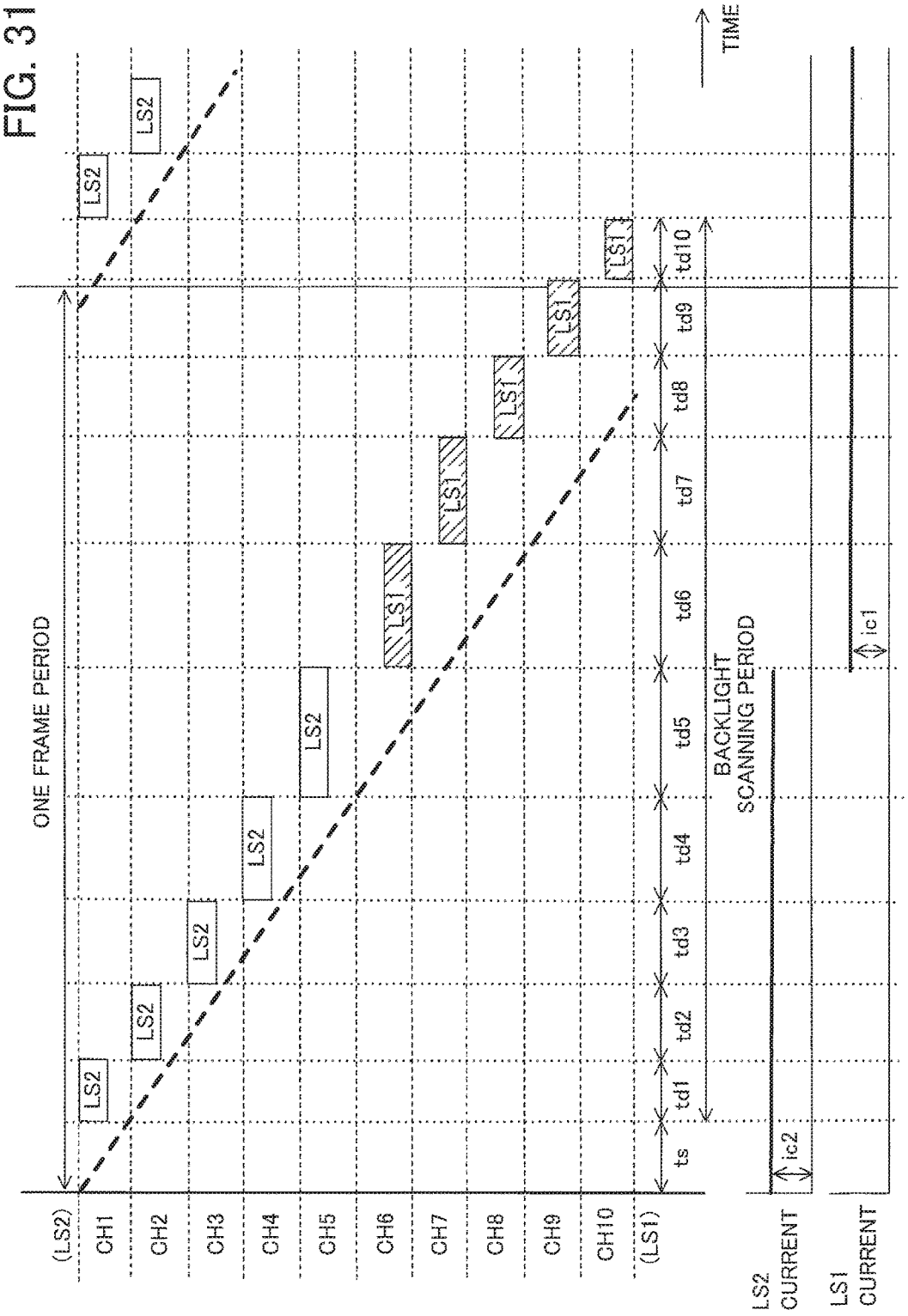

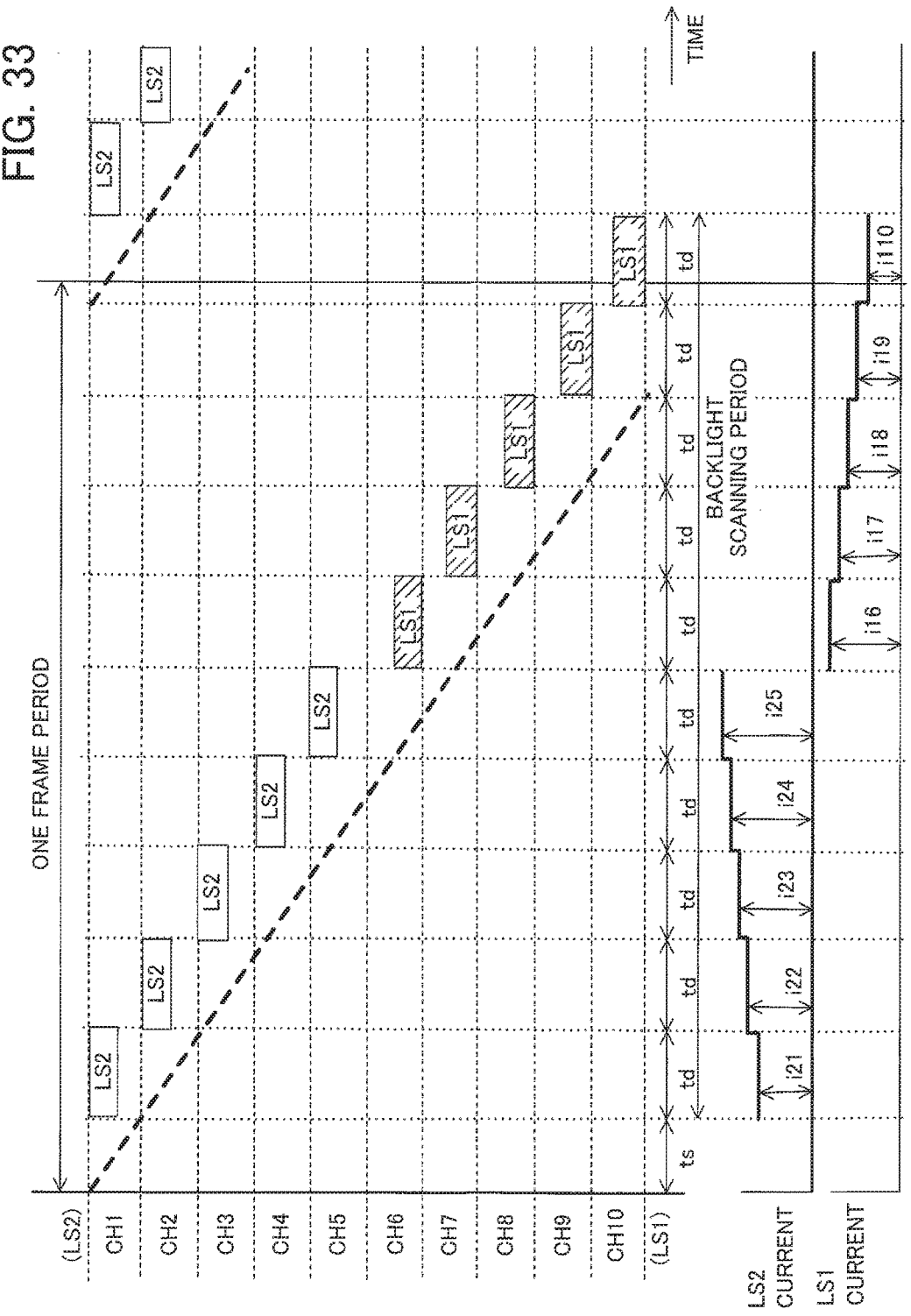

DISPLAY DEVICE

CROSS-REFERENCE TO RELATED APPLICATIONS

This application is based upon and claims the benefit of priority of the prior Japanese Patent Application No. 2016-038609, filed on Mar. 1, 2016, the entire contents of which are incorporated herein by reference.

FIELD

The embodiments discussed herein are related to a display device.

BACKGROUND

With a display device including a backlight, the technique of dividing a display surface into a plurality of areas and on-off controlling light from the backlight according to areas is known. With a side light source type backlight a scattering material is mixed into a transparent resin material to form a light guide member. Light from a light source disposed at a side is scattered by the light guide member. With a backlight having this structure, the backlight is divided into areas parallel with a direction in which light from each light source travels, and light sources disposed according to the areas are on-off controlled. Because light from a light source corresponding to another area is not utilized, light emission efficiency decreases.

In recent years backlights including polymer dispersed liquid crystal (PDLC) as a light guide body have been known. With the PDLC, switching between a scattering state in which incident light is scattered and a transmission state in which incident light is transmitted is performed by controlling a voltage applied to area electrodes. With a backlight including the PDLC, control is exercised so that the PDLC will be in the scattering state. By doing so, light emitted from a side light source is emitted toward a display surface. For example, area electrodes are formed according to areas formed in a direction intersecting a direction in which light from a light source travels, and switching is performed between the scattering state and the transmission state of the PDLC. By doing so, backlight light is controlled according to the areas. With a display device using PDLC, divided areas are formed in a direction intersecting a direction in which light travels. Therefore, backlight light is controlled according to the divided areas in a state in which a light source is always on.

See, for example, Japanese Laid-open Patent Publication No. 2014-102295.

However, if areas are formed in a display device in a direction intersecting a direction in which light from a light source travels, the distance from the light source differs among different areas. Therefore, as the distance between the light source and an area becomes longer, the intensity of light which enters the area decreases. As a result, if an electrode is driven uniformly in each area, the luminance of an area more distant from the light source becomes lower. However, if luminance control is exercised with an area whose luminance is lowest as reference, the luminance of an entire backlight decreases.

SUMMARY

According to an aspect, there is provided a display device including an image display panel which updates an image in a frame cycle including an image scanning period and a vertical blanking period; a light modulation layer disposed at a back of the image display panel and switched to a scattering state in which incident light is scattered or a transmission state in which the incident light is transmitted according to an electric field applied; a light source which emits light that enters the light modulation layer from a side thereof and travels in the light modulation layer; electrodes which are formed according to divided areas of the light modulation layer arranged in a direction in which the light from the light source travels, and which apply the electric field to the light modulation layer; and a controller which drives the electrodes in synchronization with image scanning and switches in order the divided areas to be put into the scattering state, during a first period corresponding to the image scanning period, and which drives the electrodes according to distances from the side to control the scattering state according to the divided areas, during a second period corresponding to the vertical blanking period.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 illustrates the luminance distribution of light from a light source of the display device according to the second embodiment;

FIG. 18 illustrates the luminance distribution of light from light sources of the display device according to the fourth embodiment;

FIG. 25 illustrates a third example of a drive pattern of the display device according to the fourth embodiment;

FIG. 30 illustrates an example of a drive pattern of a display device according to a seventh embodiment;

FIG. 31 illustrates an example of a drive pattern of a display device according to an eighth embodiment;

FIG. 33 illustrates an example of a drive pattern of a display device according to a ninth embodiment;

DESCRIPTION OF EMBODIMENTS

Figure 1:
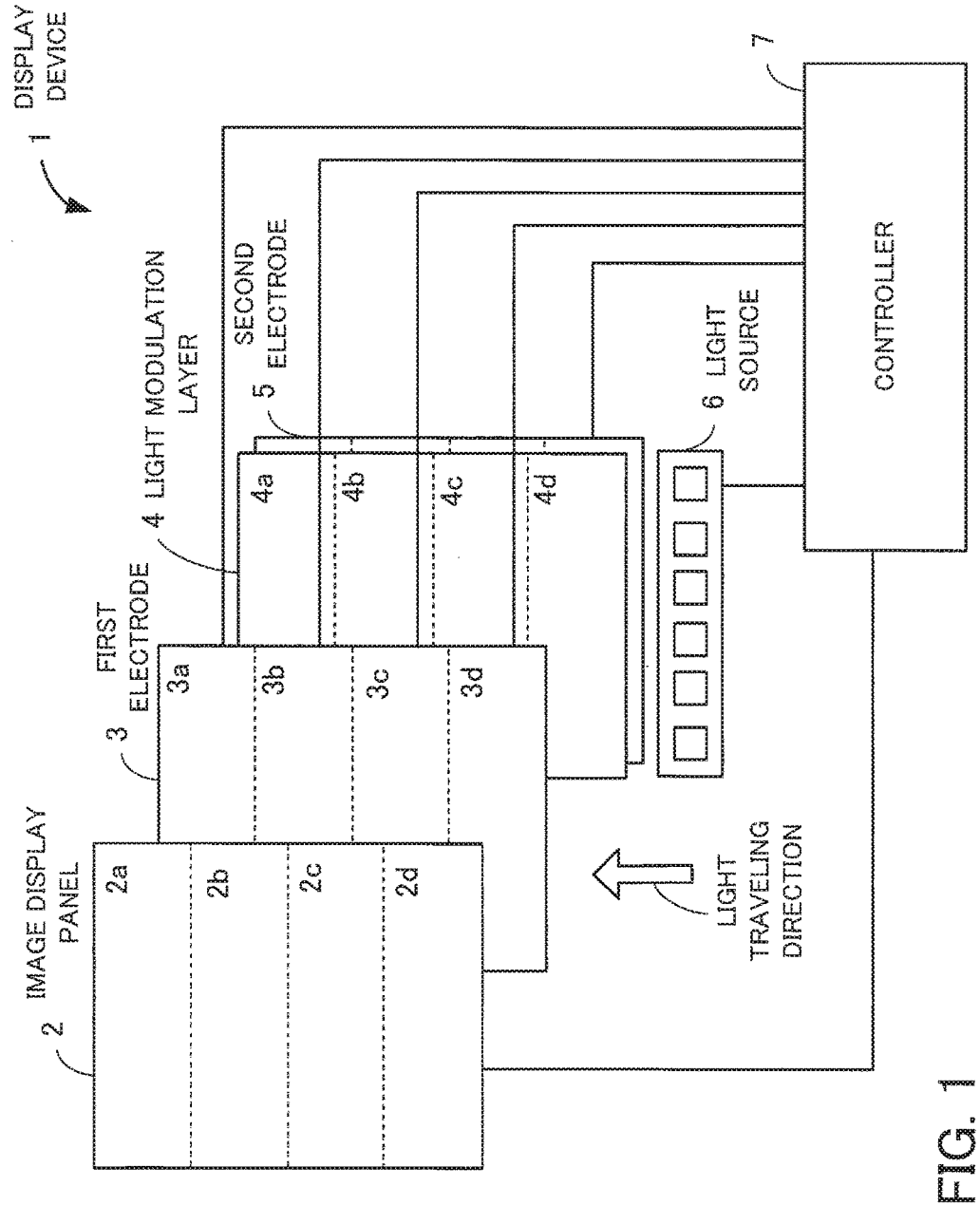
FIG. 1 illustrates an example of the structure of a display device according to a first embodiment.

Embodiments will now be described with reference to the accompanying drawings.

Disclosed embodiments are simple examples. It is a matter of course that a proper change which suits the spirit of the invention and which will readily occur to those skilled in the art falls within the scope of the present invention. Furthermore, in order to make description clearer, the width, thickness, shape, or the like of each component may schematically be illustrated in the drawings compared with the real state. However, it is a simple example and the interpretation of the present invention is not restricted.

In addition, in the present invention and the drawings the same components that have already been described in previous drawings are marked with the same numerals and detailed descriptions of them may be omitted according to circumstances.

First Embodiment

A display device according to a first embodiment will be described by the use of FIG. 1. FIG. 1 illustrates an example of the structure of a display device according to a first embodiment.

A display device 1 according to a first embodiment includes an image display panel 2, a first electrode 3, a light modulation layer 4, a second electrode 5, a light source 6, and a controller 7. In FIG. 1, these components are moved with respect to one another. In reality, however, the image display panel 2, the first electrode 3, the light modulation layer 4, and the second electrode 5 are stacked in this order from a user. The first electrode 3, the light modulation layer 4, the second electrode 5, and the light source 6 function as a backlight of the image display panel 2. Furthermore, the display device 1 controls backlight light according to divided areas 4a, 4b, 4c, and 4d of the light modulation layer 4 arranged in a direction in which light from the light source 6 travels. Light emitted from the light source 6 enters the light modulation layer 4, is scattered in the light modulation layer 4, and is emitted to the image display panel 2 side as the backlight light.

The image display panel 2 receives an image signal and updates an image in a frame cycle. One frame period corresponding to the frame cycle includes an image scanning period during which an image signal is written to the image display panel 2 and a vertical blanking period during which an image signal is not written. Image scanning is performed in order on display areas 2a, 2b, 2c, and 2d right over the areas 4a, 4b, 4c, and 4d, respectively, of the backlight during the image scanning period. The controller 7 drives the image display panel 2 and makes the image display panel 2 perform image scanning in the direction from the display area 2a to the display area 2d or in the direction from the display area 2d to the display area 2a.

The first electrode 3 and the second electrode 5 are opposite each other with the light modulation layer 4 therebetween and apply an electric field to the light modulation layer 4. The first electrode 3 and the second electrode 5 are transparent electrodes and are made of a transparent conductive film such as indium tin oxide (ITO). The first electrode 3 includes partial electrodes 3a, 3b, 3c, and 3d formed in the areas 4a, 4b, 4c, and 4d respectively. The partial electrodes 3a, 3b, 3c, and 3d are coupled to the controller 7. Determined drive voltages are supplied individually to the partial electrodes 3a, 3b, 3c, and 3d. The second electrode 5 is a common electrode and is formed corresponding to the areas 4a, 4b, 4c, and 4d or integrally. A common potential is supplied to the second electrode 5. An electric field is generated in the area 4a, 4b, 4c, or 4d due to the difference between the drive voltage supplied to the partial electrode 3a, 3b, 3c, or 3d and the common potential supplied to the second electrode 5. In FIG. 1, the first electrode 3 is disposed between the light modulation layer 4 and the image display panel 2. However, the disposition of the first electrode 3 and the second electrode 5 may be reversed. Furthermore, as long as an electric field is applied to the light modulation layer 4, both of the first electrode 3 and the second electrode 5 may be on one side of the light modulation layer 4.

An electric field is applied to the area 4a, 4b, 4c, or 4d of the light modulation layer 4 due to the difference in voltage between the corresponding partial electrode 3a, 3b, 3c, or 3d and the second electrode 5. The light modulation layer 4 switches to a scattering state or a transmission state depending on an applied electric field. In the scattering state, the light modulation layer 4 scatters light emitted from the light source 6 and emits part of a scattered light toward the image display panel 2. Furthermore, in the transmission state, the light modulation layer 4 transmits light emitted from the light source 6. A transmitted light travels in a traveling direction to the next area. Viewed from the image display panel 2 side, an area in the scattering state is luminous and an area in the transmission state is not luminous. Time during which the light modulation layer 4 is in the scattering state is referred to as scattering time. Light modulation layers 4 are of two types: a first type and a second type. A light modulation layer 4 of the first type goes into the scattering state at the time of an electric field being applied and goes into the transmission state at the time of an electric field not being applied. A light modulation layer 4 of the second type goes into the transmission state at the time of an electric field being applied and goes into the scattering state at the time of an electric field not being applied. The light modulation layer 4 of the first type will now be described. However, description of the light modulation layer 4 of the first type is also applied to a light modulation layer 4 of the second type.

The light source 6 is disposed near a side of the light modulation layer 4 and emits light. This light enters the light modulation layer 4 from the side and travels in the light modulation layer 4. The light enters the light modulation layer 4 and travels toward a side opposite the side from which the light enters the light modulation layer 4. Hereinafter the side from which light from the light source 6 enters the light modulation layer 4 will be referred to as an incident surface. As the distance from the incident surface increases, light which travels in this way in the light modulation layer 4 is attenuated and its intensity is reduced. In the example of FIG. 1, the intensity of light which enters each area of the light modulation layer 4 is reduced as area 4d>area 4c>area 4b>area 4a. The light source 6 is coupled to the controller 7 and the controller 7 exercises on-off-control of light emission and controls the amount of light at light emission time.

The controller 7 controls driving of the partial electrodes 3a, 3b, 3c, and 3d and the luminance of the light source 6 in synchronization with a frame cycle of the image display panel 2. The controller 7 is, for example, a processor such as a central processing unit (CPU). However, the controller 7 may include a special-purpose electronic circuit such as an application specific integrated circuit (ASIC) or a field programmable gate array (FPGA).

The controller 7 exercises control in synchronization with the frame cycle of the image display panel 2 so as to apply determined voltages in order between the partial electrodes 3a, 3b, 3c, and 3d and corresponding portions of the second electrode 5 and switch the areas 4a, 4b, 4c, and 4d to the scattering state in order. Hereinafter this process of switching the areas 4a, 4b, 4c, and 4d to the scattering state in order will be referred to as backlight scanning. The controller 7 performs backlight scanning with a period corresponding to an image scanning period and a period corresponding to a vertical blanking period as a first period and a second period respectively. An image scanning direction and a backlight scanning direction are the same.

During the first period the controller 7 performs backlight scanning on the areas 4a, 4b, 4c, and 4d on which image scanning has ended in synchronization with the image scanning. For example, the controller 7 switches in order the areas 4a, 4b, 4c, and 4d to be put into the scattering state to timing at which the image display panel 2 switches the display areas 2a, 2b, 2c, and 2d on which it performs image scanning. For example, for a period for which image scanning on the display area 2a has ended and image scanning is performed on the display area 2b, the controller 7 switches the area 4a corresponding to the display area 2a to the scattering state. The controller 7 applies a determined voltage to the corresponding partial electrode 3a to apply an electric field to the area 4a. The controller 7 then puts the area 4b into the scattering state for a period for which image scanning is performed on the display area 2c. In this way the controller 7 switches in order an area on which image scanning has ended to the scattering state in synchronization with image scanning on the display area 2a, 2b, 2c, or 2d. An area other than the area put into the scattering state is put into the transmission state. As stated above, during the first period, scattering time of the area 4a, scattering time of the area 4b, scattering time of the area 4c, and scattering time of the area 4d are equal and are equal to image scanning time.

During the second period, the controller 7 controls the scattering state of the area 4a, 4b, 4c, or 4d according to the distance between the area 4a, 4b, 4c, or 4d and the incident surface and performs backlight scanning. For example, the controller 7 makes scattering time of the area 4a distant from the incident surface the longest. As the distance from the incident surface decreases, the controller 7 makes scattering time shorter.

An example of the operation of the display device 1 having the above structure will be described.

During the image scanning period the image display panel 2 performs image scanning on the display areas 2a, 2b, 2c, and 2d in that order. The order of image scanning may be reversed. The controller 7 switches the area 4a, 4b, 4c, or 4d to the scattering state in synchronization with image scanning in the order in which the image scanning has ended. For example, the controller 7 exercises control so that image scanning performed on the display area 2a, 2b, 2c, or 2d will precede backlight scanning performed on the area 4a, 4b, 4c, or 4d by one area. For example, the controller 7 exercises control so as to put the area 4a corresponding to the display area 2a on which image scanning has ended into the scattering state for a period for which image scanning is performed on the display area 2b. At this time the controller 7 exercises control so as to put the other areas 4b, 4c, and 4d into the transmission state. In this way, image scanning synchronizes with backlight scanning with one area shifted.

The amount of a delay between image scanning and backlight scanning is not limited to one area. Backlight scanning may properly be delayed by an integral multiple of an image scanning period of one area.

As has been described, the display device 1 switches in order areas corresponding to display areas on which image scanning has ended to the scattering state in synchronization with image scanning. As a result, before the display device 1 switches an area to the scattering state, the display device 1 finds required luminance for an image in a display area. This makes it possible to perform a local dimming process according to areas without using a frame memory. The local dimming process is a process in which the luminance of the backlight is controlled to a displayed image on the basis of an image signal of a display area. Hereinafter it is assumed that the luminance of the backlight is luminance obtained during a determined period (one frame period, for example). For example, the luminance of the backlight is a value based on time in a frame period for which an area is in the scattering state and the intensity of light which enters the area in the scattering state.

The image display panel 2 does not perform image scanning during the vertical blanking period. During the second period the controller 7 distributes scattering time according to the distance between the area 4a, 4b, 4c, or 4d and the incident surface. As light from the light source 6 travels further in the light modulation layer 4, it attenuates. Scattering time of the area 4a, scattering time of the area 4b, scattering time of the area 4c, and scattering time of the area 4d are equal during the first period. Accordingly, as the distance between an area and the incident surface increases, the intensity of backlight light emitted decreases. The controller 7 determines scattering time of each area on the basis of the amount of a decrease in luminance corresponding to the distance from the incident surface. The controller 7 makes scattering time of the area 4a most distant from the incident surface the longest and makes scattering time shorter in the order of the areas 4b, 4c, and 4d.

In this way, the display device 1 increases the luminance of the backlight in the second period. The display device 1 distributes scattering time in the second period to the areas 4a, 4b, 4c, and 4d on the basis of a decrease in luminance corresponding to the distance from the light source 6. For example, in order to realize the same backlight light as obtained when the area 4d nearest the light source 6 becomes luminous in the first period, the display device 1 distributes scattering time during the second period to the other areas 4a, 4b, and 4c. By doing so, the luminance of the areas 4a, 4b, 4c, and 4d are uniformized regardless of the distance from the light source 6. Furthermore, because the light modulation layer 4 is put into the scattering state for a period for which image scanning is not performed, the luminance of the whole of the areas 4a, 4b, 4c, and 4d is increased.

Second Embodiment

Figure 2:
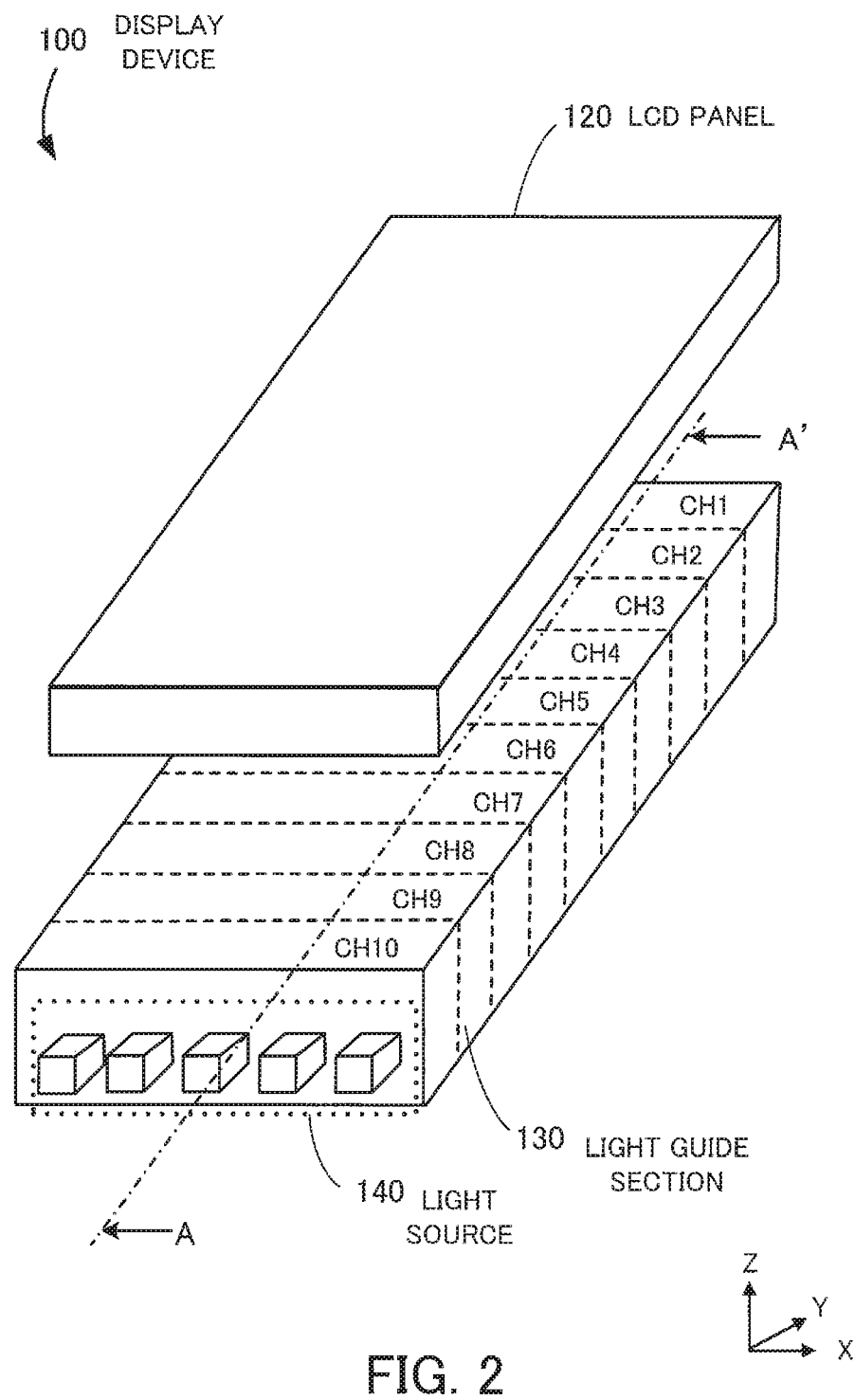
FIG. 2 is a perspective view illustrative of the structure of a display device according to a second embodiment.

Next, a display device according to a second embodiment will be described. FIG. 2 is a perspective view illustrative of the structure of a display device according to a second embodiment.

With a display device 100 according to a second embodiment a light guide section 130 is disposed at a back of a liquid crystal display (LCD) panel 120. Furthermore, a light source 140 is disposed along a side of the light guide section 130 and emits light toward the light guide section 130. The light guide section 130 and the light source 140 make up a backlight. For convenience, it is assumed in the following description that a direction in which the light source 140 is disposed is an X direction, that a direction in which light from the light source 140 travels is a Y direction, and that a direction in which the light guide section 130 and the LCD panel 120 are stacked is a Z direction.

The LCD panel 120 performs display by the use of light emitted from the light guide section 130.

The light guide section 130 has an emission surface opposite a display surface of the LCD panel 120. The light guide section 130 scatters light emitted from the light source 140 and emits light from the emission surface. The luminance of the backlight is determined by the amount of light emitted from the emission surface in a determined period. With the display device 100 the luminance of the backlight is controlled according to areas obtained by dividing the emission surface of the light guide section 130 in the Y direction. Hereinafter the areas are referred to as an area CH1, an area CH2, an area CH3, an area CH4, an area CH5, an area CH6, an area CH7, an area CH8, an area CH9, and an area CH10 in descending order of distance from the light source 140. If there is no need to designate a specific area for description, hereinafter the term "area" will simply be used. Furthermore, the light guide section 130 performs a local dimming process. That is to say, the light guide section 130 analyzes a displayed image on the LCD panel 120 for each area and controls the luminance of the backlight to an image in each area.

Next, each component will be described in order.

Figure 3:
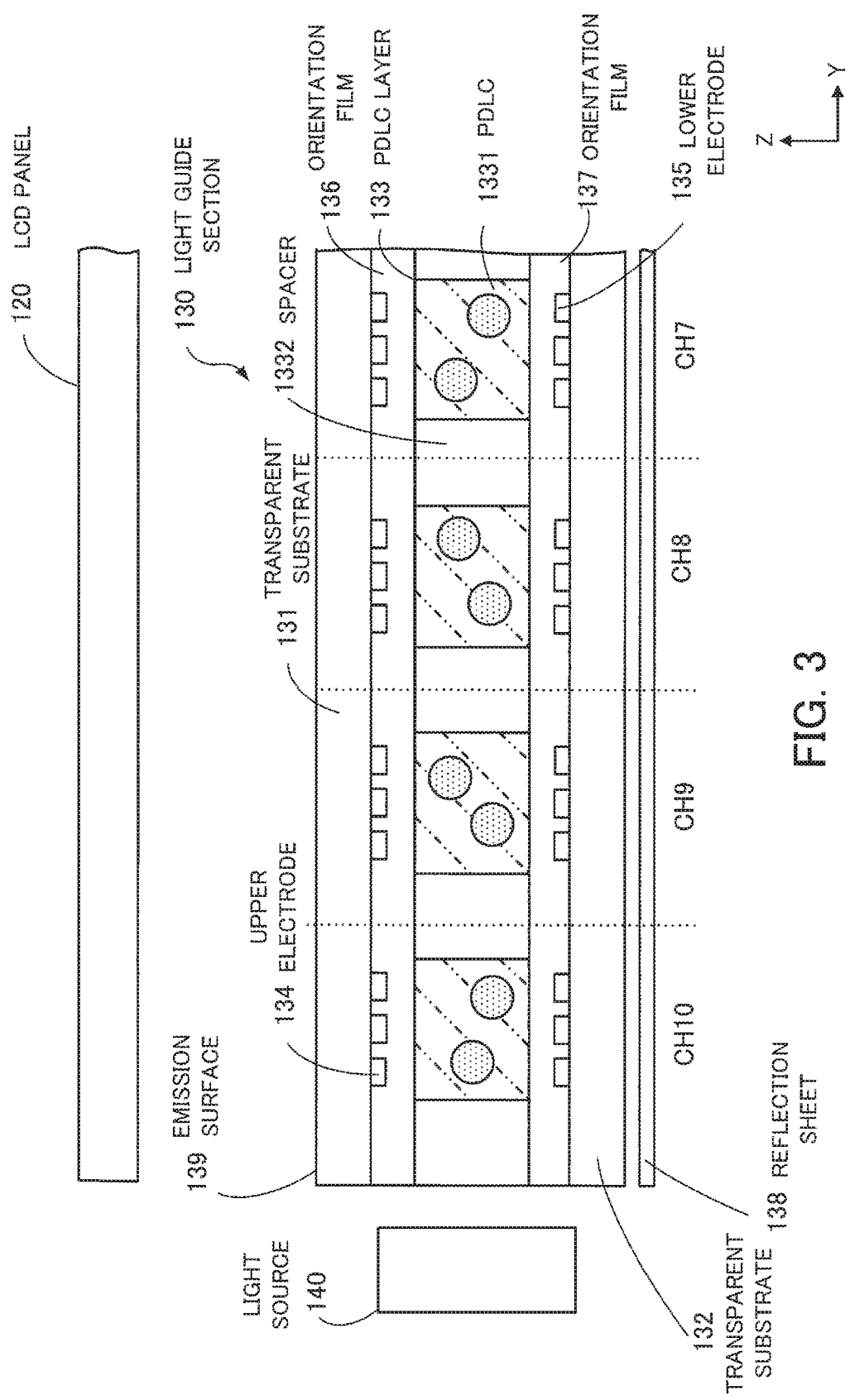
FIG. 3 is a sectional view illustrative of an example of the structure of a light guide section of the display device according to the second embodiment.

FIG. 3 is a sectional view illustrative of an example of the structure of a light guide section of the display device according to the second embodiment. FIG. 3 is a sectional view taken along the line A-A' of FIG. 2. CH10, CH9, CH8, and CH7 indicate areas.

A PDLC layer 133, an upper electrode 134, a lower electrode 135, and orientation films 136 and 137 are stacked between transparent substrates 131 and 132 of the light guide section 130. In the example of FIG. 3, the transparent substrate 132, the lower electrode 135, the orientation film 137, the PDLC layer 133, the orientation film 136, the upper electrode 134, and the transparent substrate 131 are stacked in descending order of distance from the LCD panel 120. Furthermore, a reflection sheet 138 is disposed on a side of the transparent substrate 132 opposite to the LCD panel 120.

The transparent substrates 131 and 132 support the PDLC layer 133, the upper electrode 134, the lower electrode 135, and the orientation films 136 and 137. Each of the transparent substrates 131 and 132 is a substrate, such as a glass plate or a plastic film, which is transparent to a visible light. A surface of the transparent substrate 131 opposite the LCD panel 120 is an emission surface 139 which emits light scattered in the PDLC layer 133.

PDLC 1331 is formed in an area in the PDLC layer 133 partitioned with spacers 1332. The PDLC layer 133 is an example of the light modulation layer 4 in the first embodiment. With the display device 100 the PDLC 1331 switches to the scattering state at the time of applying an electric field and switches to the transmission state at the time of not applying an electric field. The spacer 1332 is disposed between PDLC 1331 and PDLC 1331. Furthermore, the spacer 1332 maintains the distance between the transparent substrates 131 and 132. The spacer 1332 is formed by the use of a transparent material and transmits light which enters in the Y direction. The spacer 1332 is preferably formed by the use of a material whose light transmittance is higher than that of the PDLC 1331 in the transmission state. An increase in the light transmittance of the spacer 1332 reduces attenuation of light traveling in the PDLC layer 133. The spacer 1332 may not be formed. In this case, PDLC 1331 is disposed in an area of the spacer 1332.

The upper electrode 134 and the lower electrode 135 are disposed in areas opposite each other with the PDLC 1331 therebetween. The upper electrode 134 and the lower electrode 135 are transparent conductive films. With the display device 100, the upper electrode 134 is an area electrode and the lower electrode 135 is a common electrode. An electric field is applied to the PDLC 1331 on the basis of the difference in potential between the upper electrode 134 and the lower electrode 135.

Each of the orientation films 136 and 137 orients liquid crystal molecules in the PDLC 1331 in a determined direction at the time of an electric field not being applied. An orientation film is a vertical orientation film, a horizontal orientation film, or the like.

A reflection sheet 138 has the functions of reflection, diffusion, scattering, and the like. The reflection sheet 138 returns to the PDLC layer 133 light which leaks out from the transparent substrate 132 disposed on a side opposite to the emission surface 139. This increases light emitted from the emission surface 139 and increases luminance. Furthermore, because the reflection sheet 138 suppresses light leakage to the outside, light emitted from the light source 140 is efficiently utilized. Foamed polyethylene terephthalate (PET), a silver-evaporated film, a multilayer reflection film, white PET, or the like is used as the reflection sheet 138.

Figure 4A:
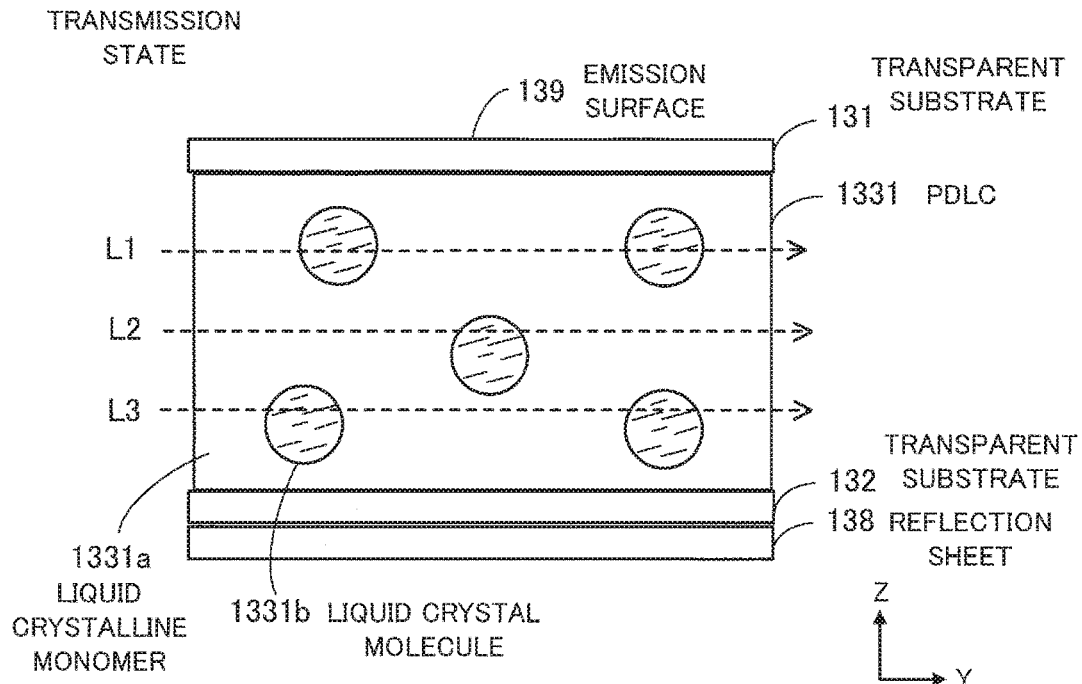
FIGS. 4A and 4B are views for describing the function of PDLC.
Figure 4B:
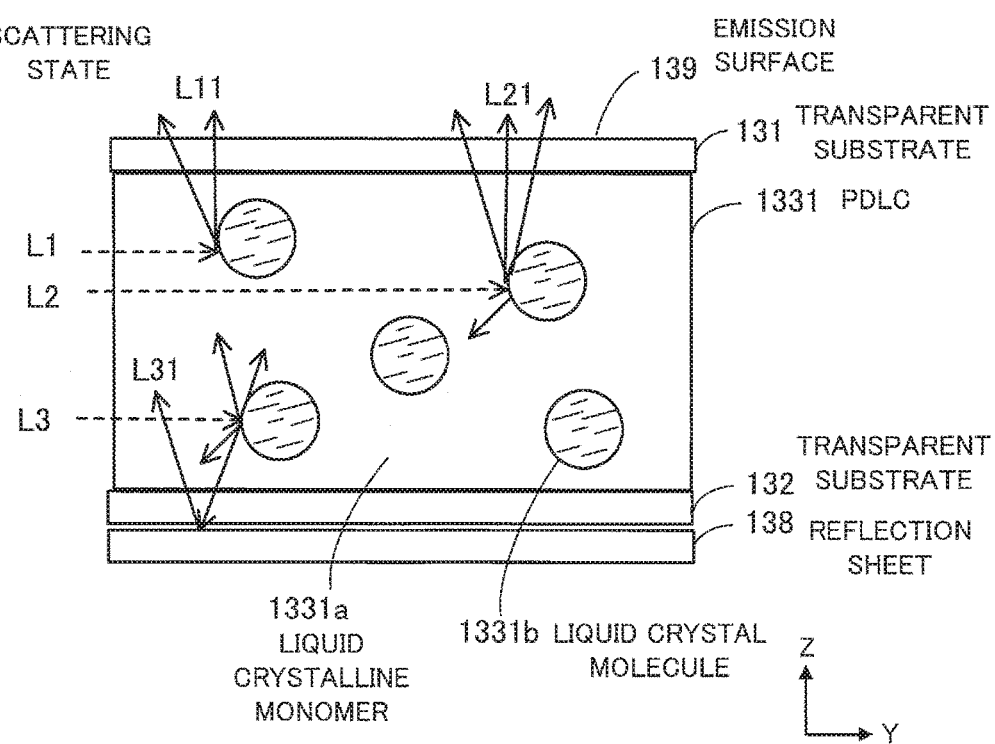

FIGS. 4A and 4B are views for describing the function of PDLC. FIGS. 4A and 4B are enlarged views of the PDLC 1331 portion of FIG. 3. The upper electrode 134, the lower electrode 135, the orientation film 136, or the orientation film 137 is not illustrated in FIGS. 4A and 4B. FIG. 4A illustrates the transmission state and FIG. 4B illustrates the scattering state.

The PDLC 1331 will now be described. The PDLC 1331 contains a liquid crystalline monomer 1331a and liquid crystal molecules 1331b dispersed in the liquid crystalline monomer 1331a. The liquid crystalline monomer 1331a and the liquid crystal molecules 1331b are equal in refractive index anisotropy and differ in responsiveness to an electric field. To be more specific, the liquid crystalline monomer 1331a and the liquid crystal molecules 1331b are equal in ordinary refractive index and extraordinary refractive index. For example, refractive index deviation caused by manufacturing errors or the like is allowable. On the other hand, the responsiveness of the liquid crystal molecules 1331b to an electric field is higher than the responsiveness of the liquid crystalline monomer 1331a to an electric field. For example, the liquid crystalline monomer 1331a has a striped structure or a porous structure which does not respond to an electric field or has a rod-shaped structure whose speed of a response to an electric field is slower than the speed of a response of the liquid crystal molecules 1331b to an electric field. Furthermore, for example, the liquid crystalline monomer 1331a is orientable and is oriented in the orientation direction of the liquid crystal molecules 1331b or the orientation direction of the orientation films 136 and 137. It is desirable that the liquid crystalline monomer 1331a be a monomer polymerized by hardening by light or heat. If a polymer is produced by polymerizing the liquid crystalline monomer 1331a, it is desirable that the liquid crystal molecules 1331b and a liquid crystalline polymer (high molecular material) be hardened in a state in which the liquid crystal molecules 1331b and the liquid crystalline polymer remain equal in ordinary refractive index and extraordinary refractive index. Furthermore, it is desirable that the responsiveness of the liquid crystal molecules 1331b to an electric field be higher than the responsiveness of the liquid crystalline polymer to an electric field. Hereinafter description of a liquid crystalline monomer also applies to a liquid crystalline polymer produced by polymerizing the liquid crystalline monomer.

When there is no difference in potential between the upper electrode 134 and the lower electrode 135 and an electric field is not applied, the above PDLC 1331 is in the transmission state illustrated in FIG. 4A. That is to say, in a state in which an electric field is not applied, the liquid crystalline monomer 1331a and the liquid crystal molecules 1331b which are equal in refractive index anisotropy are oriented in the same direction by the functions of the orientation films 136 and 137. Therefore, there is almost no difference in refractive index in all directions between the liquid crystalline monomer 1331a and the liquid crystal molecules 1331b. Light L1, L2, and L3 which enters the PDLC 1331 from a side in this state is not scattered at the boundaries between the liquid crystalline monomer 1331a and the liquid crystal molecules 1331b. The light L1, L2, and L3 travels in the Y direction and passes through the PDLC 1331. In FIG. 4A, directions in which the light L1, L2, and L3 travels are indicated by dotted arrows.

On the other hand, when an electric field is applied due to the difference in potential between the upper electrode 134 and the lower electrode 135, the PDLC 1331 is in the scattering state illustrated in FIG. 4B. That is to say, in a state in which an electric field is applied, the orientation direction of the liquid crystal molecules 1331b whose responsiveness to the electric field is high changes. However, the orientation direction of the liquid crystalline monomer 1331a does not change. As a result, there is a great difference in refractive index in all directions between the liquid crystalline monomer 1331a and the liquid crystal molecules 1331b. Light L1, L2, and L3 which enters the PDLC 1331 from the side in this state is scattered at the boundaries between the liquid crystalline monomer 1331a and the liquid crystal molecules 1331b. In FIG. 4B, directions in which the light L1, L2, and L3 travels are indicated by dotted arrows and scattered light is indicated by L11, L21, and L31.

As has been described, when an electric field is not applied, the PDLC 1331 is in the transmission state. When an electric field is applied due to the difference in potential between the upper electrode 134 and the lower electrode 135, the PDLC 1331 is in the scattering state. If the PDLC 1331 is PDLC of the above second type, then the relationship between the scattering state and the transmission state and application of an electric field based on the difference in potential between the upper electrode 134 and the lower electrode 135 is inverted.

Figure 5:
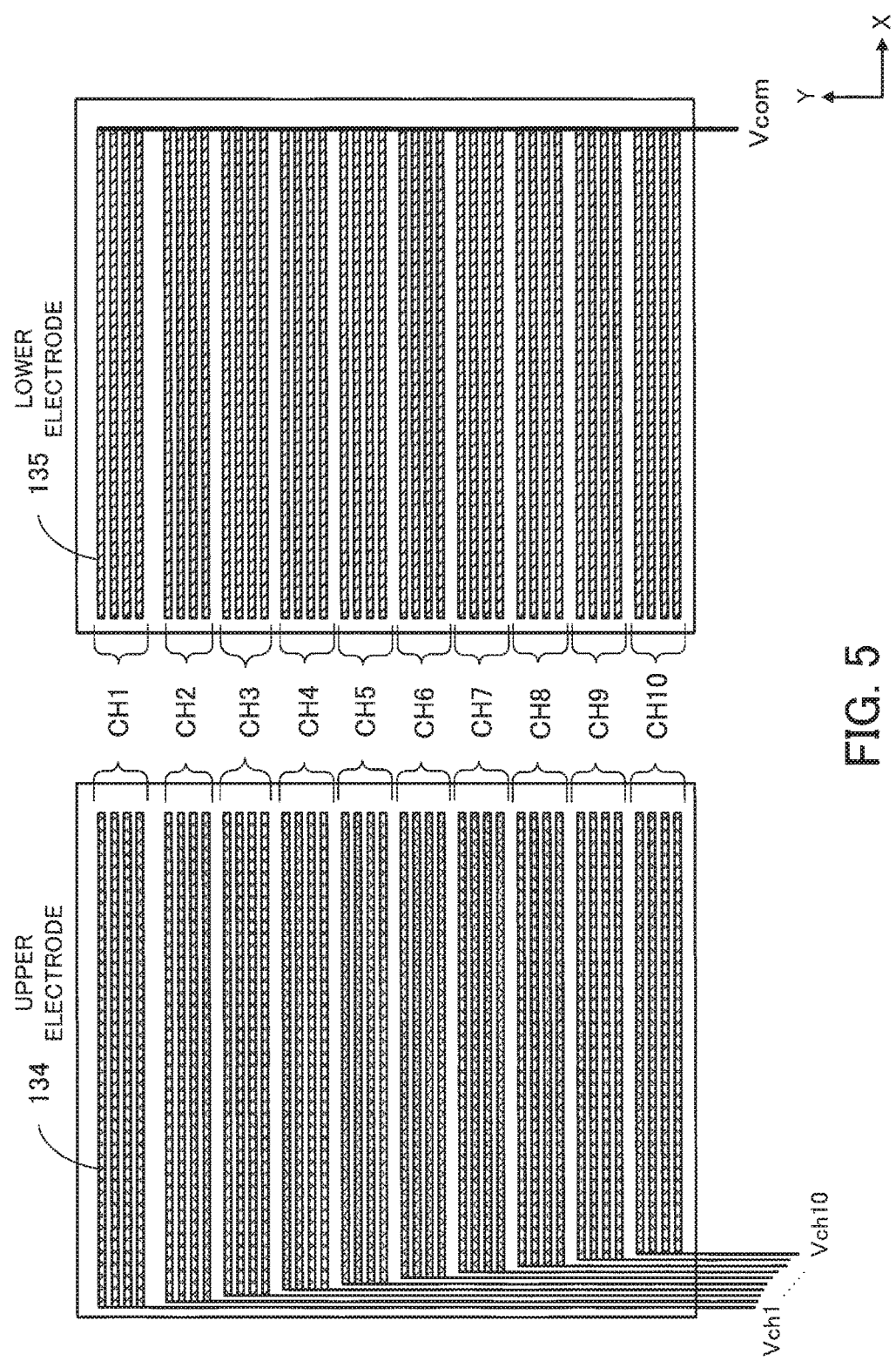
FIG. 5 illustrates an example of the structure of electrodes of the display device according to the second embodiment.

FIG. 5 illustrates an example of the structure of electrodes of the display device according to the second embodiment. CH1 through CH10 indicate areas in which partial electrodes are arranged.

The upper electrode 134 is formed by performing patterning of slit-shaped ITO electrodes for each areas. With the upper electrode 134, individual signal lines are connected to partial electrodes formed for each areas to supply different drive signals. For example, Vch1 is supplied to a partial electrode in the area CH1. Similarly, Vch10 is supplied to a partial electrode in the area CH10. The same applies to the areas CH2 through CH9.

The lower electrode 135 is formed by patterning slit-shaped ITO electrodes for each area. A partial electrode of the lower electrode 135 formed in an area is opposite a partial electrode of the upper electrode 134 formed in the same area. With the lower electrode 135, a common signal line is connected to partial electrodes formed in each area to supply a voltage Vcom. The upper electrode 134 and the lower electrode 135 are driven by producing a potential difference between a partial electrode of the upper electrode 134 and a partial electrode of the lower electrode 135 formed in each area. Hereinafter a combination of a partial electrode of the upper electrode 134 and a partial electrode of the lower electrode 135 disposed opposite each other in each area will be referred to as area electrodes.

In each area, the PDLC 1331 is arranged in a portion in which an area electrode illustrated in FIG. 5 is formed and the spacer 1332 is arranged in a portion in which an area electrode illustrated in FIG. 5 is not formed. Furthermore, the shape of each of the upper electrode 134 and the lower electrode 135 is not limited to that illustrated in FIG. 5. As long as a desired electric field is generated in each area, each of the upper electrode 134 and the lower electrode 135 may have any shape.

Figure 6:
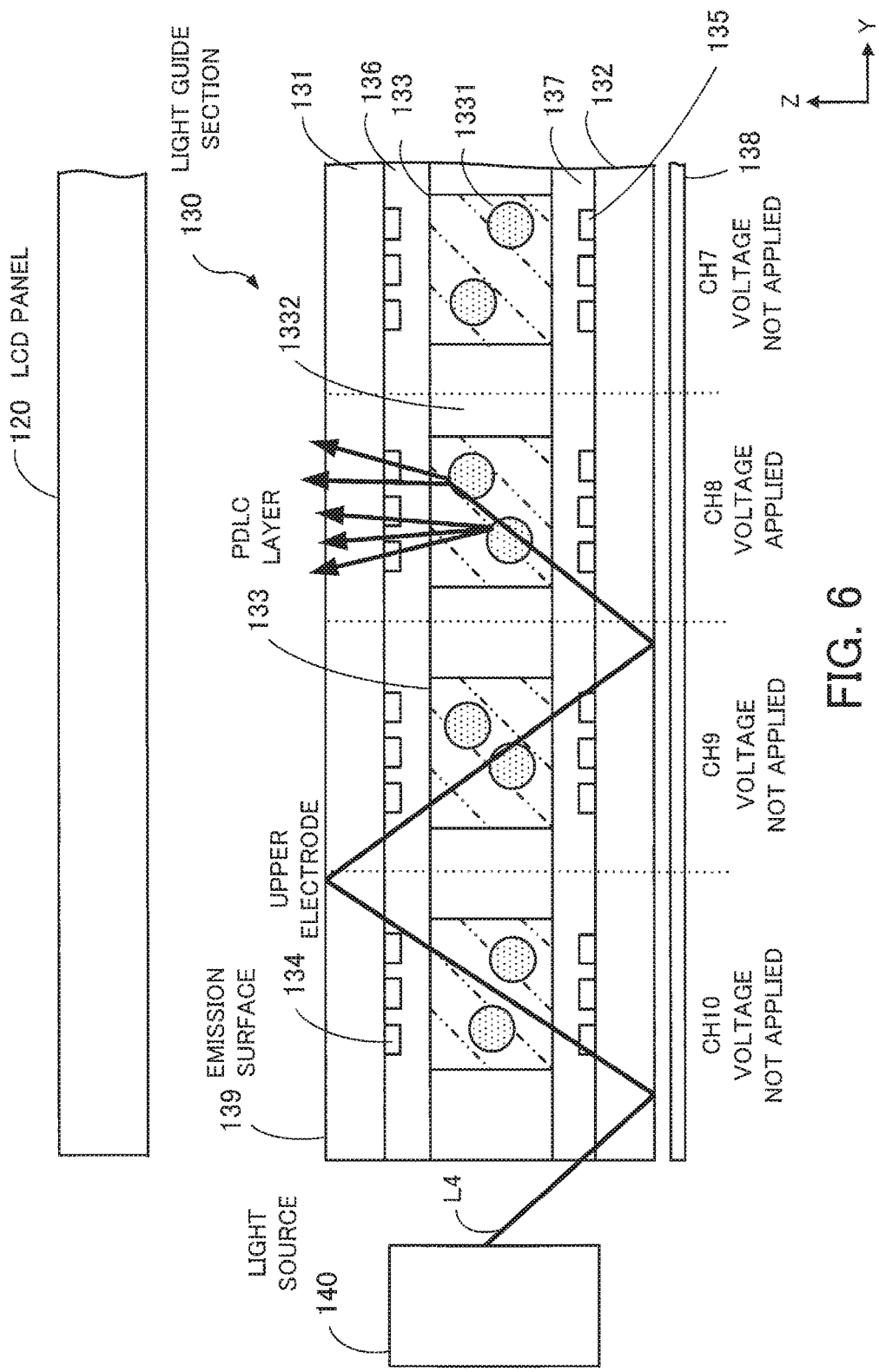
FIG. 6 illustrates partial drive of a backlight in the display device according to the second embodiment.

Partial drive of the backlight in the above display device 100 will be described. FIG. 6 illustrates partial drive of the backlight in the display device according to the second embodiment.

Light L4 is emitted from the light source 140 and enters the PDLC layer 133. If the light L4 is not scattered in the PDLC layer 133, the light L4 travels in the Y direction while being totally reflected by the transparent substrates 131 and 132. The spacer 1332 transmits incident light. Accordingly, the light L4 travels straight in the spacer 1332.

A case where the area CH8 is driven will now be described. A drive voltage is applied to area electrodes corresponding to the area CH8 to generate an electric field in the area CH8. As a result, the PDLC 1331 in the area CH8 goes into the scattering state. At this time a drive voltage is not applied to area electrodes corresponding to the area CH10, the area CH9, or the area CH7. Accordingly, an electric field is not generated in the area CH10, the area CH9, or the area CH7 and the PDLC 1331 in the area CH10, the area CH9, and the area CH7 go into the transmission state. That is to say, the PDLC layer 133 in the area CH10, the area CH9, the area CH8, and the area CH7 go into the transmission state, the transmission state, the scattering state, and the transmission state, respectively.

Because the area CH10 which the light L4 first enters is in the transmission state, the light L4 travels straight. The light L4 passes through the area CH10 and enters the area CH9. Because the area CH9 is also in the transmission state, the light L4 travels straight. The light L4 passes through the area CH9 and enters the area CH8. Because the area CH8 is in the scattering state, the light L4 is scattered. Of a scattered light, light which travels to the emission surface 139 is emitted from the emission surface 139. Light which travels to the transparent substrate 132 is returned into the PDLC 1331 by the reflection sheet 138. The light returned into the PDLC 1331 in the area CH8 is scattered again. Furthermore, because most of the light L4 is scattered in the area CH8, the light L4 does not enter the next area CH7. It is visually recognized from the LCD panel 120 side that in the light guide section 130 in this state, the area CH8 is luminous and that the other areas CH10, CH9, and CH7 are not luminous.

In this way, the display device 100 is able to perform partial drive of the backlight by putting areas into the scattering state in order. Unless otherwise stated, hereinafter it is assumed that when an area is put into the scattering state, control is exercised so as to put the other areas into the transmission state.

FIG. 7 illustrates the luminance distribution of light from the light source of the display device according to the second embodiment. FIG. 7 is a plan view of the light guide section 130 and the light source 140 from the Z direction and a graph indicative of the luminance of each area. A dotted line on the graph indicates the boundary between areas.

The light source 140 is a linear light source and emits light which is uniform in the X direction toward the light guide section 130. For example, the light source 140 is formed by arranging light emitting diodes (LEDs) in a row in the X direction. The intensity of light emitted from the light source 140 is controlled by controlling a drive current. In the following description a drive current for driving the light source 140 is common to the whole of the light source 140. For example, however, a plurality of LEDs arranged may individually be controlled.

As described by the use of FIG. 6, light from the light source 140 enters the display device 100 from the side of the light guide section 130 and travels in the PDLC layer 133 in the Y direction. The light traveling in the PDLC layer 133 in the Y direction is attenuated by the PDLC layer 133. As a result, as the distance from the light source 140 increases, its luminance decreases.

The intensity of light which enters the area CH10 nearest the side of the light guide section 130 is highest. As the distance from the light source 140 increases, the luminance of the incident light decreases. The intensity of the light which enters the area CH1 is lowest. That is to say, the intensity of light which enters each area is as follows: CH10>CH9>CH8>CH7>CH6>CH5>CH4>CH3>CH2>CH1.

Figure 8:
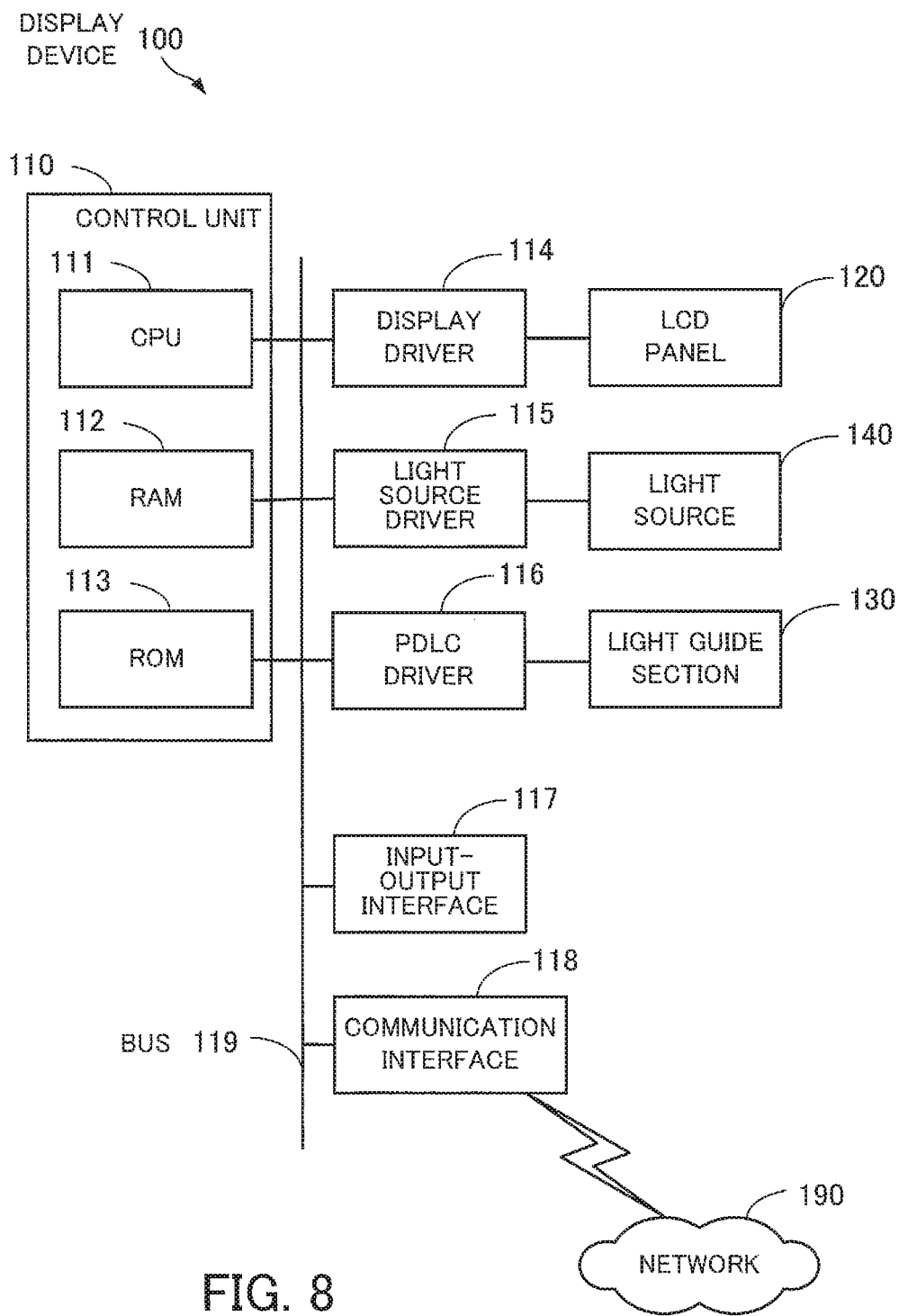
FIG. 8 illustrates an example of the hardware configuration of the display device according to the second embodiment.

FIG. 8 illustrates an example of the hardware configuration of the display device according to the second embodiment.

The whole of the display device 100 is controlled by a control unit 110.

The control unit 110 includes a CPU 111, a random access memory (RAM) 112, and a read only memory (ROM) 113. A plurality of peripheral units are coupled to the control unit 110 via a bus 119 so as to input or output a signal.

The CPU 111 controls the whole of the display device 100 on the basis of an operating system (OS) program and application programs stored in the ROM 113 and various pieces of data expanded in the RAM 112. When the CPU 111 performs a process, the CPU 111 may operate on the basis of the OS program and an application program temporarily stored in the RAM 112.

The RAM 112 is used as main storage of the control unit 110. The RAM 112 temporarily stores at least part of the OS program or an application program executed by the CPU 111. In addition, the RAM 112 stores various pieces of data which the CPU 111 needs to perform a process.

The ROM 113 is a read only semiconductor memory and stores the OS program, the application programs, and fixed data which is not rewritten. Furthermore, a semiconductor memory, such as a flash memory, may be used as auxiliary storage in place of the ROM 113 or in addition to the ROM 113.

The plurality of peripheral units connected to the bus 119 are a display driver 114, a light source driver 115, a PDLC driver 116, an input-output interface 117, and a communication interface 118.

A LCD panel 120 is coupled to the display driver 114. The display driver 114 outputs an image signal to the LCD panel 120 to display an image.

The light source 140 is coupled to the light source driver 115. The light source driver 115 drives the light source 140 and controls the intensity of light which enters the PDLC layer 133.

The light guide section 130 is coupled to the PDLC driver 116. The PDLC driver 116 applies an electric field to the PDLC layer 133 by applying a drive voltage to area electrodes formed in the light guide section 130.

An input device used for inputting a user's instructions is coupled to the input-output interface 117. An input device, such as a keyboard, a mouse used as a pointing device, or a touch panel, is coupled. The input-output interface 117 transmits to the CPU 111 a signal transmitted from the input device.

The communication interface 118 is connected to a network 190. The communication interface 118 transmits data to or receives data from another computer or a communication apparatus via the network 190.

By adopting the above hardware configuration, the processing functions in the second embodiment are realized.

Figure 9:
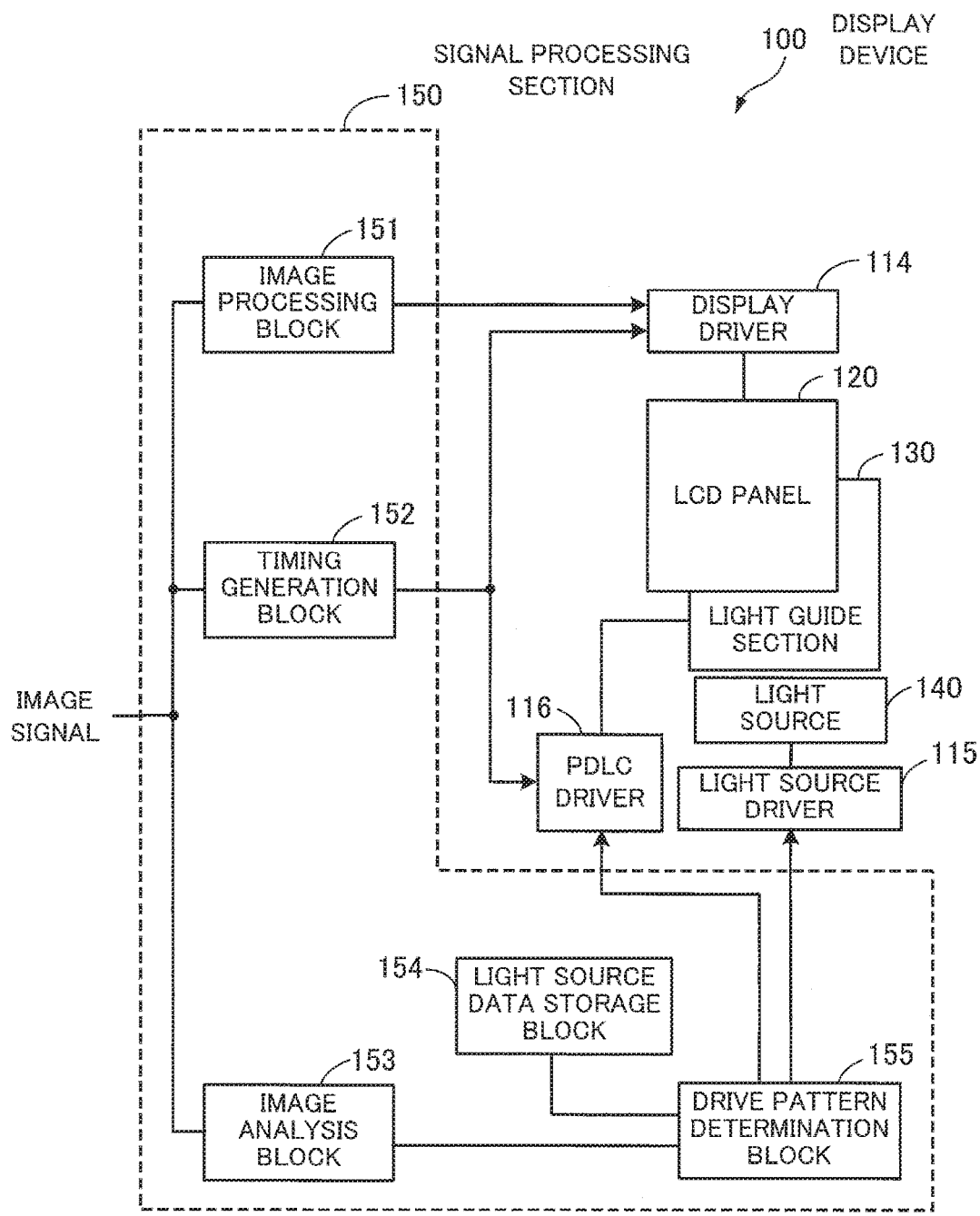
FIG. 9 illustrates an example of the structure of the functions of the display device according to the second embodiment.

FIG. 9 illustrates an example of the structure of the functions of the display device according to the second embodiment.

With the display device 100 a signal processing section 150 receives an image signal and generates signals on the basis of the image signal for driving the display driver 114, the light source driver 115, and the PDLC driver 116. The signal processing section 150 includes an image processing block 151, a timing generation block 152, an image analysis block 153, a light source data storage block 154, and a drive pattern determination block 155. The image processing block 151, the timing generation block 152, the image analysis block 153, and the drive pattern determination block 155 are realized by, for example, a processor such as the CPU 111. The light source data storage block 154 is realized by a storage area secured in the RAM 112, the ROM 113, or the like.

The image processing block 151 receives an image signal, converts the image signal to a display signal, and outputs the display signal to the display driver 114. The image signal includes color information corresponding to each pixel of the LCD panel 120. Pixels are arranged in a matrix in the LCD panel 120. Each pixel is made up of three subpixels. For example, each pixel is made up of a red subpixel, a green subpixel, and a blue subpixel. A pixel made up of a red subpixel, a green subpixel, and a blue subpixel is an example. For example, a pixel may be made up of four subpixels, that is to say, a red subpixel, a green subpixel, a blue subpixel, and a white subpixel. Furthermore, a pixel may be made up of other subpixels, such as a cyan subpixel, a magenta subpixel, and a yellow subpixel. The image signal includes color information on, for example, red, green, and blue. If a pixel is made up of four subpixels, that is to say, a red subpixel, a green subpixel, a blue subpixel, and a white subpixel, then the image processing block 151 converts the image signal including, for example, red, green, and blue to a display signal including red, green, blue, and white and outputs the display signal to the display driver 114.

The timing generation block 152 outputs a timing signal to the display driver 114 and the PDLC driver 116. For example, the timing generation block 152 outputs a vertical synchronizing signal and a horizontal synchronizing signal used for scanning. The timing generation block 152 generates a timing signal by, for example, counting a clock signal. The display driver 114 performs image scanning to the timing signal by the use of the display signal acquired from the image processing block 151. The PDLC driver 116 applies a drive voltage to area electrodes to the timing signal. As a result, control is exercised so as to put the PDLC 1331 corresponding to the area electrodes to which the drive voltage is applied into the scattering state.

The image analysis block 153 receives the image signal and calculates required luminance values for each area. For example, a required luminance value is the luminance of the backlight required for display in an area on the basis of the image signal. When local dimming is performed, a required luminance value is an index of the intensity of backlight light emitted from each area of the PDLC layer 133. In order to control the luminance of the backlight, the display signal of the image processing block 151 may be corrected to the luminance of the backlight.

The light source data storage block 154 stores luminance distribution tables in which the luminance of the backlight is recorded for respective areas. The luminance distribution tables indicate the relationship between the areas indicated in the graph of FIG. 7 and the luminance of the backlight. For example, the light source 140 is driven by a determined drive current and the areas are driven under the same conditions. The intensity of light emitted at that time from the light guide section 130 is measured and is used as a luminance value of the backlight. A luminance value of the backlight corresponds to the luminance of incident light. A luminance value of the backlight is associated with an identification number of an area and is registered in a luminance distribution table. A luminance distribution table is prepared by measuring a luminance value of the backlight in advance.

The drive pattern determination block 155 determines a drive pattern of an area on the basis of a required luminance value acquired from the image analysis block 153 and a luminance distribution table. The luminance of the backlight obtained at the time of driving the area at a determined voltage for a determined time is found from the luminance distribution table. For example, the drive pattern determination block 155 calculates the luminance of the backlight obtained during scattering time in a main lighting period assigned to the area. When the luminance of the backlight calculated is lower than the required luminance value, the drive pattern determination block 155 calculates scattering time needed for the area in order to obtain a luminance value corresponding to a deficiency. A luminance increase period is assigned to the area which is short of luminance. A drive pattern is determined so that each area will satisfy a required luminance value. Furthermore, for example, the following method may be adopted. A drive pattern in which a required luminance value is largest in each area is formed in advance and is corrected on the basis of a required luminance value. For example, a drive pattern includes the magnitude of a drive current used for driving the light source 140 and setting of scattering time during which the PDLC driver 116 applies a drive voltage to corresponding area electrodes.

Drive timing of each component of the display device 100 having the above structure will be described.

Figure 10:
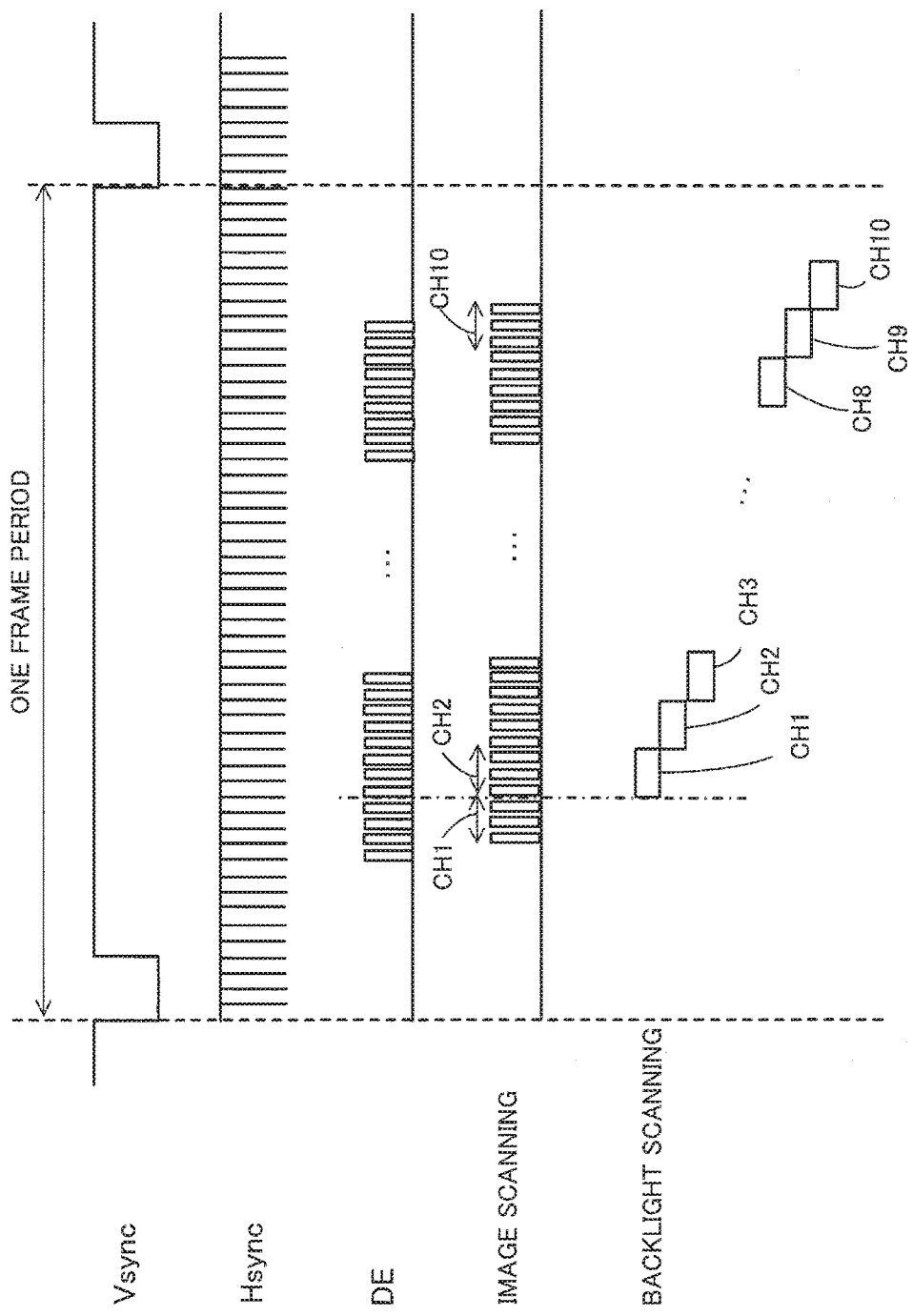
FIG. 10 illustrates drive timing of each functional component of the display device according to the second embodiment.

FIG. 10 illustrates drive timing of each functional component of the display device according to the second embodiment. FIG. 10 illustrates timing of a vertical synchronizing signal Vsync, a horizontal synchronizing signal Hsync, an image signal DE, image scanning by the display driver 114, and backlight scanning by the PDLC driver 116 during one frame period.

Image scanning and backlight scanning of the display device 100 are performed at timing generated by the vertical synchronizing signal Vsync. A fall to the next fall of the vertical synchronizing signal Vsync corresponds to one frame. The horizontal synchronizing signal Hsync generates timing at which one line of the LCD panel 120 is switched.

The signal processing section 150 begins to receive an image signal DE at timing based on the vertical synchronizing signal Vsync. The image signal DE inputted to the signal processing section 150 is processed and is transmitted to the display driver 114. The display driver 114 performs image scanning by repeating the process of writing a signal corresponding to one line to the LCD panel 120 in synchronization with the horizontal synchronizing signal Hsync. The display driver 114 performs image scanning in order from the area CH1 to the area CH10.

The image analysis block 153 acquires the image signal DE inputted in order and calculates a required luminance value at the time when it acquires a signal corresponding to one area. The drive pattern determination block 155 determines a drive pattern on the basis of the required luminance value. A process from acquiring the image signal DE corresponding to an area to determining a drive pattern is performed during a period during which the display driver 114 performs image scanning on the area. The drive pattern determination block 155 controls the PDLC driver 116 and the light source driver 115 by the use of the determined drive pattern.

In a period during which the display driver 114 performs image scanning on an area next to an area on which image scanning has ended, the PDLC driver 116 applies a drive voltage to area electrodes in the area on which image scanning has ended in synchronization with the horizontal synchronizing signal Hsync to put the area on which image scanning has ended into the scattering state.

In the example of FIG. 10, the light modulation layer in the area CH1 is in the scattering state (backlight scanning is performed on the area CH1) during a period during which image scanning on the area CH1 has ended and image scanning is performed on the area CH2. After that, backlight scanning is performed in order on the area CH2 to the area CH10 in synchronization with image scanning.

In this way, with the display device 100, in a period in which the display driver 114 performs image scanning on an area, a drive pattern based on an image signal corresponding to the area is determined. As a result, the luminance of the backlight is controlled to the image signal DE. In this case, a frame memory which temporarily stores the image signal DE for analyzing the image signal DE is not used.

Hereinafter a period of backlight scanning performed in synchronization with the above image scanning will be referred to as a main lighting period. Because backlight scanning is performed in synchronization with image scanning during the main lighting period, scattering time during which each area is put into the scattering state is the same. As illustrated in FIG. 7, as the distance between an area and the light source 140 increases, the intensity of light which enters the area decreases. Therefore, if the light source 140 and the PDLC layer 133 are driven under the same conditions, the luminance of the backlight in an area during the main lighting period decreases. This is the same with the intensity of incident light illustrated in FIG. 7. With the display device 100, a period corresponding to a vertical blanking period is a luminance increase period and the luminance of an area is increased.

The drive pattern determination block 155 determines a drive pattern so that the luminance of the backlight during a frame period will become a desired required luminance value for each area by backlight scanning during the main lighting period and the luminance increase period.

A drive pattern at the time of required luminance values for all areas being the same will now be described as an example. The drive pattern determination block 155 determines a drive pattern so that the luminance of all areas will be uniform.

Figure 11:
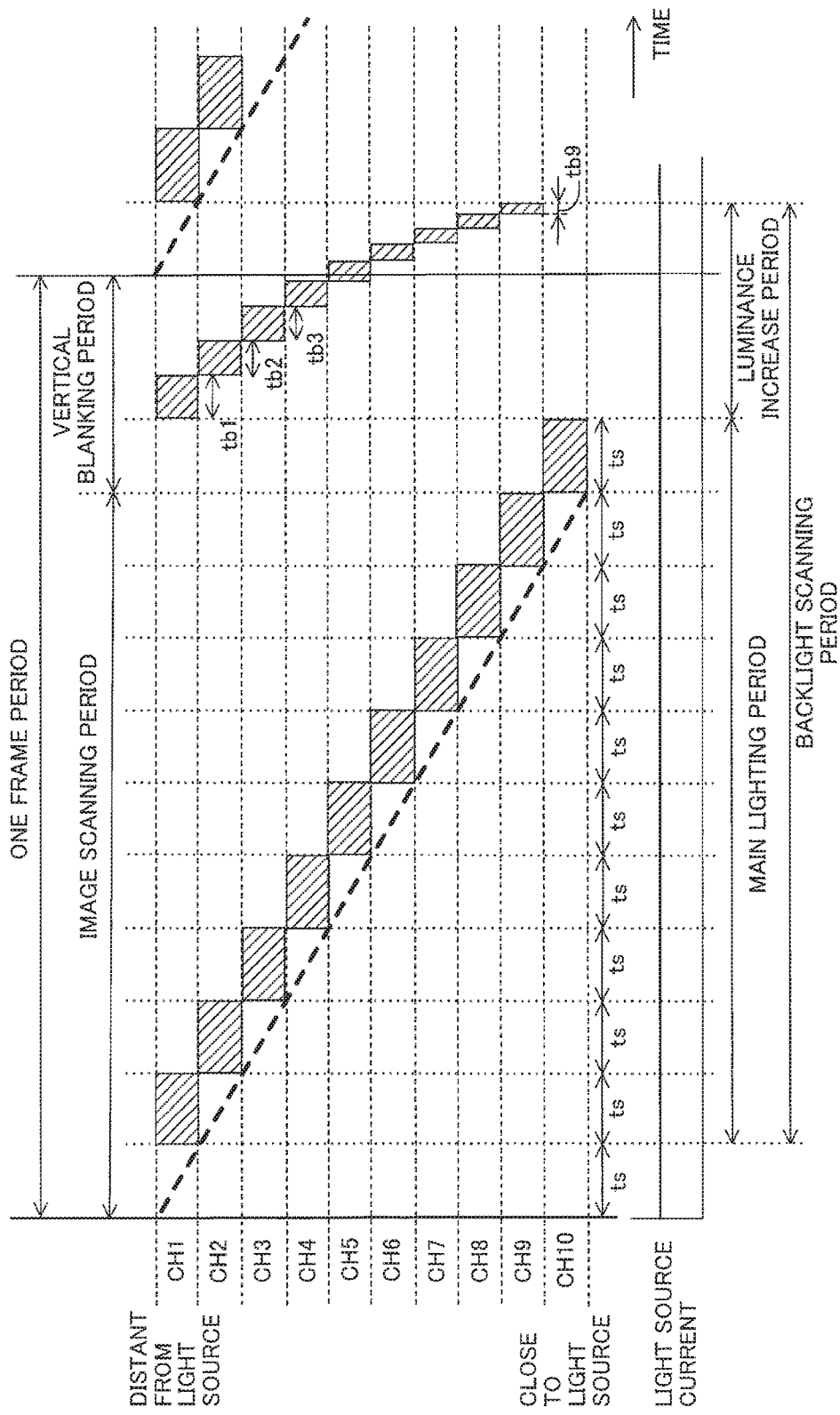
FIG. 11 illustrates an example of a drive pattern of the display device according to the second embodiment.

FIG. 11 illustrates an example of a drive pattern of the display device according to the second embodiment. In FIG. 11, a column in the vertical direction indicates the areas CH1 through CH10 and a row in the horizontal direction indicates time elapsed. Each time zone corresponding to the column indicative of the areas CH1 through CH10 in which nothing is stated is a period during which a corresponding area is in the transmission state. Furthermore, each time zone indicated by oblique lines is a period during which a corresponding area is controlled so as to be in the scattering state. A light source current is a drive current supplied to the light source 140. Furthermore, a thick dotted line indicates image scanning.

In the example of FIG. 11, a constant light source current is supplied to the light source 140. Because a light source current is constant, the intensity of light emitted from the light source 140 is constant.

The display driver 114 performs image scanning from the area CH1 distant from the light source 140 to the area CH10 during an image scanning period. The display driver 114 performs image scanning on each area one line at a time. The scanning period is taken to end scanning of all lines is the same among all areas CH1 through CH10. Furthermore, an image is not written during a vertical blanking period.

The PDLC driver 116 scans the area CH1 through the area CH10 during a backlight scanning period which is equal to one frame period. Backlight scanning is performed in order from the area CH1 to the area CH10 in the same direction as image scanning on the basis of a timing signal. At this time backlight scanning on an area is begun after image scanning on the area ends. A target area of backlight scanning is switched to the scattering state. On the other hand, the other areas are put into the transmission state. As a result, only the target area emits backlight light.

In the example of FIG. 11, after the display driver 114 ends image scanning on the area CH1, the PDLC driver 116 switches the area CH1 to the scattering state during the scanning period ts of the next area CH2. Control is exercised during this scanning period ts so that the other areas will be in the transmission state. Next, the PDLC driver 116 exercises control so that the area CH2 will be in the scattering state during the scanning period ts during which the display driver 114 performs image scanning on the area CH3. This process is repeated to put each of the areas CH1 through CH10 into the scattering state in order during the scanning period ts. By doing so, a main lighting period ends.

The drive pattern determination block 155 determines a drive pattern to increase the luminance of each area during a luminance increase period. In the example of FIG. 11, a drive pattern for making the luminance of all the areas uniform is determined with luminance obtained by putting the area CH10 nearest the light source 140 into the scattering state during the scanning period ts as reference. For example, the drive pattern determination block 155 calculates the luminance of each area obtained in the main lighting period on the basis of a luminance distribution table. The drive pattern determination block 155 then calculates scattering time of each area in the luminance increase period on the basis of the difference between the calculated luminance of each area and the reference luminance. With the drive pattern illustrated in FIG. 11, scattering time tb1 of the area CH1 most distant from the light source 140 is the longest. In the order of the areas CH1 through CH9, scattering time is reduced as follows: scattering time tb1>tb2>tb3> . . . >tb9. The PDLC driver 116 exercises control on the basis of the drive pattern so as to put the areas CH1 through CH10 into the scattering state in order. By doing so, luminance is increased. In the example of FIG. 11, the value of a light source current in the luminance increase period is equal to the value of a light source current in the main lighting period. However, a light source current value is set properly. For example, in order to increase luminance, a light source current value in the luminance increase period may be made larger than a light source current value in the main lighting period. If the luminance of the areas CH9 through CH1 increased exceeds the luminance of a backlight light in the area CH10 in the main lighting period at this time, then scattering time is set for the area CH10 to increase luminance.

By exercising the above drive control, the luminance of the backlight in all the areas is uniformized. Furthermore, if scattering time is set to image scanning in the main lighting period and a luminance increase period is not set in the vertical blanking period, then control is exercised so as to set the luminance of the backlight to luminance in the lowest area. By doing so, luminance is uniformized. In this way, overall, a higher luminance is obtained by setting the luminance increase period.

Figure 12:
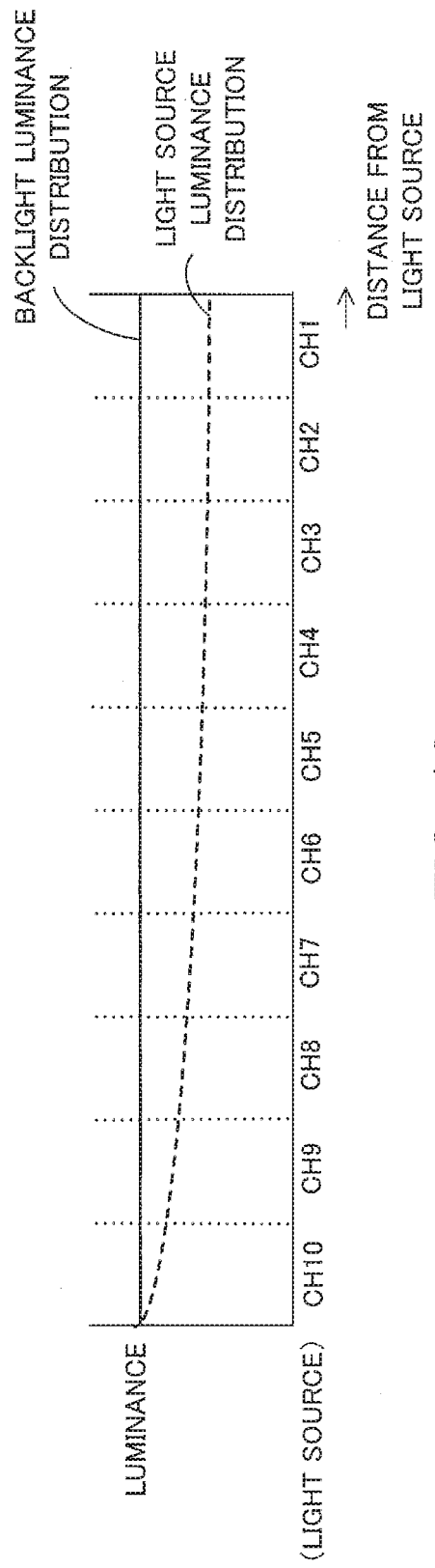
FIG. 12 illustrates an example of the luminance distribution of a backlight of the display device according to the second embodiment.

FIG. 12 illustrates an example of the luminance distribution of the backlight of the display device according to the second embodiment. In FIG. 12, a vertical axis indicates the luminance of the backlight and a horizontal axis indicates distance from the light source 140. CH1 through CH10 indicate areas.

A thick dotted line in FIG. 12 indicates light source luminance distribution obtained at the time of driving the areas CH1 through CH10. In this case, the luminance of the light source 140 is the same and conditions under which area electrodes are driven are the same. As distance from the light source 140 increases, luminance decreases. As indicated in FIG. 12, a drive pattern which corrects the amount of a decrease in luminance corresponding to distance from the light source 140 is calculated and the areas CH1 through CH10 are driven. By doing so, the luminance of an area distant from the light source 140 is increased and backlight luminance distribution indicated by a solid line is obtained.

As has been described, the areas are put into the scattering state in order during scattering time corresponding to the distance from the light source 140 in the luminance increase period. By doing so, the luminance of the backlight is uniformized. Furthermore, luminance is increased not only in the main lighting period but also in the luminance increase period. Therefore, the luminance of the entire backlight is increased.

In addition, after image scanning ends, the PDLC 1331 is put into the scattering state. This makes it possible to perform a local dimming process without using a frame memory. That is to say, while image scanning is being performed, the image analysis block 153 finds a required luminance value on the basis of an image signal inputted to the image analysis block 153 and the image processing block 151 at the same time. The drive pattern determination block 155 determines a drive pattern on the basis of the required luminance value and gives the PDLC driver 116 instructions.

Figure 13:
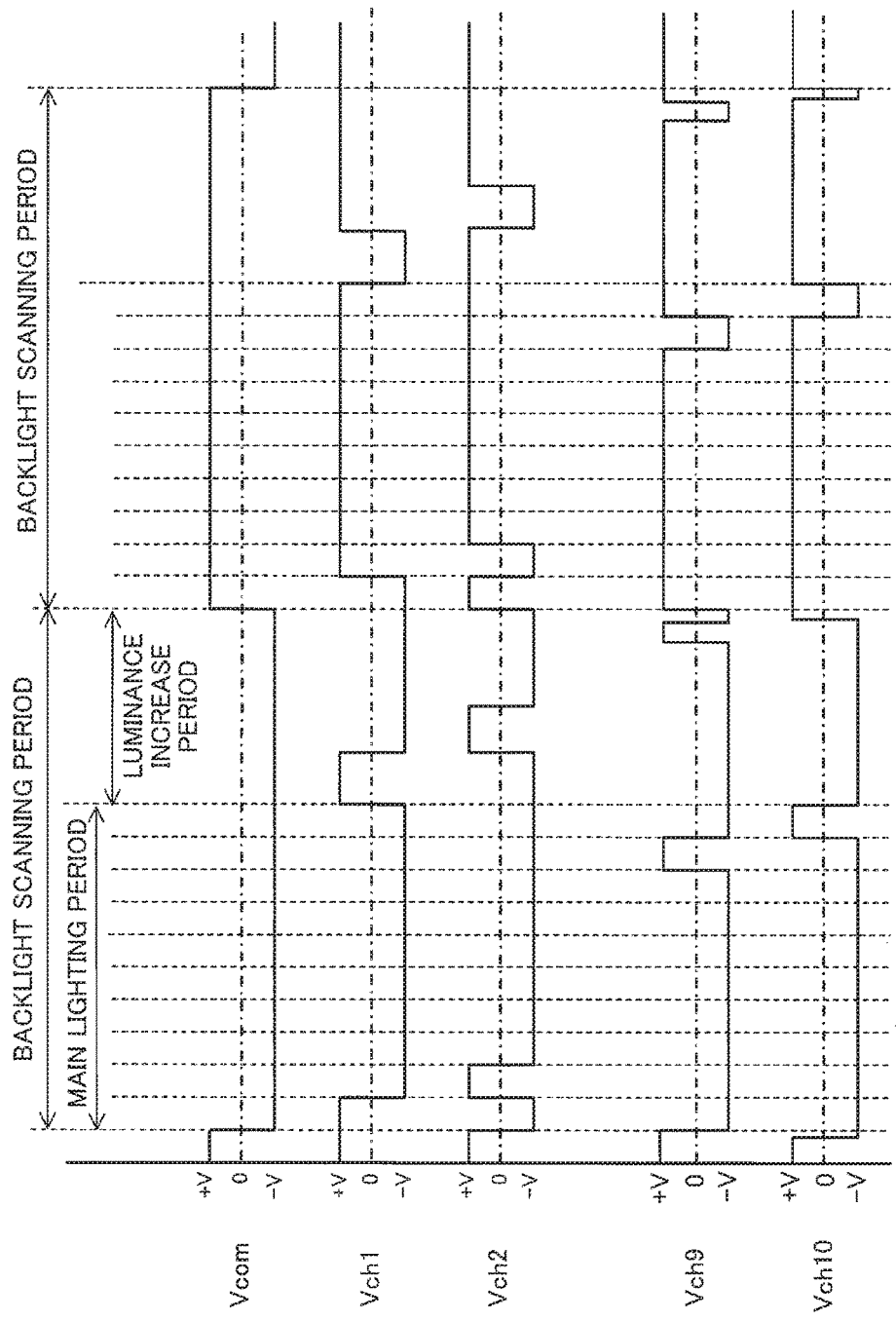
FIG. 13 illustrates an example of driving of an electrode in the second embodiment.

Driving of area electrodes which brings about the scattering state of an area will now be described. FIG. 13 illustrates an example of driving of an electrode in the second embodiment. In FIG. 13, a vertical axis indicates a voltage value applied to each terminal illustrated in FIG. 5 and a horizontal axis indicates time elapsed. Furthermore, dotted lines which divide a main lighting period indicate drive periods assigned to areas.

In FIG. 13, for example, each backlight scanning period is one frame.

A voltage of −V (V) or a voltage of +V (V) is inverted every frame and is supplied to a lower electrode 135 of area electrodes as a voltage Vcom. A voltage of 2×V (V) is applied to the PDLC 1331 corresponding to the areas CH1 through CH10 during a period during which a voltage whose polarity is reverse to that of Vcom is applied. At this time the PDLC 1331 goes into the scattering state. On the other hand, when a voltage whose polarity is the same as that of Vcom is applied, a voltage applied to the PDLC 1331 is 0 (V). At this time the PDLC 1331 goes into the transmission state.

As illustrated in FIG. 13, with the display device 100 a voltage whose polarity is reverse to that of Vcom is applied in order to an upper electrode 134 of area electrodes in synchronization with image scanning during a main lighting period. To apply a voltage so as to create a voltage difference between an upper electrode 134 and a lower electrode 135 of area electrodes will be referred to as "apply a drive voltage".

In the example of FIG. 13, a luminance increase period is distributed in the following way. Scattering time of the area most distant from the light source 140 is the longest. As the distance from the light source 140 decreases, scattering time becomes shorter. In the example of FIG. 13, time for which each area is driven is the same during the main lighting period. That is to say, time for which Vch1 through Vch10 are applied to the areas CH1 through CH10, respectively, are the same. Time distribution is set during the luminance increase period so that time for which Vch1 is applied to the area CH1 most distant from the light source 140 is longest and so that as the distance from the light source 140 decreases, time for which a drive voltage is applied will become shorter.

In the above way, by controlling a voltage applied to area electrodes corresponding to an area, control is exercised so as to put the area into the scattering state or the transmission state.

Figure 14:
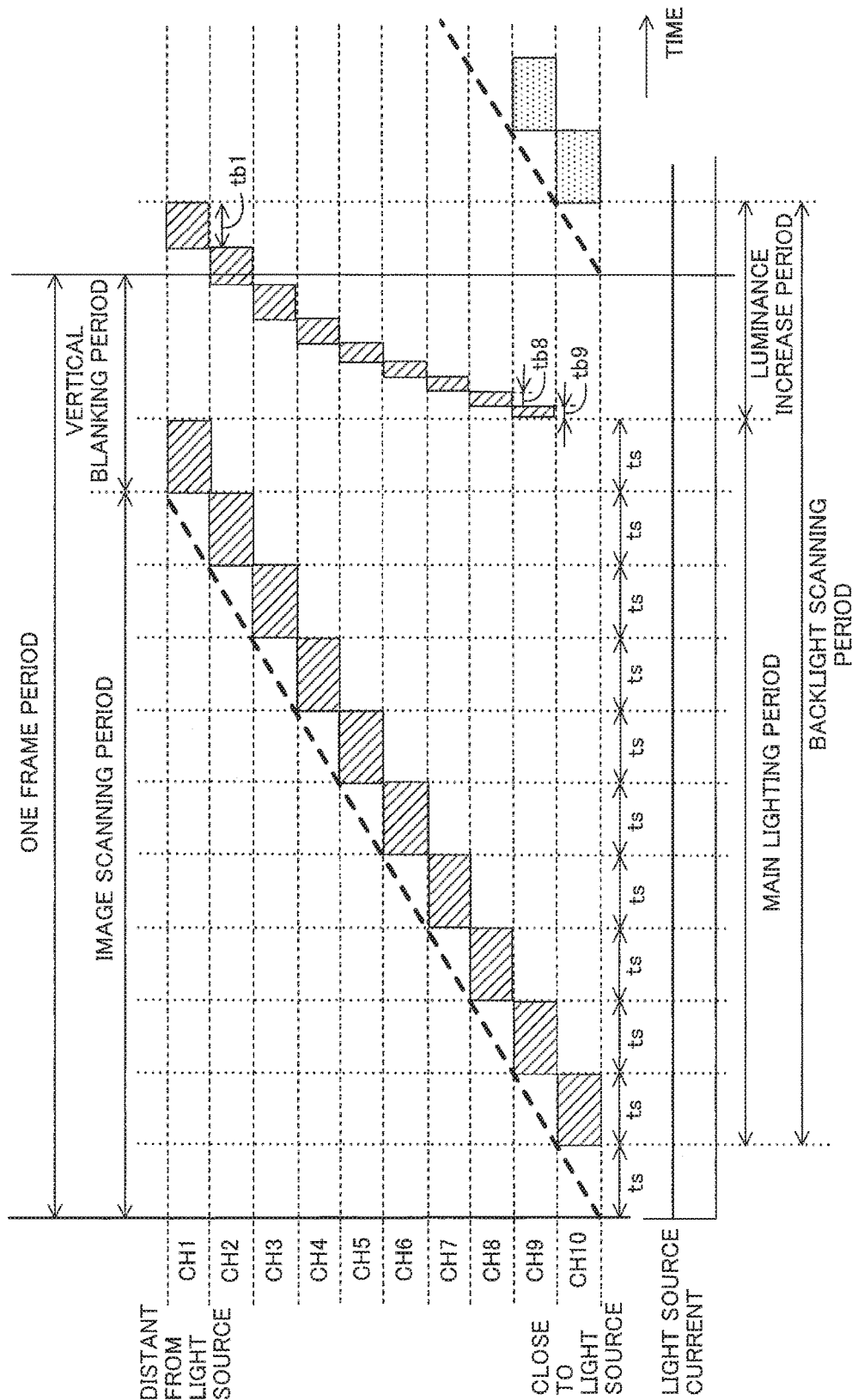
FIG. 14 illustrates another example of a drive pattern of the display device according to the second embodiment.

By the way, in the example of FIG. 11, image scanning is performed from the area CH1 distant from the light source 140. However, image scanning may be begun at the area CH10 near the light source 140. In this case, backlight scanning by the PDLC driver 116 is also begun at the area CH10. FIG. 14 illustrates another example of a drive pattern of the display device according to the second embodiment. FIG. 14 is the same as FIG. 11 with the exception that scanning order is reversed.

In the example of FIG. 14, the display driver 114 performs image scanning in order from the area CH10 nearest the light source 140 to the area CH1 during an image scanning period. The PDLC driver 116 performs backlight scanning in synchronization with the image scanning. In the example of FIG. 14, after the display driver 114 ends image scanning on the area CH10, the PDLC driver 116 exercises control so as to put the area CH10 into the scattering state during scanning period ts of the next area CH9. Similarly, after the display driver 114 ends image scanning on each of the areas CH9 through CH1 in order, the PDLC driver 116 exercises control so as to put the area into the scattering state during scanning period ts of the next area. In this way, control is exercised during a main lighting period so as to put the areas CH10 through CH1 into the scattering state during the scanning period ts.

The drive pattern determination block 155 determines a drive pattern to increase the luminance of each area during a luminance increase period. In the example of FIG. 14, a drive pattern for making the luminance of all the areas uniform is determined with the luminance of the area CH10 nearest the light source 140 as reference. This is the same with the example of FIG. 11. With the drive pattern illustrated in FIG. 14, scattering time tb9 of the area CH9 nearest the light source 140 next to the area CH10 is the shortest and scattering time is increased according to the distance from the light source 140 from scattering time tb8 of the area CH8 to scattering time tb1 of the area CH1. The PDLC driver 116 exercises control on the basis of the drive pattern so as to put the areas CH10 through CH1 into the scattering state in order. By doing so, luminance is increased.

The PDLC driver 116 exercises control during the luminance increase period so as to put the areas CH10 through CH1 into the scattering state in that order for scattering time corresponding the distance from the light source 140. Even if image scanning is performed in this order, the PDLC 1331 is put into the scattering state after the image scanning ends. This makes it possible to perform a local dimming process without using a frame memory.

After image scanning on an area ends, the backlight in the area is lit. This makes it possible not only to perform a local dimming process without using a frame memory but also to suppress deterioration in image quality. If image scanning and backlight scanning are performed on the same area at the same time, then a screen in a state in which an image in the area is not completely switched to a new image is visually recognized. By performing backlight scanning after the end of image scanning, the backlight is lit in a state in which an image signal corresponding to an area is updated. As a result, a user visually recognizes an updated screen. In addition, the backlight is lit in an area only for time in a main lighting period and a luminance increase period assigned to the area. The backlight is unlit during the remaining period. As a result, a moving image blur caused by hold display is reduced.

In the above first and second embodiments a case where a light source is disposed on one side in the direction in which areas after division are disposed is described. When an electric field is not applied, PDLC is in the transmission state. Light which enters an area travels in a light traveling direction to the next area. When an area is put into the scattering state, control is exercised so as to put the other areas into the transmission state. Therefore, in the first and second embodiments light which enters from a side on which a light source is not disposed also travels to an area in the scattering state. In this way, light which enters from an opposite side is also used. An embodiment in which two light sources are disposed will now be described.

Third Embodiment

Figure 15:
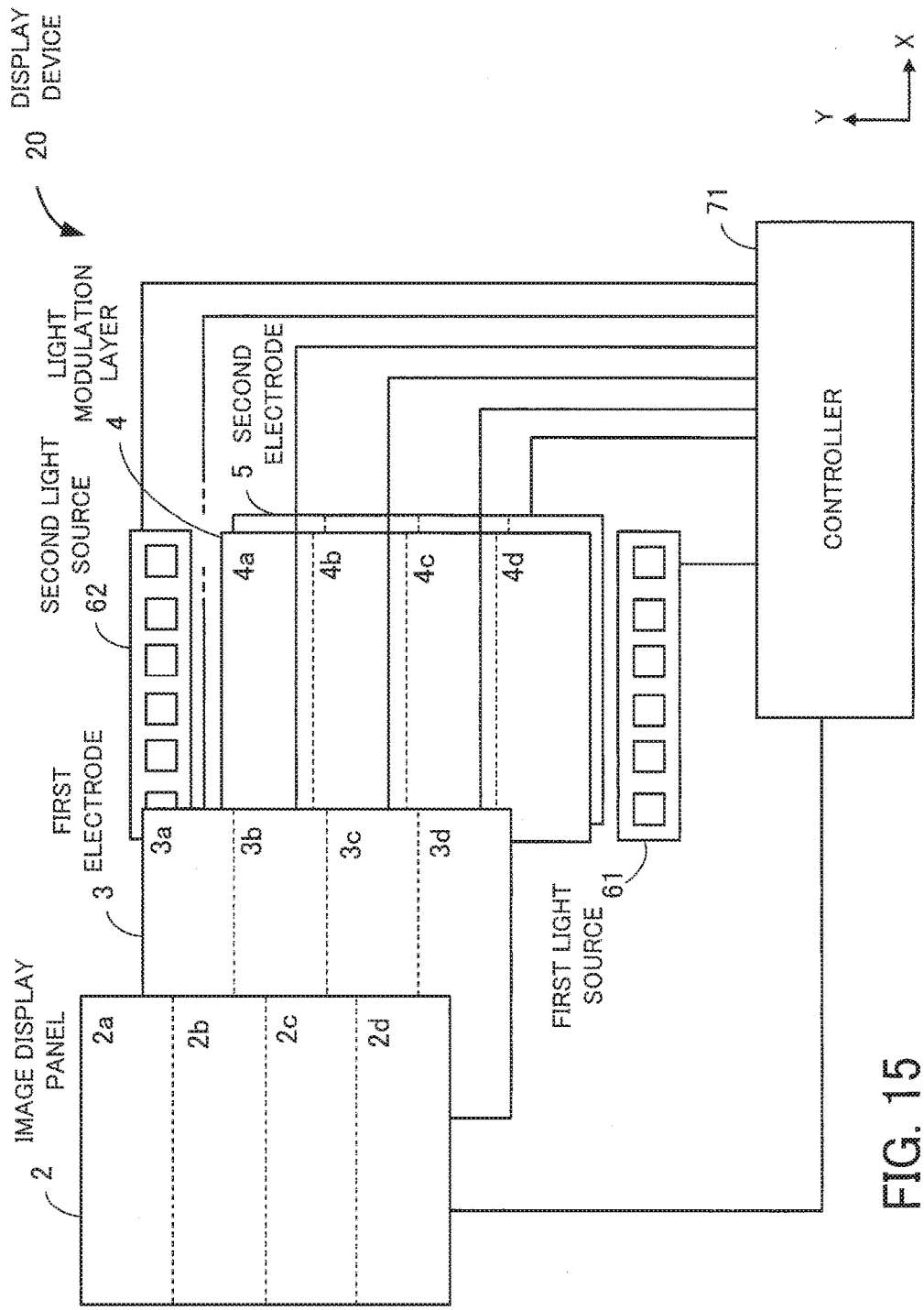
FIG. 15 illustrates an example of the structure of a display device according to a third embodiment.

A third embodiment will be described. FIG. 15 illustrates an example of the structure of a display device according to a third embodiment. A display device 20 according to a third embodiment has a structure in which the light source 6 and the controller 7 included in the display device 1 according to the first embodiment illustrated in FIG. 1 are replaced with a first light source 61 and a second light source 62 and a controller 71 respectively. Components in FIG. 15 which are the same as those illustrated in FIG. 1 are marked with the same numerals and descriptions of them will be omitted.

The first light source 61 is disposed near a first side of a light modulation layer 4 and emits light. This light enters the light modulation layer 4 from the first side and travels in the light modulation layer 4. As illustrated in FIG. 7, with the intensity of light from the first light source 61 which enters an area 4d as reference, the intensity of the light which enters areas 4c, 4b, and 4a decreases in that order. The first light source 61 is coupled to the controller 71. The controller 71 on-off controls light emission and controls the amount of light at light emission time.

The second light source 62 is disposed near a second side opposite the first side and emits light. This light enters the light modulation layer 4 from the second side and travels in the light modulation layer 4. Light from the first light source 61 and light from the second light source 62 travel in opposite directions. With the intensity of light from the second light source 62 which enters the area 4a as reference, the intensity of the light which enters the areas 4b, 4c, and 4d decreases in that order. The second light source 62 is coupled to the controller 71. The controller 71 on-off controls light emission and controls the amount of light at light emission time.

The controller 71 controls in synchronization with the frame cycle of an image display panel 2 driving of the areas between partial electrodes 3a, 3b, 3c, and 3d and a corresponding second electrode 5 and driving of the first light source 61 and the second light source 62. The controller 71 is, for example, a processor such as a CPU. The controller 71 selects the areas 4a, 4b, 4c, and 4d in determined order every frame cycle and performs backlight scanning. At this time the controller 71 controls a first electrode 3, the second electrode 5, the first light source 61, and the second light source 62 according to the distance between a selected area and the first light source 61 and the distance between the selected area and the second light source 62 so that the selected area will obtain desired required luminance.

An example of the operation of the display device 20 will be described.

The display device 20 performs image scanning and backlight scanning every frame cycle. Image scanning on the image display panel 2 is performed in the order of display areas 2a, 2b, 2c, and 2d or in the reverse order. The controller 71 selects the areas 4a, 4b, 4c, and 4d in the order in which image scanning is performed, and exercises control so as to put a selected area into the scattering state. At this time the amount of a decrease in the intensity of light from the first light source 61 which enters the area 4a, 4b, 4c, or 4d depends on the distance from the first side. Similarly, the amount of a decrease in the intensity of light from the second light source 62 which enters the area 4a, 4b, 4c, or 4d depends on the distance from the second side. Accordingly, the amount of a decrease in the intensity of light from the first light source 61 and light from the second light source 62 which enter the area 4a, 4b, 4c, or 4d is calculated on the basis of the distance from the first side and the distance from the second side. The controller 71 controls the first light source 61, the second light source 62, the first electrode 3, and the second electrode 5 so as to correct the amount of a decrease in the intensity of light in the area 4a, 4b, 4c, or 4d. For example, the controller 71 lights both of the first light source 61 and the second light source 62 to increase the luminance of light which enters the area 4a, 4b, 4c, or 4d. The controller 71 may control a light source current of the first light source 61 or the second light source 62 to increase the intensity of light emitted from at least one of them. The controller 71 may adjust scattering time of the area 4a, 4b, 4c, or 4d. The controller 71 controls at least one of the first light source 61, the second light source 62, and the partial electrodes 3a, 3b, 3c, and 3d so that the areas 4a, 4b, 4c, and 4d will realize desired luminance.

The controller 71 may select the area 4a, 4b, 4c, or 4d corresponding to the display area 2a, 2b, 2c, or 2d on which image scanning has ended, and perform backlight scanning Backlight scanning on the same area is delayed until the time when image scanning ends. By doing so, a required luminance value of a backlight is calculated before the backlight scanning by the use of an image signal used for the image scanning. This makes it possible to perform a local dimming process without using a frame memory. Furthermore, as with the second embodiment, deterioration in image quality, such as a moving image blur, is suppressed.

As has been described, the display device 20 controls at least one of scattering time of the areas 4a, 4b, 4c, and 4d, on-off of the first light source 61 and the second light source 62, and the amounts of light emitted from the first light source 61 and the second light source 62 on the basis of luminance corresponding to the distance from the first light source 61 and the distance from the second light source 62. This makes it possible to uniformize the luminance of the areas 4a, 4b, 4c, and 4d regardless of the distance from the first light source 61 and the distance from the second light source 62.

Fourth Embodiment

Figure 16:
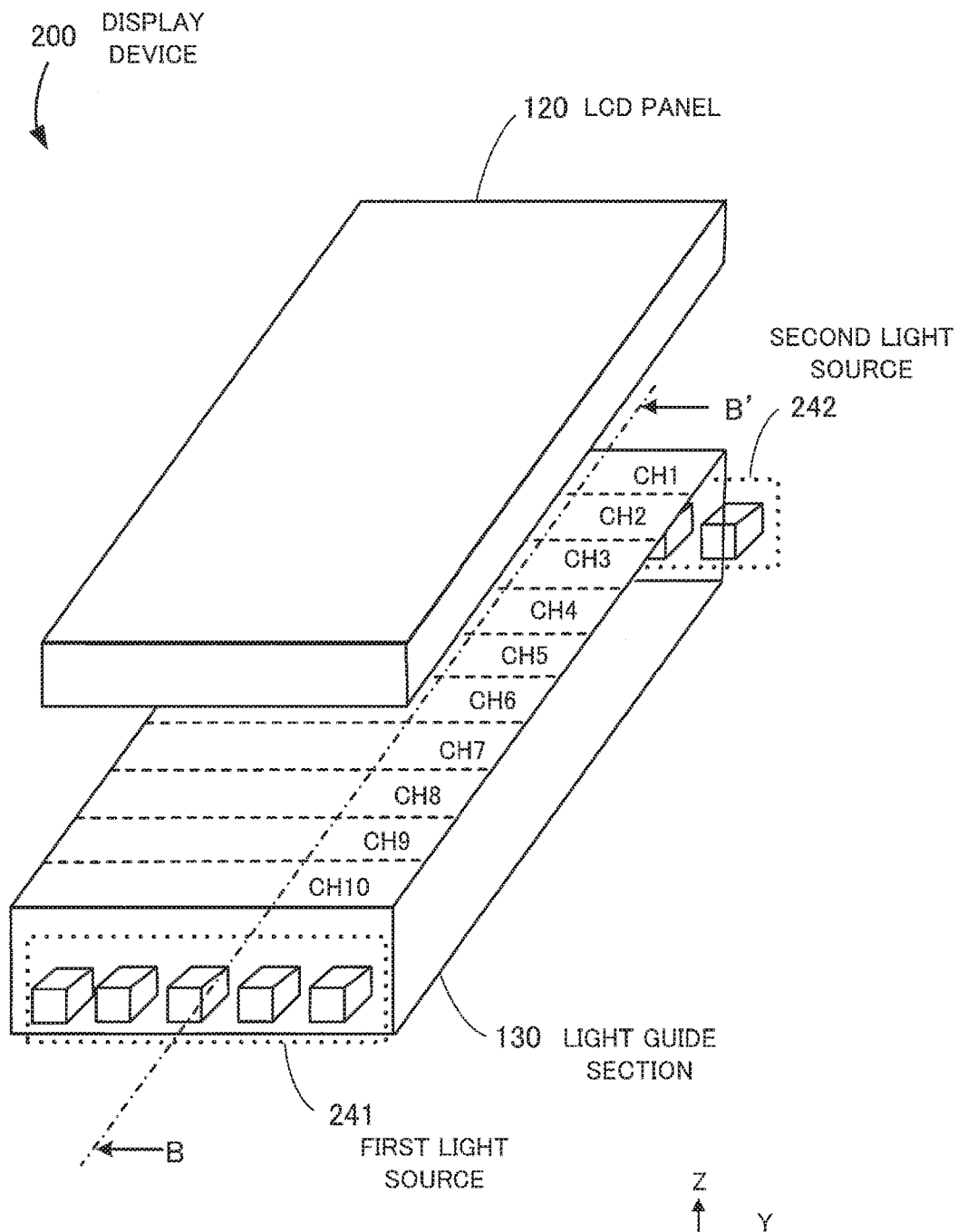
FIG. 16 is a perspective view illustrative of the structure of a display device according to a fourth embodiment.

A display device according to a fourth embodiment will be described. FIG. 16 is a perspective view illustrative of the structure of a display device according to a fourth embodiment. A display device 200 according to a fourth embodiment includes a second light source 242 in addition to a first light source 241 disposed at the same position where the light source 140 of the display device 100 according to the second embodiment illustrated in FIG. 2 is disposed. Components in FIG. 16 which are the same as those illustrated in FIG. 2 are marked with the same numerals and descriptions of them will be omitted.

With the display device 200 according to the fourth embodiment the first light source 241 and the second light source 242 are disposed near a first side and a second side, respectively, opposite each other of sides of a light guide section 130 parallel to a direction in which an LCD panel 120 is stacked on the light guide section 130.

The first light source 241 is disposed near the first side and emits light. This light travels in the light guide section 130. In the example of FIG. 16, the first light source 241 is disposed near an area CH10. Light from the first light source 241 which enters the light guide section 130 travels in the light guide section 130 from the area CH10 to an area CH1. Furthermore, as the light travels further in the light guide section 130, the intensity of the light decreases from the intensity at the time of the light entering the light guide section 130 from the first side. The intensity of light emitted from the first light source 241 is controlled by a light source current supplied to the first light source 241.

The second light source 242 is disposed near the second side and emits light. This light travels in the light guide section 130. In the example of FIG. 16, the second light source 242 is disposed near the area CH1. Light from the second light source 242 which enters the light guide section 130 travels in the light guide section 130 from the area CH1 to the area CH10. As the light travels further in the light guide section 130, the intensity of the light decreases from the intensity at the time of the light entering the light guide section 130 from the second side. The intensity of light emitted from the second light source 242 is controlled by a light source current supplied to the second light source 242.

The light guide section 130, together with the first light source 241 and the second light source 242, makes up a backlight.

For convenience, it is assumed in the following description that a direction in which the first light source 241 and the second light source 242 are disposed is an X direction, that a direction in which light from the first light source 241 travels is a Y direction, and that a direction in which the light guide section 130 and the LCD panel 120 are stacked is a Z direction.

Figure 17:
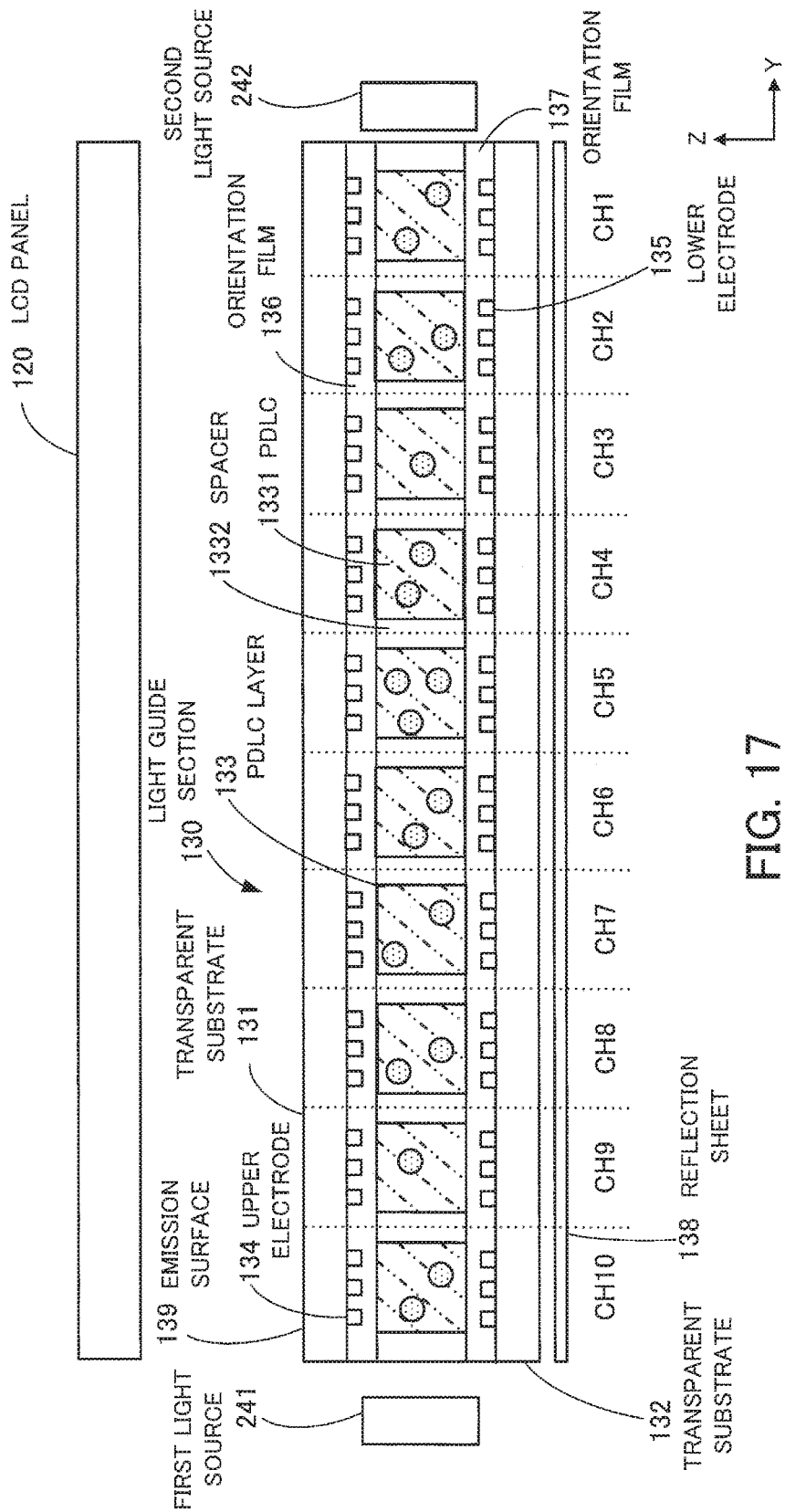
FIG. 17 is a sectional view illustrative of an example of the structure of a light guide section of the display device according to the fourth embodiment.

Next, the structure of the light guide section 130 will be described. FIG. 17 is a sectional view illustrative of an example of the structure of the light guide section of the display device according to the fourth embodiment. FIG. 17 is a sectional view taken along the line B-B' of FIG. 16. Components in FIG. 17 which are the same as those illustrated in FIG. 3 are marked with the same numerals and descriptions of them will be omitted.

The first light source 241 is disposed near the first side of the light guide section 130. The first light source 241 is a linear light source extending in the X direction of the light guide section 130 (see FIG. 16), and emits a uniform light toward the light guide section 130. For example, the first light source 241 is formed by arranging LEDs in a row in the X direction. If light emitted from the first light source 241 is not scattered in a PDLC layer 133, then the light travels in the PDLC layer 133 in the order of the areas CH10 through CH1.

The second light source 242 is disposed near the second side of the light guide section 130. The second light source 242 is a linear light source extending in the X direction of the light guide section 130 (see FIG. 16), and emits a uniform light toward the light guide section 130. If light emitted from the second light source 242 is not scattered in the PDLC layer 133, then the light travels in the PDLC layer 133 in the order of the areas CH1 through CH10.

In this way, light emitted from the first light source 241 and light emitted from the second light source 242 travel in opposite directions in the PDLC layer 133.

The first light source 241 and the second light source 242 are controlled individually.

PDLC 1331 of the display device 200 has the characteristics illustrated in FIGS. 4A and 4B. The PDLC 1331 in an area is switched to the scattering state or the transmission state by controlling a voltage applied to area electrodes formed in the area. The PDLC 1331 of the display device 200 goes into the scattering state when a drive voltage is applied to area electrodes to generate an electric field. Furthermore, the PDLC 1331 of the display device 200 goes into the transmission state when a drive voltage is not applied to area electrodes and an electric field is not generated. For example, an upper electrode 134 and a lower electrode 135 which make up area electrodes have the structures illustrated in FIG. 5.

Furthermore, the hardware configuration of the display device 200 is the same as that of the display device 100 illustrated in FIG. 8. That is to say, the display device 200 has a control unit 110 including a CPU 111, a RAM 112, a ROM 113, and the like. The control unit 110 controls the whole of the display device 200. A display driver 114 which drives the LCD panel 120, a light source driver 115 which drives the first light source 241 and the second light source 242, and a PDLC driver 116 which drives area electrodes used for driving the PDLC 1331 of the light guide section 130 are coupled to the control unit 110 via a bus 119. The control unit 110 outputs instructions to a driver. By doing so, the LCD panel 120, the first light source 241, the second light source 242, or area electrodes are controlled.

FIG. 18 illustrates the luminance distribution of light from the light sources of the display device according to the fourth embodiment. FIG. 18 is a plan view of the light guide section 130, the first light source 241, and the second light source 242 from the Z direction (see FIG. 16) and a graph indicative of the luminance of each area. A dotted line on the graph indicates the boundary between areas.

Each of the first light source 241 and the second light source 242 emits a uniform light from a side opposite the light guide section 130 toward the light guide section 130. Furthermore, the intensity of light emitted from at least one of the first light source 241 and the second light source 242 is controlled by controlling a drive current.

Hereinafter it is assumed that the luminance of the first light source 241 is uniform in the X direction. Furthermore, for example, the amount of light emitted may be controlled for each LED in the first light source 241 made up of a plurality of LEDs. The above description also applies to the second light source 242.

As illustrated in FIG. 18, as light from the first light source 241 travels further in the PDLC layer 133 from the area CH10 to the area CH1, its luminance decreases. On the other hand, light emitted from the second light source 242 enters the PDLC layer 133 from the second side of the light guide section 130 opposite the first light source 241. As the light emitted from the second light source 242 travels further in the PDLC layer 133 in a direction reverse to the direction in which the light from the first light source 241 travels, its luminance decreases. In the example of FIG. 18, it is assumed that the intensity of light emitted from the first light source 241 and the intensity of light emitted from the second light source 242 are the same. That is to say, the intensity of light from the first light source 241 at the time of entering the PDLC layer 133 from the first side and the intensity of light from the second light source 242 at the time of entering the PDLC layer 133 from the second side are the same.

In FIG. 18, the intensity of light from the first light source 241 in each area is indicated by a thick dotted line. The intensity of light from the first light source 241 which enters the light guide section 130 decreases as the distance from the first side increases, with the intensity of the light from the first light source 241 at the time of entering the PDLC layer 133 from the first side as reference. The intensity of light from the first light source 241 which enters each area is as follows:
CH10>CH9>CH8>CH7>CH6>CH5>CH4>CH3>CH2>CH1.

Furthermore, the intensity of light from the second light source 242 in each area is indicated by a dot-dash line. The intensity of light from the second light source 242 which enters the light guide section 130 decreases as the distance from the second side increases, with the intensity of the light from the second light source 242 at the time of entering the PDLC layer 133 from the second side as reference. The intensity of light from the second light source 242 which enters each area is as follows: CH1>CH2>CH3>CH4>CH5>CH6>CH7>CH8>CH9>CH10.

Total intensity indicates luminance obtained by totalizing the intensity of the light from the first light source 241 which enters an area and the intensity of the light from the second light source 242 which enters the area. In FIG. 18, the total intensity is indicated by a solid line. If the luminance distribution of the first light source 241 and the luminance distribution of the second light source 242 illustrated in FIG. 18 are obtained, then the total luminance becomes lower in a central area which occupies an intermediate position between the first light source 241 and the second light source 242.

If the intensity of light from the first light source 241 and the intensity of light from the second light source 242 differ, then the distribution of total intensity differs from that of the total intensity illustrated in FIG. 18. In this case, total intensity is also obtained by totalizing the luminance distribution of the first light source 241 alone and the luminance distribution of the second light source 242 alone.

Figure 19:
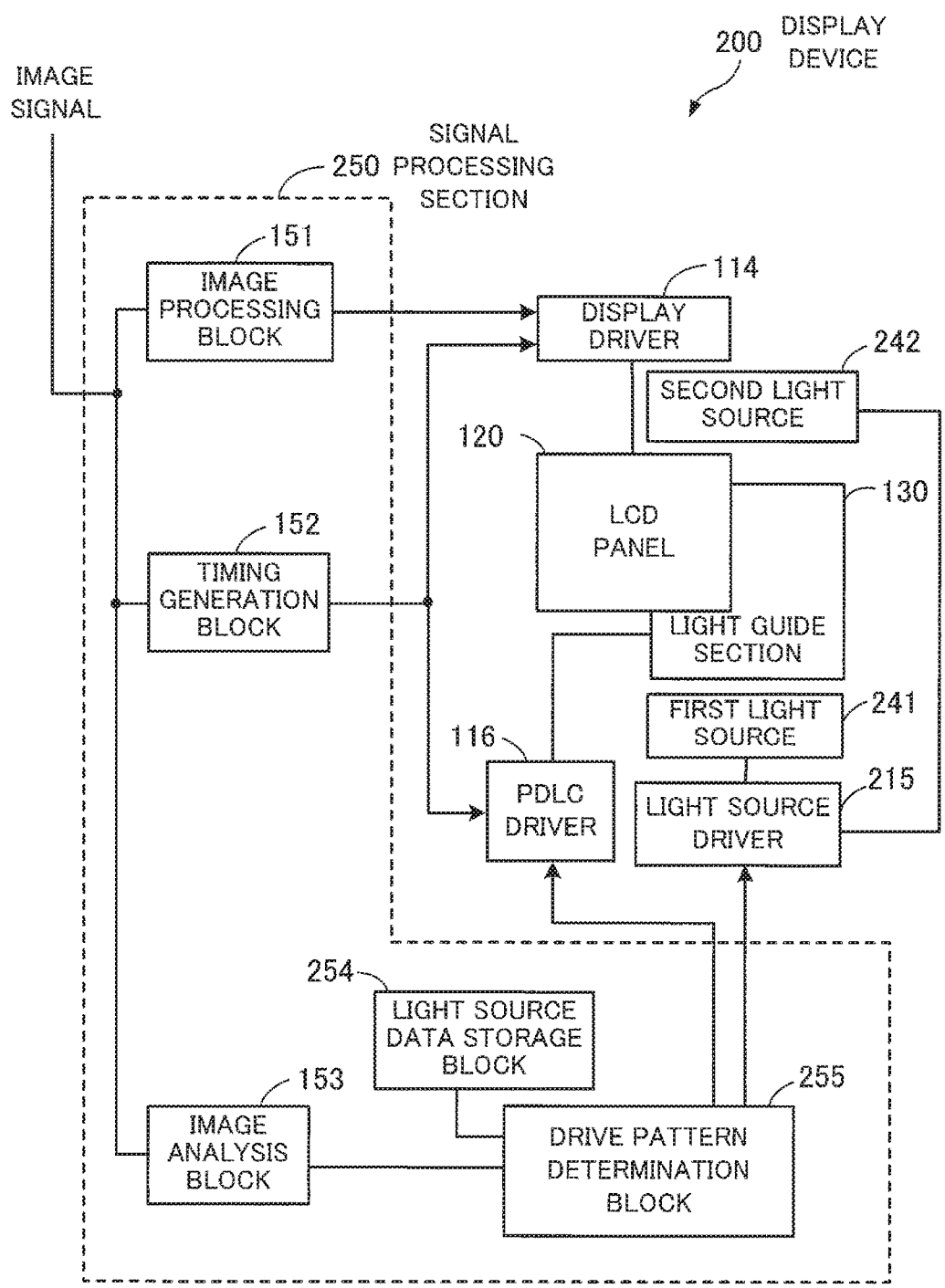
FIG. 19 illustrates an example of the structure of the functions of the display device according to the fourth embodiment.

FIG. 19 illustrates an example of the structure of the functions of the display device according to the fourth embodiment. Components in FIG. 19 which are the same as those of the display device 100 illustrated in FIG. 9 are marked with the same numerals and descriptions of them will be omitted.

With the display device 200 a signal processing section 250 accepts image signals in order, generates display signals, and drives a display driver 114. Furthermore, the signal processing section 250 generates a drive pattern used for backlight scanning on the basis of an image signal and uses the drive pattern for driving a light source driver 215 and a PDLC driver 116.

The light source driver 215 is coupled to the first light source 241 and the second light source 242. The light source driver 215 controls a light source current supplied to the first light source 241 on the basis of a drive pattern to control the intensity of light from the first light source 241 which enters the PDLC layer 133. Furthermore, the light source driver 215 controls a light source current supplied to the second light source 242 on the basis of the drive pattern to control the intensity of light from the second light source 242 which enters the PDLC layer 133. Individual light source drivers 215 may be used for the first light source 241 and the second light source 242.

An example of the signal processing section 250 will be described. The signal processing section 250 includes an image processing block 151, a timing generation block 152, an image analysis block 153, a light source data storage block 254, and a drive pattern determination block 255. The image processing block 151, the timing generation block 152, the image analysis block 153, and the drive pattern determination block 255 are realized by, for example, a processor such as the CPU. The light source data storage block 254 is realized by a storage area secured in the RAM, the ROM, or the like.

Processes performed by the image processing block 151 which generates a signal for image scanning, the timing generation block 152 which generates a timing signal for image scanning, and the image analysis block 153 which analyzes an image signal corresponding to an area for calculating a required luminance value are the same as those performed by the image processing block 151, the timing generation block 152, and the image analysis block 153 illustrated in FIG. 9.

The light source data storage block 254 stores luminance distribution tables in which the luminance of the backlight is recorded for respective areas. The light source data storage block 254 stores first luminance distribution tables obtained at the time of lighting the first light source 241 alone and second luminance distribution tables obtained at the time of lighting the second light source 242 alone. Furthermore, the light source data storage block 254 may store at need third luminance distribution tables obtained at the time of lighting both of the first light source 241 and the second light source 242.

With the first luminance distribution tables, for example, the first light source 241 is driven by a determined light source current and the areas are put into the scattering state under the same conditions. For example, the same conditions mean that the same voltage is applied to area electrodes and that scattering time is the same. The luminance of light emitted at this time from the areas is measured to draw up the first luminance distribution tables. Similarly, the second light source 242 is driven by a determined light source current and the areas are put into the scattering state under the same conditions. The luminance of light emitted at this time from the areas is measured to draw up the second luminance distribution tables. Furthermore, at need, both of the first light source 241 and the second light source 242 are driven by determined light source currents and the areas are put into the scattering state under the same conditions. The luminance of light emitted at this time from the areas is measured to draw up the third luminance distribution tables. In these luminance distribution tables, for example, measured luminance of the areas is associated with the areas.

The drive pattern determination block 255 determines a drive pattern of an area on the basis of a required luminance value acquired from the image analysis block 153 and a luminance distribution table. The drive pattern controls at least one of, for example, a light source current for driving the first light source 241, a light source current for driving the second light source 242, scattering time during which the PDLC driver 116 drives area electrodes in a target area, and a drive voltage applied to the area electrodes.

Figure 20:
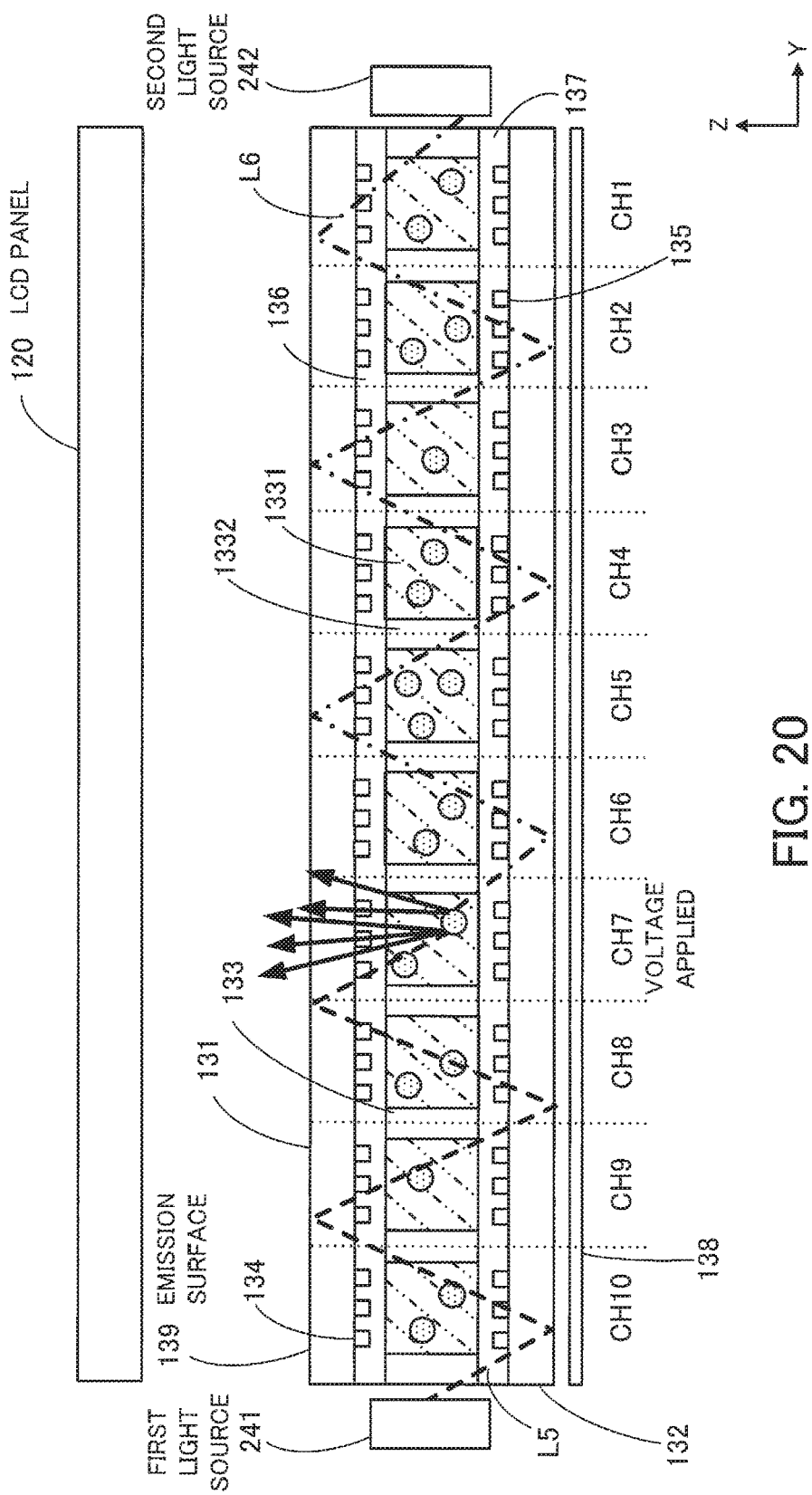
FIG. 20 illustrates partial drive of a backlight in the display device according to the fourth embodiment.

FIG. 20 illustrates partial drive of the backlight in the display device according to the fourth embodiment. In FIG. 20, light L5 from the first light source 241 which enters the PDLC layer 133 is indicated by a thick dotted line and light L6 from the second light source 242 which enters the PDLC layer 133 is indicated by a dot-dash line.

If the light L5 is not scattered in the PDLC layer 133, the light L5 travels in the Y direction from the area CH10 to the area CH1 while being totally reflected by the transparent substrates 131 and 132. If the light L6 is not scattered in the PDLC layer 133, the light L6 travels in a direction from the area CH1 to the area CH10 reverse to the Y direction while being totally reflected by the transparent substrates 131 and 132. The light L5 and the light L6 travel straight in a spacer 1332.

A drive voltage is applied to area electrodes in the area CH7 and the area CH7 is put into the scattering state. At this time the other areas are put into the transmission state. The light L5 travels in the areas CH10, CH9, and CH8 in the transmission state and enters the area CH7. Because the area CH7 is in the scattering state, the light L5 is scattered. On the other hand, the light L6 travels in the areas CH1, CH2, CH3, CH4, CH5, and CH6 in the transmission state and enters the area CH7. Because the area CH7 is in the scattering state, the light L6 is scattered. The light L5 emitted from the first light source 241 and the light L6 emitted from the second light source 242 are scattered in the area CH7 and part of the light L5 and the light L6 is emitted toward the LCD panel 120. Light which travels to the transparent substrate 132 side is returned into the PDLC 1331 by a reflection sheet 138. At this time it is visually recognized from the LCD panel 120 side that the light guide section 130 is in a state in which the area CH7 is luminous and in which the other areas are not luminous.

In this way, light emitted from the first light source 241 and light emitted from the second light source 242 are scattered by putting the areas into the scattering state in order. By doing so, backlight scanning is performed. Because light from two light sources is used, luminance is increased compared with a case where one light source is used.

In the fourth embodiment, in order to uniformize the luminance of the backlight, scattering time is uniformly distributed to the areas and drive currents of the first light source 241 and the second light source 242 are controlled. In the following description the first light source 241 and the second light source 242 are also indicated by LS1 and LS2 respectively.

(1) First Example

In a first example, a drive current of the second light source 242 is controlled to uniformize the luminance of the backlight.

Figure 21:
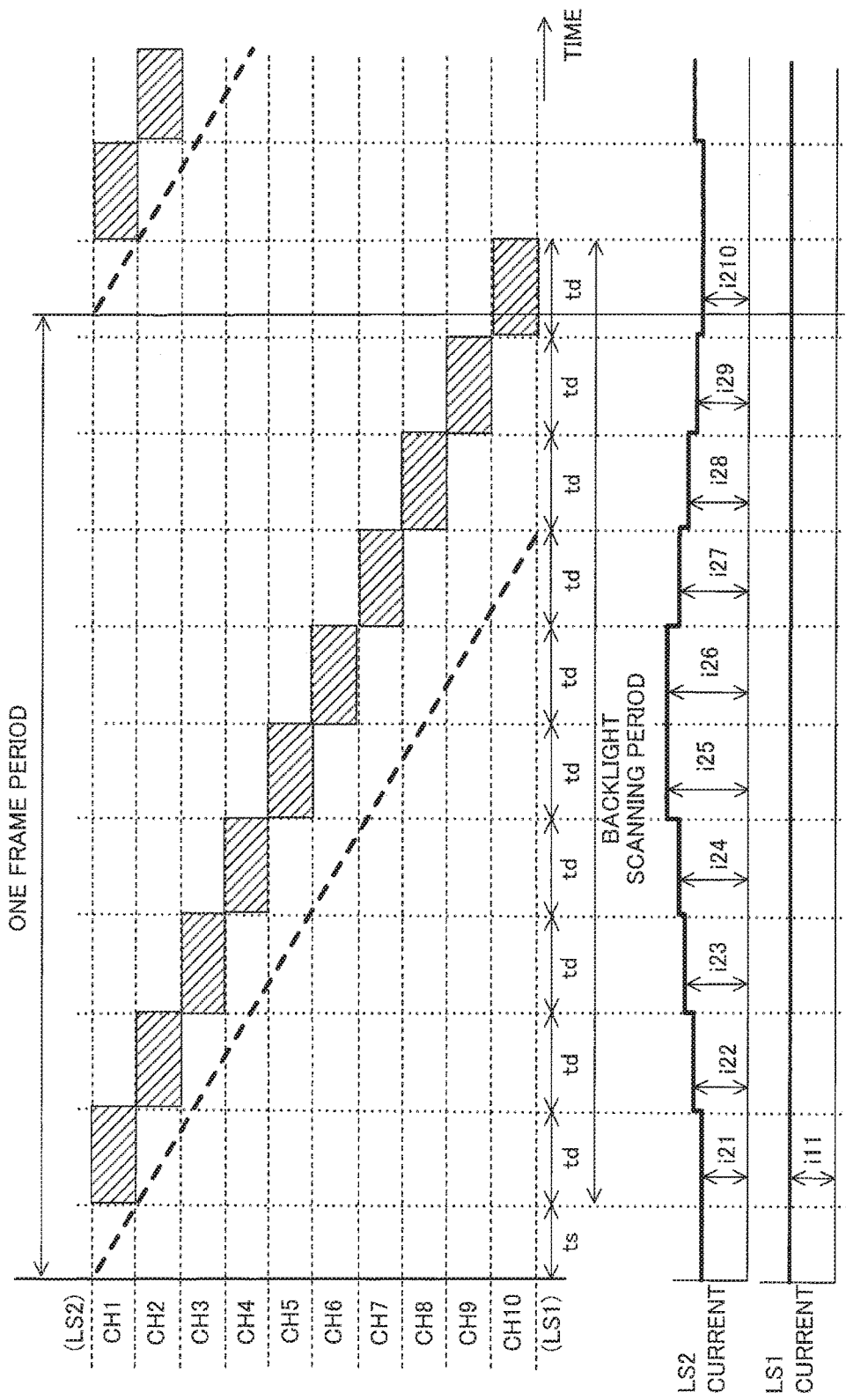
FIG. 21 illustrates a first example of a drive pattern of the display device according to the fourth embodiment.

FIG. 21 illustrates a first example of a drive pattern of the display device according to the fourth embodiment. In FIG. 21, a column in the vertical direction indicates the areas CH1 through CH10 and a row in the horizontal direction indicates time elapsed. This is the same with FIG. 11. Each time zone corresponding to the areas CH1 through CH10 in which nothing is stated is a period during which a corresponding area is in the transmission state. Furthermore, each time zone indicated by oblique lines is a period during which a corresponding area is driven so as to be in the scattering state. Moreover, a thick dotted line indicates image scanning. ts indicates time taken to perform image scanning on one area. td indicates a drive period assigned to each area in a backlight scanning period. Area electrodes are controlled in a drive period so that an area will be in the scattering state. Scattering time of an area in a drive period is properly controlled with the drive period as a maximum. In the first example, the backlight scanning period is uniformly distributed to all the areas and the drive period td is assigned to each area.

An LS1 current indicates a light source current supplied to the first light source 241. An LS2 current indicates a light source current supplied to the second light source 242.

In FIG. 21, an LS2 current i21 indicates the value of a current supplied to the second light source 242 for a period for which the area CH1 is put into the scattering state. Similarly, it is assumed that the values of LS2 currents supplied to the second light source 242 during drive periods of the areas CH2, CH3, CH4, CH5, CH6, CH7, CH8, CH9, and CH10 are i22, i23, i24, i25, i26, i27, i28, i29, and i210 respectively. The value of an LS1 current i11 supplied to the first light source 241 is constant.

In the fourth embodiment, a frame period is uniformly distributed to the areas CH1 through CH10 to set drive periods. Backlight scanning and image scanning are performed in the same direction. Furthermore, the backlight scanning is begun after the image scanning on the first area ends.

As long as the image scanning and the backlight scanning are performed in the same direction, scanning may be performed from the area CH10 to the area CH1.

If the intensity of light emitted from the first light source 241 and the intensity of light emitted from the second light source 242 are the same as illustrated in FIG. 18, then total intensity obtained by totalizing the intensity of the light emitted from the first light source 241 and the intensity of the light emitted from the second light source 242 becomes lower in a central area which occupies an intermediate position between the first light source 241 and the second light source 242. In the example of FIG. 18, the total luminance is lowest in the areas CH5 and CH6.

With the drive pattern in the first example an LS2 current of the second light source 242 is increased during drive periods of the central areas in which the total luminance decreases. In FIG. 21, the drive pattern is set on the basis of the amount of a decrease in the total luminance to satisfy i25>i24>i23>i22>i21, in which the LS2 current i25 is largest. Similarly, the drive pattern is set on the basis of the amount of a decrease in the total luminance to satisfy i26>i27>i28>i29>i210, in which the LS2 current i26 is largest. The total intensity of light from the first light source 241 which enters an area and light from the second light source 242 which enters the area decreases as the distance from the first light source 241 and the distance from the second light source 242 increase. The amount of the decrease in the total intensity is corrected by increasing the luminance of the second light source 242. As a result, the luminance of the backlight is uniformized in all the areas.

The image scanning is not synchronized with the backlight scanning. However, an image scanning period assigned to an area is shorter than a backlight scanning period. The reason for this is as follows. Full time corresponding to one frame is used as a backlight scanning period. On the other hand, an image scanning period is time obtained by subtracting a vertical blanking period from time corresponding to one frame. Therefore, at the time when the backlight scanning is begun, the image scanning on a target area has ended. As a result, before the backlight scanning is begun, a drive pattern based on an image signal is calculated. Accordingly, with the display device according to the fourth embodiment it is possible to perform a local dimming process without using a frame memory.

Figure 22A:
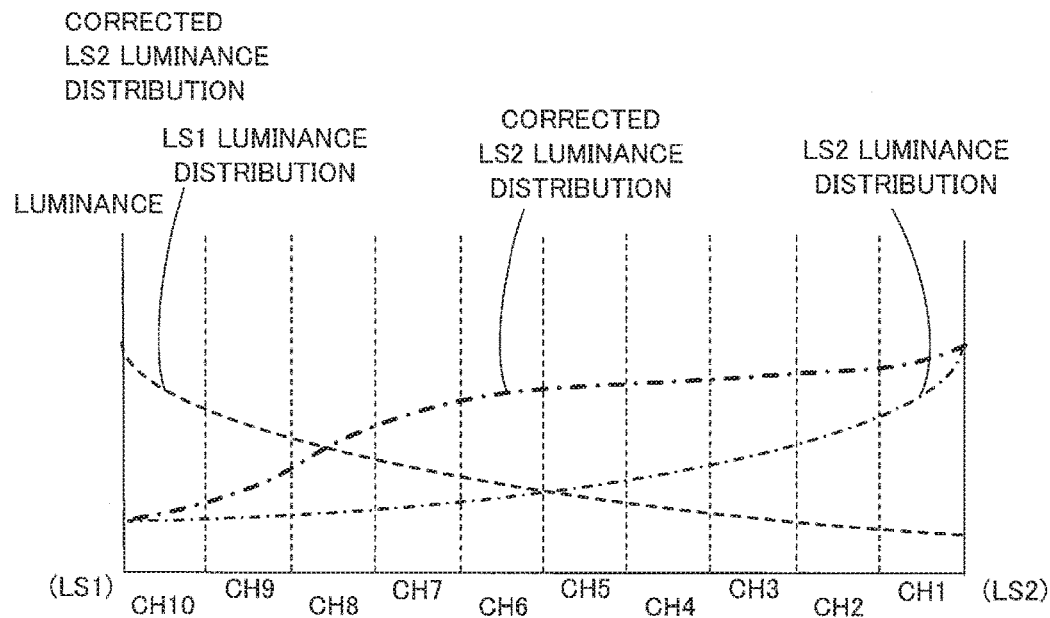
FIGS. 22A and 22B illustrate the luminance distribution of a backlight in the first example of a drive pattern of the display device according to the fourth embodiment.
Figure 22B:
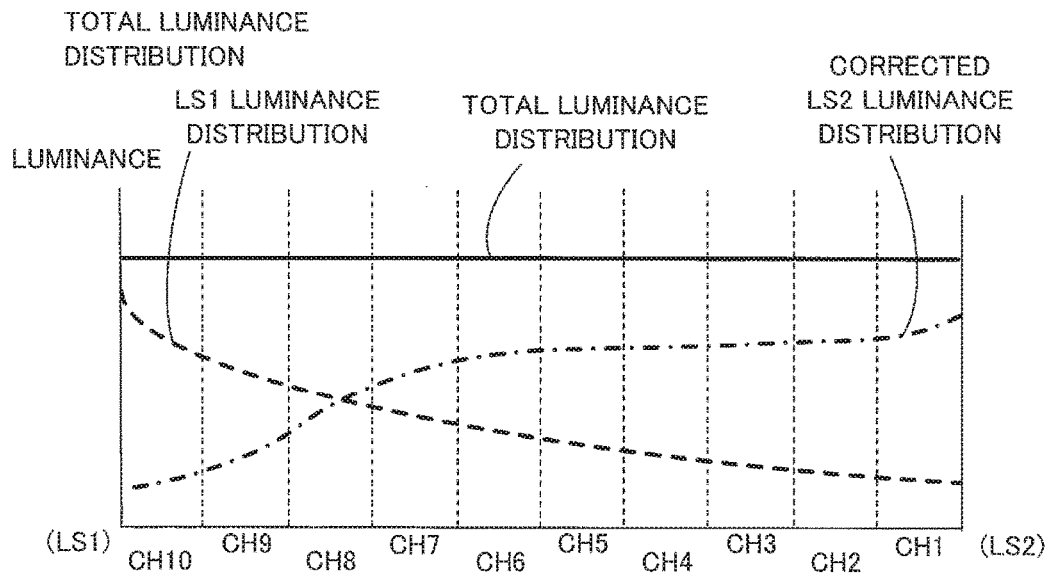

FIGS. 22A and 22B illustrate the luminance distribution of the backlight in the first example of a drive pattern of the display device according to the fourth embodiment.

Corrected LS2 luminance distribution in FIG. 22A describes the luminance distribution of the second light source (LS2) after a correction at the time of performing backlight scanning on the basis of the drive pattern in the first example.

LS1 luminance distribution is the luminance distribution of the backlight during a frame period at the time of driving each area under the same conditions with an LS1 current supplied to the first light source 241 constant. LS2 luminance distribution is the luminance distribution of the backlight during the frame period at the time of driving each area under the same conditions with an LS2 current supplied to the second light source 242 constant. If all the areas are driven under the same conditions, light which enters is scattered in the same way. Accordingly, the same luminance distribution that is illustrated in FIG. 18 is obtained.

The corrected LS2 luminance distribution indicates the luminance distribution of the backlight obtained at the time of driving the second light source 242 on the basis of the drive pattern in the first example. As illustrated in FIG. 18, if the LS1 luminance distribution and the LS2 luminance distribution are totalized, the total intensity of light which enters the areas CH5 and CH6 which occupy an intermediate position between the first light source 241 and the second light source 242 decreases. With the drive pattern in the first example the LS2 currents i25 and i26 supplied during the drive periods of the areas CH5 and CH6 in which the total luminance decreases are made larger than an LS2 current supplied during a drive period of another area. As a result, as indicated by the corrected LS2 luminance distribution, the intensity of backlight light based on the second light source 242 is increased in the areas CH5 and CH6.

Total luminance distribution in FIG. 22B indicates the luminance distribution of the backlight in each area after a correction made on the basis of the drive pattern in the first example. By totalizing the corrected LS2 luminance distribution after the correction and the LS1 luminance distribution, the total luminance distribution which is uniform in all the areas is obtained.

(2) Second Example

In a second example, a drive current of the first light source 241 is controlled to uniformize the luminance of the backlight.

Figure 23:
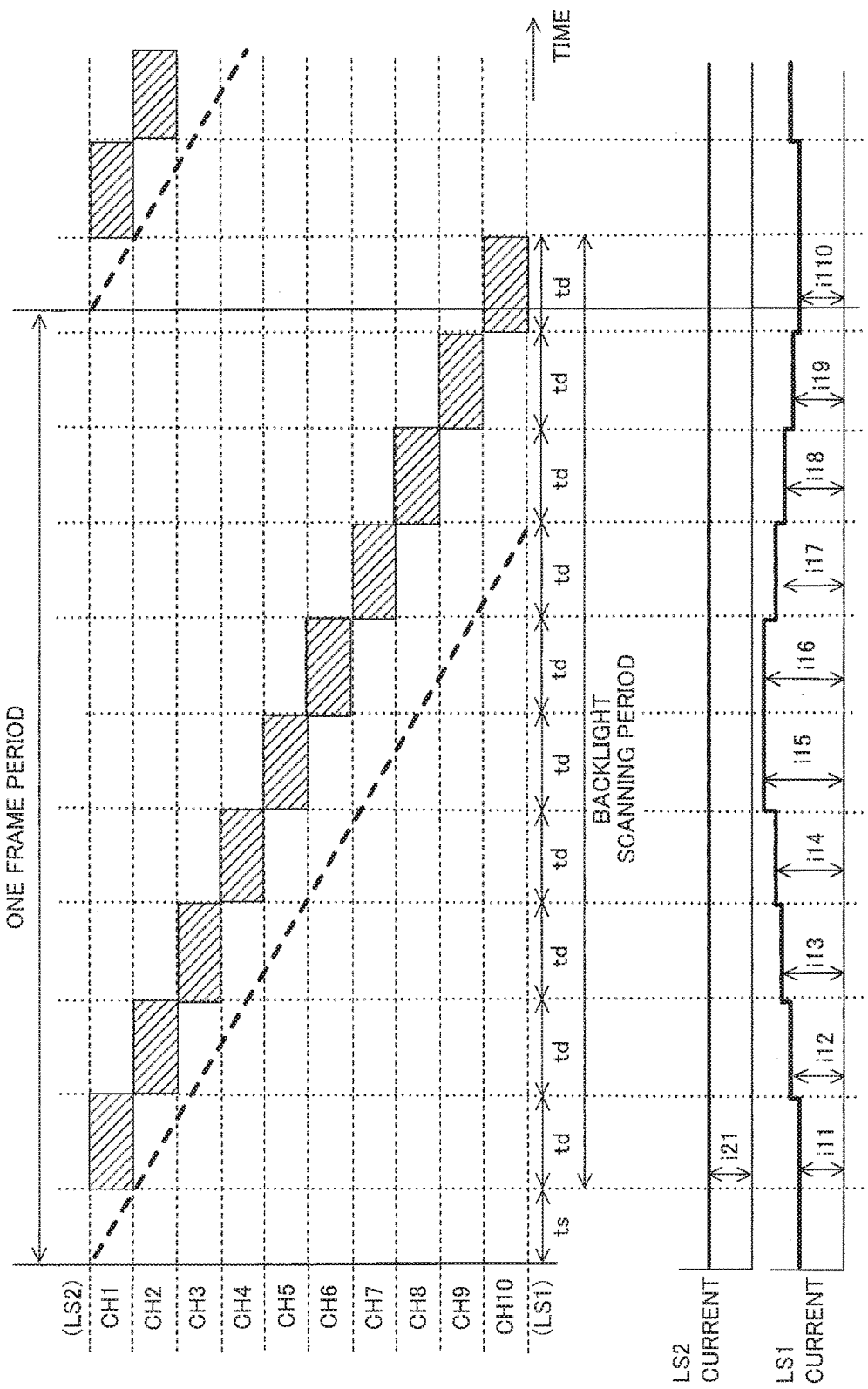
FIG. 23 illustrates a second example of a drive pattern of the display device according to the fourth embodiment.

FIG. 23 illustrates a second example of a drive pattern of the display device according to the fourth embodiment. The same names are given to elements in FIG. 23 which are the same as those in FIG. 21 and descriptions of them will be omitted. Furthermore, a time zone corresponding to an area in which nothing is stated is a period during which the area is in the transmission state. Moreover, a time zone indicated by oblique lines is a period during which a corresponding area is driven so as to be in the scattering state. In addition, a thick dotted line indicates image scanning. These are the same with FIG. 21.

In the second example, a drive current of the first light source 241 is controlled. Backlight scanning is performed in the same way as with the first example. With the drive pattern in the second example an LS1 current of the first light source 241 is increased during periods during which backlight scanning is performed on the central areas in which the total luminance decreases. In FIG. 23, the drive pattern is set on the basis of the amount of a decrease in the total luminance to satisfy i15>i14>i13>i12>i11, in which the LS1 current i15 is largest. Similarly, the drive pattern is set on the basis of the amount of a decrease in the total luminance to satisfy i16>i17>i18>i19>i110, in which the LS1 current i16 is largest. The total intensity of light from the first light source 241 which enters an area and light from the second light source 242 which enters the area decreases as the distance from the first light source 241 and the distance from the second light source 242 increase. The amount of the decrease in the total intensity is corrected by an LS1 current of the first light source 241. As a result, the luminance of the backlight is uniformized in all the areas.

Figure 24A:
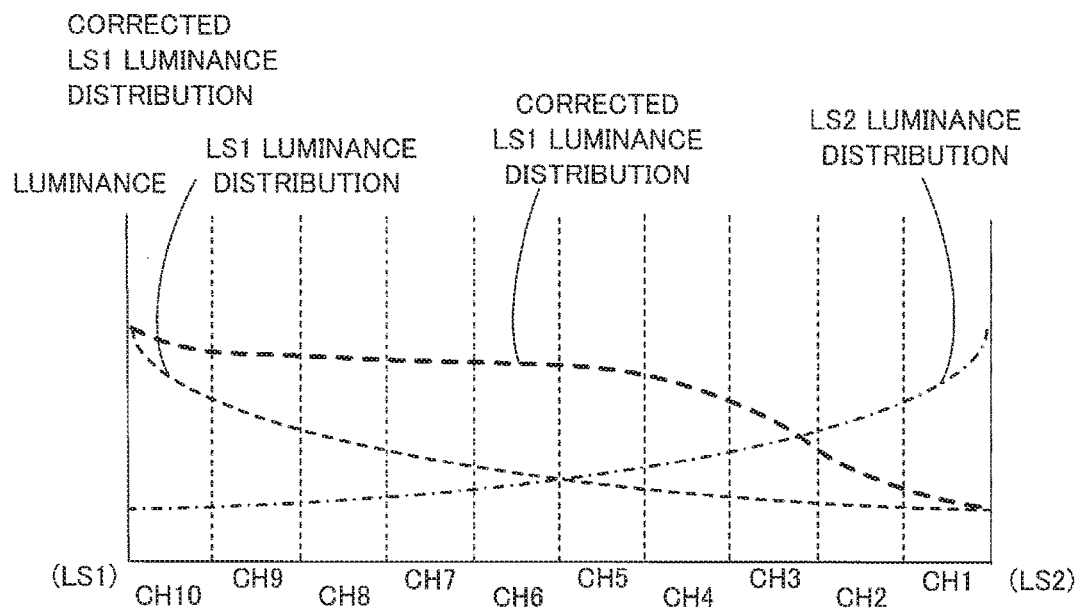
FIGS. 24A and 24B illustrate the luminance distribution of the backlight in the second example of a drive pattern of the display device according to the fourth embodiment.
Figure 24B:
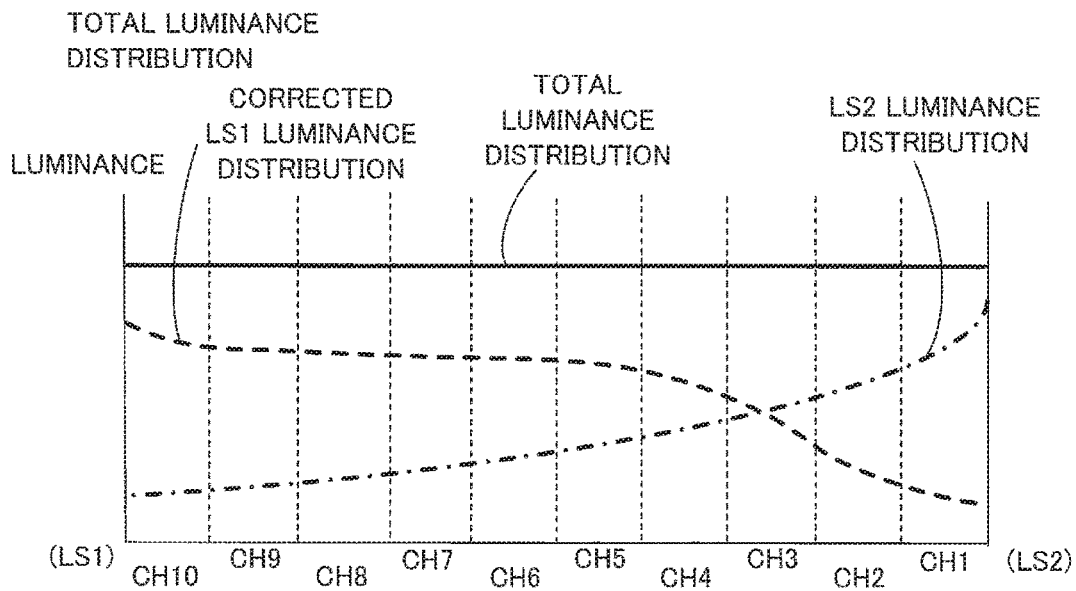

FIGS. 24A and 24B illustrate the luminance distribution of the backlight in the second example of a drive pattern of the display device according to the fourth embodiment.

Corrected LS1 luminance distribution in FIG. 24A describes the luminance distribution of the first light source 241 after a correction at the time of performing backlight scanning on the basis of the drive pattern in the second example. LS1 luminance distribution and LS2 luminance distribution in FIG. 24A are the same as those in FIG. 22A.

The corrected LS1 luminance distribution indicates the luminance distribution of the backlight obtained at the time of driving the first light source 241 on the basis of the drive pattern in the second example. With the drive pattern in the second example an LS1 current is controlled so as to make LS1 currents i15 and i16 corresponding to the areas CH5 and CH6 in which the total luminance decreases largest. As a result, as indicated by the corrected LS1 luminance distribution, the luminance of the backlight based on the first light source 241 is increased in the areas CH5 and CH6.

Total luminance distribution in FIG. 24B indicates the luminance distribution of the backlight in each area after a correction made on the basis of the drive pattern in the second example. By totalizing the corrected LS1 luminance distribution after the correction and the LS2 luminance distribution, the total luminance distribution which is uniform in all the areas is obtained.

(3) Third Example

In a third example, an LS1 current of the first light source 241 and an LS2 current of the second light source 242 are controlled to uniformize the luminance of the backlight.

FIG. 25 illustrates a third example of a drive pattern of the display device according to the fourth embodiment. The same names are given to elements in FIG. 25 which are the same as those in FIG. 21 and descriptions of them will be omitted.

In the third example, an LS1 current of the first light source 241 and an LS2 current of the second light source 242 are controlled. Backlight scanning is performed in the same way as with the first example. With the drive pattern in the third example an LS1 current of the first light source 241 and an LS2 current of the second light source 242 are increased during periods during which backlight scanning is performed on the central areas in which the total luminance decreases.

As illustrated in FIG. 25, with the first light source 241 the drive pattern is set on the basis of the amount of a decrease in the total luminance to satisfy i15>i14>i13>i12>i11, in which the LS1 current i15 is largest. Similarly, the drive pattern is set on the basis of the amount of a decrease in the total luminance to satisfy i16>i17>i18>i19>i110, in which the LS1 current i16 is largest.

In addition, with the second light source 242 the drive pattern is set on the basis of the amount of a decrease in the total luminance to satisfy i25>i24>i23>i22>i21, in which the LS2 current i25 is largest. Similarly, the drive pattern is set on the basis of the amount of a decrease in the total luminance to satisfy i26>i27>i28>i29>i210, in which LS2 current i26 is largest.

The total intensity of light from the first light source 241 which enters an area and light from the second light source 242 which enters the area decreases as the distance from the first light source 241 and the distance from the second light source 242 increase. The amount of the decrease in the total intensity is corrected by controlling an LS1 current of the first light source 241 and an LS2 current of the second light source 242. As a result, the luminance of the backlight is uniformized in all the areas. In the third example the amount of a decrease in the luminance of the backlight in an area is corrected by the two light sources, that is to say, by the first light source 241 and the second light source 242. This suppresses the amount of an increase in drive current per light source. Therefore, when a drive current is increased, the load on each of the first light source 241 and the second light source 242 is reduced.

Figure 26A:
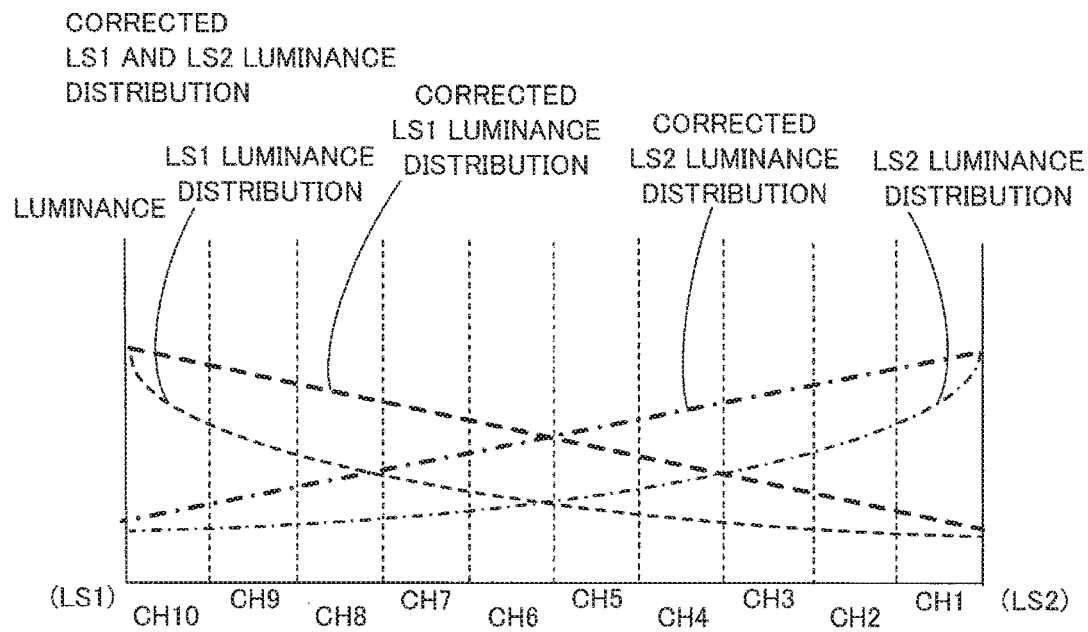
FIGS. 26A and 26B illustrate the luminance distribution of the backlight in the third example of a drive pattern of the display device according to the fourth embodiment.
Figure 26B:
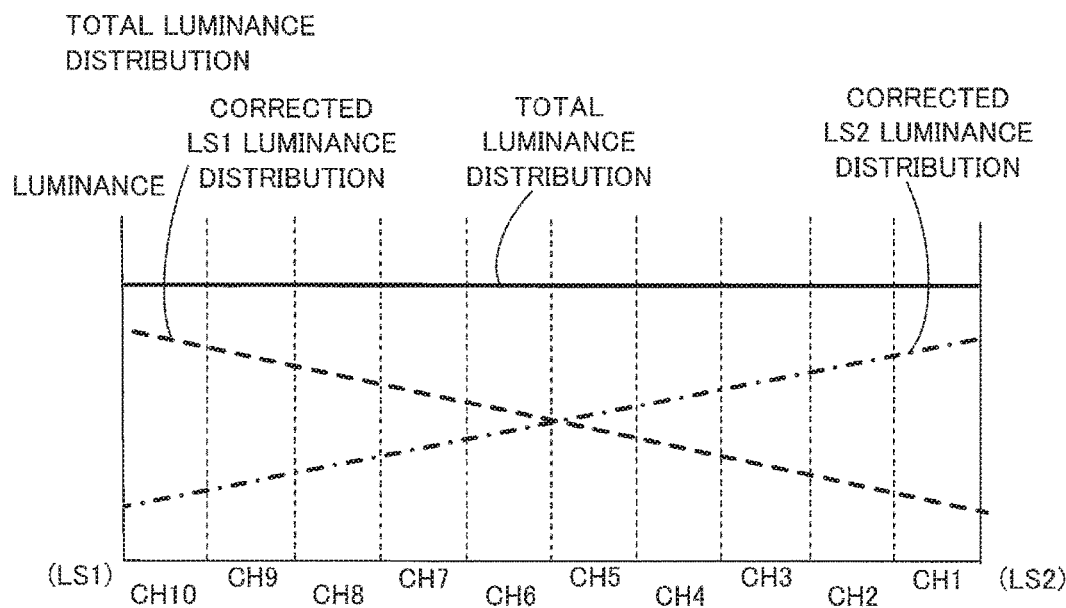

FIGS. 26A and 26B illustrate the luminance distribution of the backlight in the third example of a drive pattern of the display device according to the fourth embodiment.

Corrected LS1 luminance distribution and corrected LS2 luminance distribution in FIG. 26A describe the luminance distribution of the first light source 241 after a correction and the luminance distribution of the second light source 242 after a correction, respectively, at the time of performing backlight scanning on the basis of the drive pattern in the third example. LS1 luminance distribution and LS2 luminance distribution in FIG. 26A are the same as those in FIG. 22A.

The corrected LS1 luminance distribution indicates the luminance distribution of the backlight obtained at the time of driving the first light source 241 on the basis of the drive pattern in the third example. With the drive pattern in the third example a drive current is controlled so as to make LS1 currents i15 and i16 supplied during drive periods of the areas CH5 and CH6 in which the total luminance decreases largest. Furthermore, the corrected LS2 luminance distribution indicates the luminance distribution of the backlight obtained at the time of driving the second light source 242 on the basis of the drive pattern in the third example. With the drive pattern in the third example an LS2 current is controlled so as to make LS2 currents i25 and i26 supplied during the drive periods of the areas CH5 and CH6 in which the total luminance decreases largest. An LS1 current of the first light source 241 and an LS2 current of the second light source 242 are set so that the amount of a decrease in the luminance of the backlight will be corrected by both of them. As a result, as indicated by the corrected LS1 luminance distribution, the luminance of the backlight based on the first light source (LS1) 241 is increased in the areas CH5 and CH6.

Total luminance distribution in FIG. 26B indicates the luminance distribution of the backlight in each area after a correction made on the basis of the drive pattern in the third example. By totalizing the corrected LS1 luminance distribution after the correction and the corrected LS2 luminance distribution after the correction, the total luminance distribution which is uniform in all the areas is obtained.

As illustrated in FIG. 18, a case where the first light source 241 and the second light source 242 are equal in the relationship between the intensity of light which enters an area and the distance between the area and the incident surface is described in the above examples. In the example of FIG. 18, each of the luminance distribution of the first light source 241 and the luminance distribution of the second light source 242 is line-symmetric with respect to a boundary between the areas CH5 and CH6 in the middle of a display surface. With the display device according to the fourth embodiment, however, the luminance distribution of a light source is not limited to the above luminance distribution. In the fourth embodiment, on the basis of the amount of a decrease in the luminance of the backlight in an area and the luminance distribution of the backlight obtained at the time of driving a light source to be driven by supplying a determined drive current, a drive current for correcting the amount of the decrease in the luminance of the backlight is calculated.

As has been described, in the first example, the second example, and the third example, a drive current of a light source is controlled to uniformize the luminance of the backlight. However, a drive pattern of the display device according to the fourth embodiment is not limited to the above drive patterns. Embodiments in which display devices having the same structure as the display device according to the fourth embodiment has exercise backlight control by the use of other drive patterns will be described below. Display devices according to embodiments described below have the same structure as the display device 200 illustrated in FIG. 16 has. A first light source 241 and a second light source 242 are disposed near sides of a light guide section 130 opposite each other. Furthermore, the luminance distribution of the first light source 241, the luminance distribution of the second light source 242, and total luminance are the same as those indicated in FIG. 18.

Fifth Embodiment

A display device according to a fifth embodiment will be described. In a fifth embodiment, a drive period assigned to each area is controlled to uniformize the luminance of a backlight.

Figure 27:
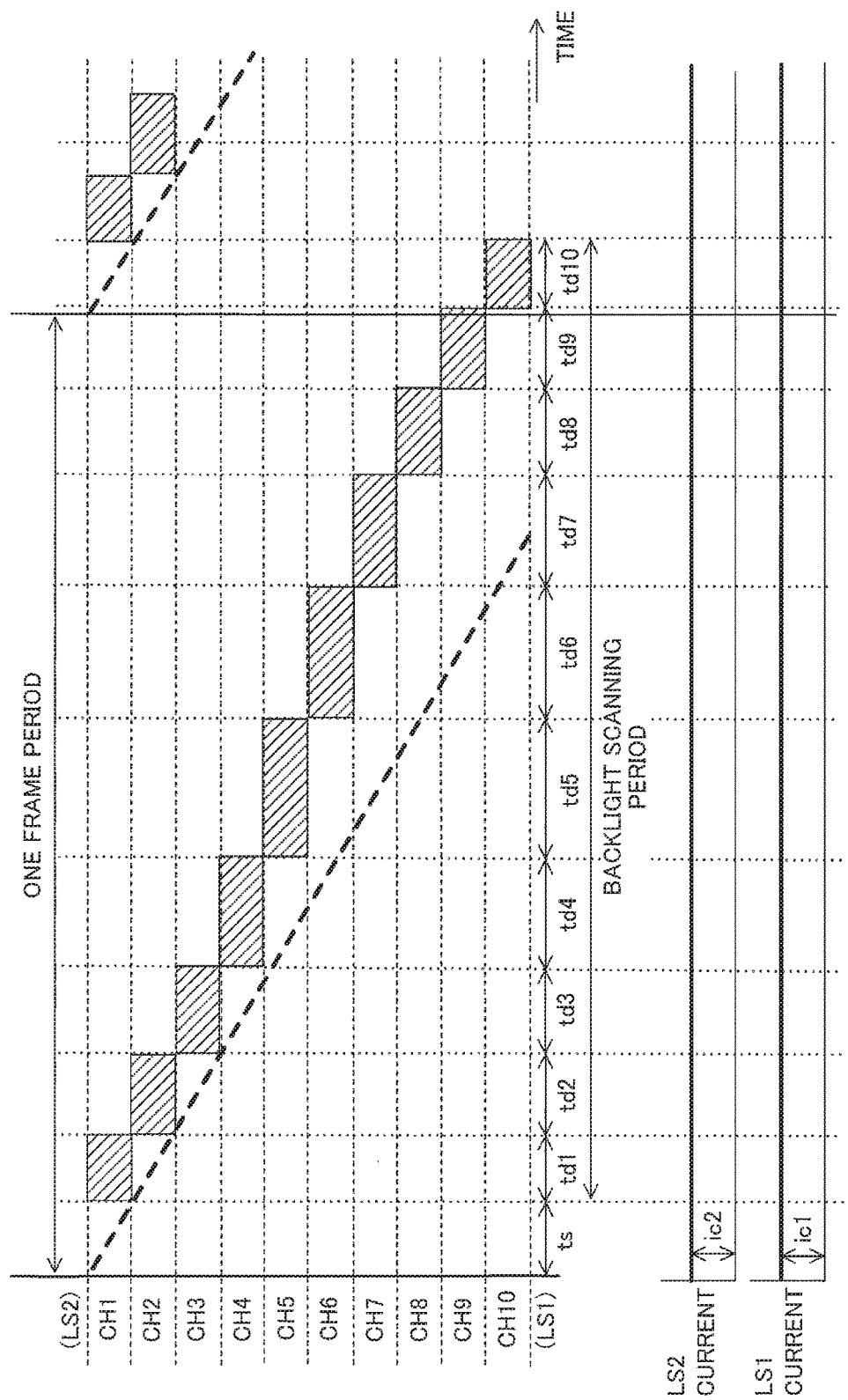
FIG. 27 illustrates an example of a drive pattern of a display device according to a fifth embodiment.

FIG. 27 illustrates an example of a drive pattern of a display device according to a fifth embodiment. The same names are given to elements in FIG. 27 which are the same as those in FIG. 21 and descriptions of them will be omitted. Furthermore, a time zone corresponding to an area in which nothing is stated is a period during which the area is in the transmission state. Moreover, a time zone indicated by oblique lines is a period during which a corresponding area is driven so as to be in the scattering state. In addition, a thick dotted line indicates image scanning. These are the same with FIG. 21. As with FIG. 18, FIG. 27 illustrates an example of a case where the total luminance of the first light source 241 and the second light source 242 becomes lower in central areas which occupy an intermediate position between the first light source 241 and the second light source 242.

With the drive pattern in the fifth embodiment, backlight scanning and image scanning are performed in the same direction. Furthermore, the value of an LS1 current ic1 for driving the first light source 241 and the value of an LS2 current ic2 for driving the second light source 242 are constant and a drive period td is controlled. td1 indicates a drive period assigned to an area CH1 in a backlight scanning period. Similarly, drive periods assigned to areas CH2, CH3, CH4, CH5, CH6, CH7, CH8, CH9, and CH10 are indicated by td2, td3, td4, td5, td6, td7, td8, td9, and td10 respectively. ts indicates time taken to perform image scanning on one area. In the fifth embodiment, a drive period td during which required luminance is obtained is determined on the basis of the total luminance of light which enters an area. Therefore, scattering time corresponds to a drive period.

As illustrated in FIG. 27, with the drive pattern in the fifth embodiment the drive period td5 of a central area in which the total luminance of incident light decreases is set to a long period on the basis of the amount of the decrease in the total luminance. With the drive pattern in the fifth embodiment the drive periods td5 and td6 of the central areas CH5 and CH6 are made long to increase the luminance of the backlight. In FIG. 27, setting of a drive period of each area is as follows: td5, td6>td4, td7>td3, td8>td2, td9>td1, td10.

In this way, the luminance of the backlight decreases as the distance from the first light source 241 and the distance from the second light source 242 increases. With the drive pattern in the fifth embodiment the amount of the decrease in the luminance of the backlight is corrected by a drive period assigned to each area. In the example of FIG. 27, drive periods of the areas CH5 and CH6 in which the total luminance of incident light is low are longer than a drive period of another area in which the total luminance of incident light is high. As has been described, with the drive pattern in the fifth embodiment total luminance during a frame period is uniformized by controlling a drive period assigned to an area.

Figure 28A:
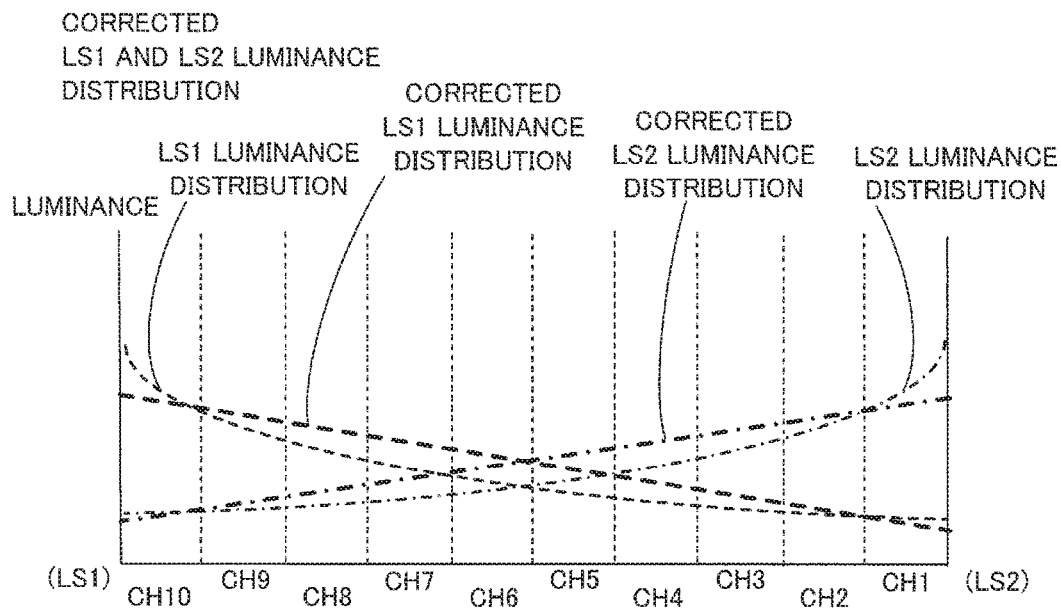
FIGS. 28A and 28B illustrate the luminance distribution of a backlight in the display device according to the fifth embodiment.
Figure 28B:
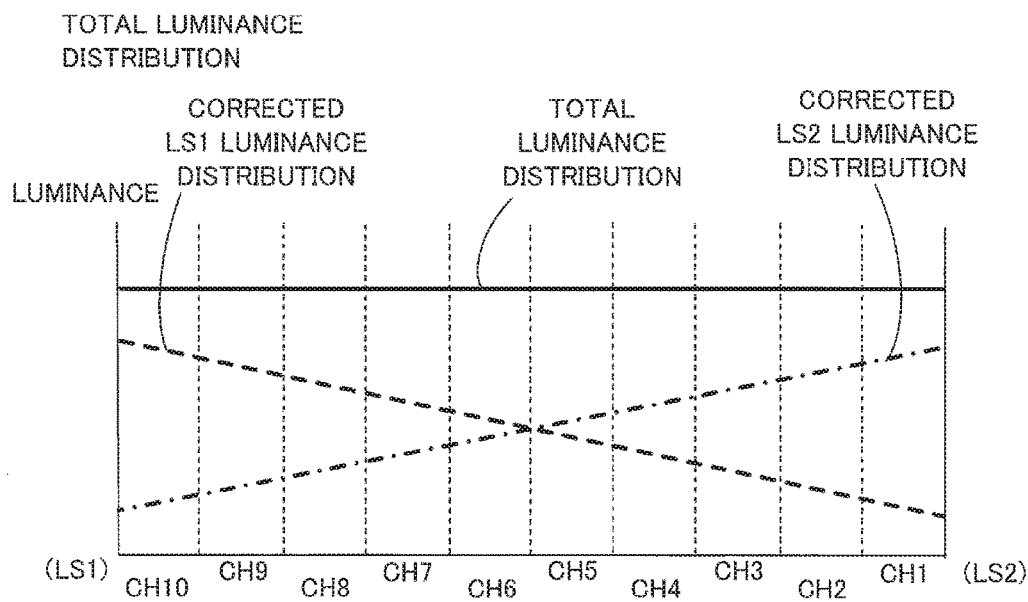

FIGS. 28A and 28B illustrate the luminance distribution of the backlight in the display device according to the fifth embodiment.

Corrected LS1 luminance distribution and corrected LS2 luminance distribution in FIG. 28A describe the luminance distribution of the first light source (LS1) after a correction and the luminance distribution of the second light source (LS2) after a correction, respectively, at the time of performing backlight scanning on the basis of the drive pattern in the fifth embodiment.

LS1 luminance distribution is the luminance distribution of the areas obtained during a frame period at the time of driving the areas under the same conditions with an LS1 current supplied to the first light source 241 constant. LS2 luminance distribution is the luminance distribution of the areas obtained during the frame period at the time of driving the areas under the same conditions with an LS2 current supplied to the second light source 242 constant.

Each of the corrected LS1 luminance distribution and the corrected LS2 luminance distribution indicates the luminance distribution of the backlight obtained at the time of driving the areas on the basis of the drive pattern in the fifth embodiment so as to put the areas into the scattering state. As illustrated in FIG. 18, if the LS1 luminance distribution and the LS2 luminance distribution are totalized, the total luminance of light which enters the areas CH5 and CH6 which occupy an intermediate position between the first light source 241 and the second light source 242 decreases. With the drive pattern in the fifth embodiment drive periods are assigned so that scattering time of the areas CH5 and CH6 in which the total luminance decreases will be long. As a result, as indicated by total luminance distribution, the luminance of the backlight in the areas CH5 and CH6 is increased.

The total luminance distribution in FIG. 28B indicates the luminance distribution of the backlight in each area after a correction made on the basis of the drive pattern in the fifth embodiment. By totalizing the corrected LS1 luminance distribution after the correction and the corrected LS2 luminance distribution after the correction, the total luminance distribution which is uniform in all the areas is obtained.

Sixth Embodiment

A display device according to a sixth embodiment will be described. In a sixth embodiment, time not used as scattering time of a drive period assigned to each area is utilized to uniformize the luminance of a backlight.

Figure 29:
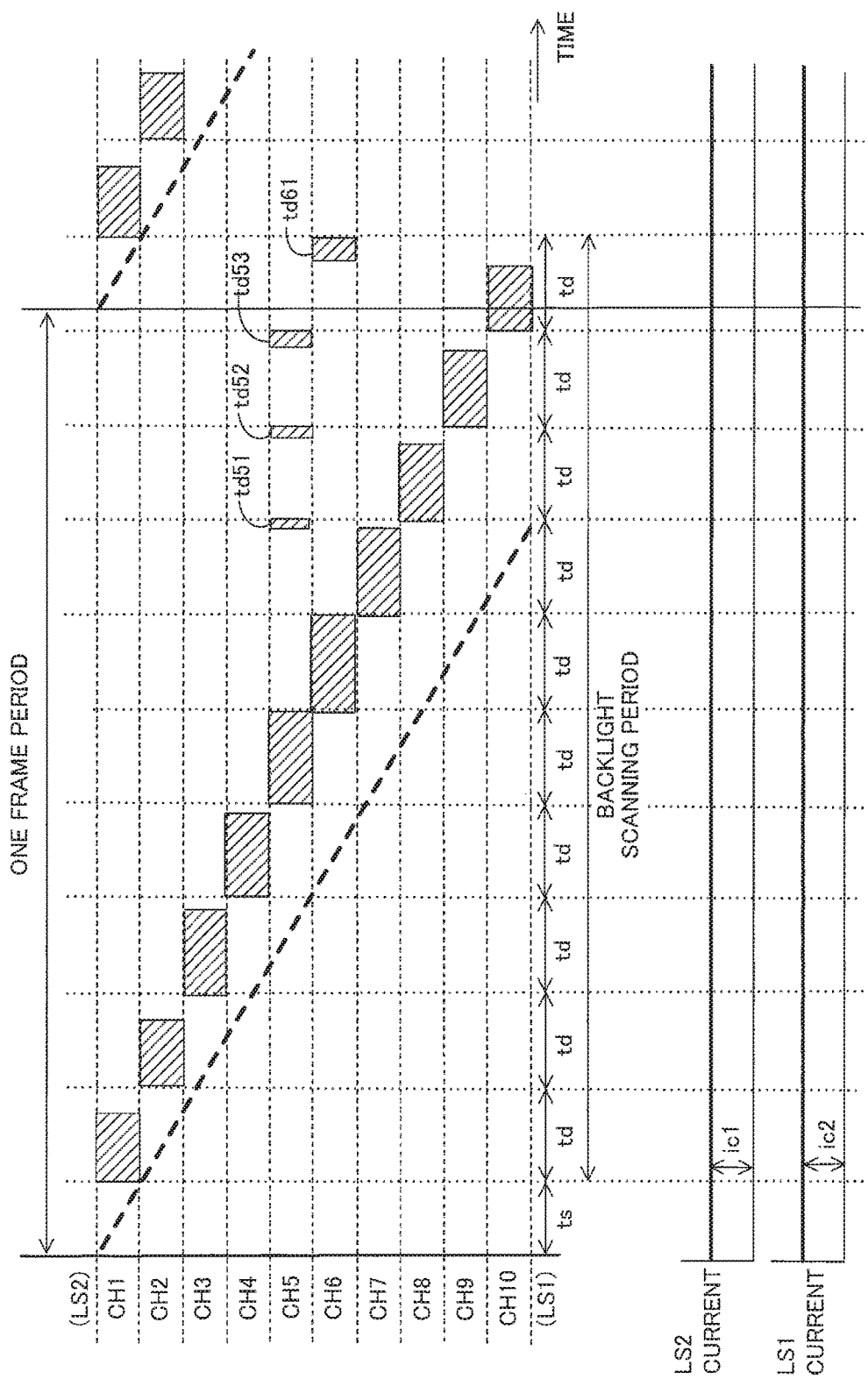
FIG. 29 illustrates an example of a drive pattern of a display device according to a sixth embodiment.

FIG. 29 illustrates an example of a drive pattern of a display device according to a sixth embodiment. The same names are given to elements in FIG. 29 which are the same as those in FIG. 21 and descriptions of them will be omitted. Furthermore, a time zone corresponding to an area in which nothing is stated is a period during which the area is in the transmission state. Moreover, a time zone indicated by oblique lines is a period during which a corresponding area is driven so as to be in the scattering state. In addition, a thick dotted line indicates image scanning. These are the same with FIG. 21.

With the drive pattern in the sixth embodiment, an LS1 current of a first light source 241 is ic1, an LS2 current of a second light source 242 is ic2, and the values of ic1 and ic2 are constant. Furthermore, drive periods td are uniformly assigned to all areas. In this case, the luminance of light which enters an area has the characteristic indicated in FIG. 18 if all of each drive period td is used as scattering time. As a result, uniform luminance is not obtained. With the drive pattern in the sixth embodiment scattering time of an area in which the luminance of incident light is high is made shorter than scattering time of another area on the basis of the total luminance of the first light source 241 and the second light source 242 indicated in FIG. 18. In an area whose scattering time is made short, (drive period)>(scattering time). This means that there is a period during which light emitted from a light source is not utilized. A period during which light emitted from a light source is not utilized is an idle period. With the drive pattern in the sixth embodiment an idle period is assigned to an area in which the luminance of incident light is low to increase the luminance of the backlight.

In the example of FIG. 29, idle periods of areas CH7, CH8, CH9, and CH10 near the first light source 241 in which the luminance of incident light is high are assigned to areas CH5 and CH6 in which the luminance of incident light is low. With the drive pattern of FIG. 29 the idle periods of areas CH7, CH8, and CH9 are assigned to the area CH5. Similarly, the idle period of the area CH10 is assigned to the area CH6. In this way, by assigning the idle periods to the areas CH5 and CH6 in which the luminance of incident light is low, scattering time of the areas CH5 and CH6 is increased. As a result, the luminance of the backlight in the areas CH5 and CH6 is increased.

Seventh Embodiment

A display device according to a seventh embodiment will be described. In a seventh embodiment, backlight scanning is performed in synchronization with image scanning and a vertical blanking period is utilized. By doing so, the luminance of a backlight is uniformized.

FIG. 30 illustrates an example of a drive pattern of a display device according to a seventh embodiment. The same names are given to elements in FIG. 30 which are the same as those in FIG. 21 and descriptions of them will be omitted. Furthermore, a time zone corresponding to an area in which nothing is stated is a period during which the area is in the transmission state. Moreover, a time zone indicated by oblique lines is a period during which a corresponding area is driven so as to be in the scattering state. In addition, a thick dotted line indicates image scanning. These are the same with FIG. 21.

With the drive pattern in the seventh embodiment control is exercised so as to make the value of an LS1 current ic1 of a first light source 241 and the value of an LS2 current ic2 of a second light source 242 constant. A backlight scanning period includes a main lighting period corresponding to an image scanning period and a luminance increase period corresponding to a vertical blanking period.

A period which is the same as an image scanning period ts of each area is assigned as a drive period in the main lighting period. As a result, backlight scanning is performed in synchronization with image scanning during the main lighting period.

Scattering time of each area is controlled during the luminance increase period on the basis of the total intensity of incident light. The total intensity of light which enters an area is determined by the intensity of light emitted from the first light source 241, the distance between the area and a first side, the intensity of light emitted from the second light source 242, and the distance between the area and a second side. The drive pattern illustrated in FIG. 30 is a drive pattern used in the case of the total luminance of light which enters an area indicating the luminance distribution of FIG. 18. Control is exercised during the luminance increase period so as to make scattering time of areas CH5 and CH6 in which the total intensity of incident light is low long.

As has been described, control is exercised in the luminance increase period on the basis of the distribution of the total intensity of incident light so as to put the areas CH5 and CH6 in which the luminance of the backlight is low into the scattering state. If the luminance of the backlight in an area obtained in the main lighting period does not reach the reference luminance of the backlight, then a drive period in the luminance increase period is determined so as to make up for a deficiency. This makes it possible to uniformize the luminance of the backlight in all the areas.

With the drive patterns in the fourth through seventh embodiments the first light source (LS1) 241 and the second light source (LS2) 242 are lit at the same time. Drive patterns in which the first light source (LS1) 241 and the second light source (LS2) 242 are properly selected to realize power saving will now be described.

Eighth Embodiment

A display device according to an eighth embodiment will be described. In an eighth embodiment, one of a first light source 241 and a second light source 242 is selected and lit to uniformize the luminance of a backlight and realize power saving.

FIG. 31 illustrates an example of a drive pattern of a display device according to an eighth embodiment. The same names are given to elements in FIG. 31 which are the same as those in FIG. 21 and descriptions of them will be omitted. Furthermore, a time zone corresponding to an area in which nothing is stated is a period during which the area is in the transmission state. Moreover, a time zone indicated by oblique lines is a period during which a corresponding area is driven so as to be in the scattering state. In addition, a thick dotted line indicates image scanning. These are the same with FIG. 21.

With the drive pattern illustrated in FIG. 31, control is exercised so as to make the value of an LS1 current ic1 of the first light source 241 and the value of an LS2 current ic2 of the second light source 242 constant. Furthermore, a backlight scanning period is distributed so as to make, on the basis of the total luminance of light which enters each area, a drive period of an area in which total luminance is low long. A drive period is scattering time. With the drive pattern illustrated in FIG. 31, a drive period td5 of a central area CH5 and a drive period td6 of a central area CH6 are made long to uniformize the luminance of the backlight. In this case, the second light source 242 is on and the first light source 241 is off, during drive periods of areas CH1 through CH5 near the second light source 242. In addition, the first light source 241 is on and the second light source 242 is off, during scattering time of areas CH6 through CH10 near the first light source 241. As indicated in FIG. 18, the intensity of light from the first light source 241 or the second light source 242 which enters an area decreases with an increase in the distance between the first light source 241 or the second light source 242 and the area. In this way, a light source is selected on the basis of the amount of a decrease in the intensity of incident light corresponding to the distance between a target area and a first side or a second side.

Figure 32A:
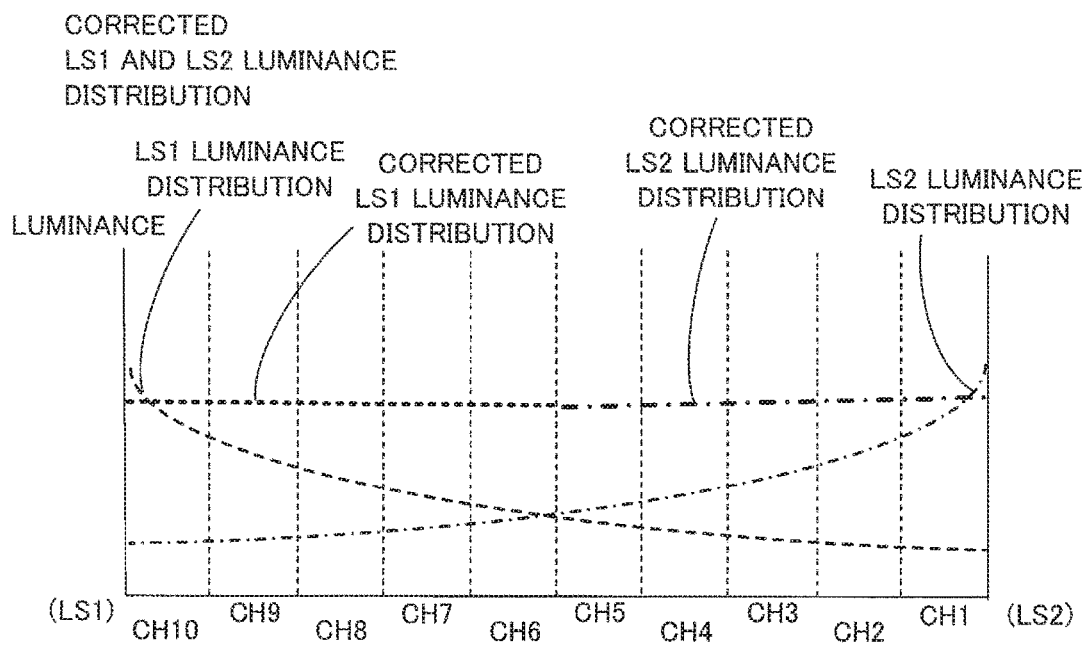
FIGS. 32A and 32B illustrate the luminance distribution of a backlight in the display device according to the eighth embodiment.
Figure 32B:
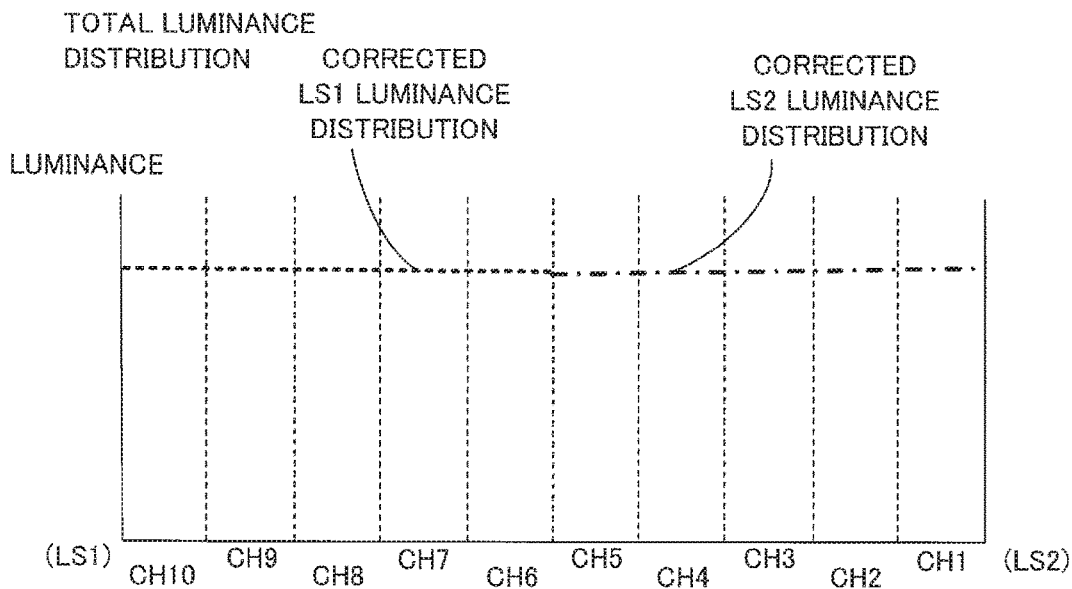

FIGS. 32A and 32B illustrate the luminance distribution of the backlight in the display device according to the eighth embodiment.

Corrected LS1 luminance distribution and corrected LS2 luminance distribution in FIG. 32A describe the luminance distribution of the first light source (LS1) after a correction and the luminance distribution of the second light source (LS2) after a correction, respectively, at the time of performing backlight scanning on the basis of the drive pattern in the eighth embodiment.

Each of LS1 luminance distribution and LS2 luminance distribution indicates the intensity distribution of light which enters each area with the luminance distribution indicated in FIG. 18 and which is emitted via a PDLC layer 133 driven under the same conditions.

The corrected LS1 luminance distribution indicates the intensity distribution of light from the first light source 241 emitted from an emission surface 139 as backlight light at the time of driving each area on the basis of the drive pattern in the eighth embodiment so as to put each area into the scattering state. The corrected LS2 luminance distribution indicates the intensity distribution of light from the second light source 242 emitted from the emission surface 139 as backlight light at the time of driving each area on the basis of the drive pattern in the eighth embodiment so as to put each area into the scattering state.

Total luminance distribution in FIG. 32B indicates the luminance distribution of the backlight in each area after a correction made on the basis of the drive pattern in the eighth embodiment. By totalizing the corrected LS1 luminance distribution after the correction and the corrected LS2 luminance distribution after the correction, the total luminance distribution which is uniform in all the areas is obtained.

With the drive pattern in the eighth embodiment, of the first light source 241 and the second light source 242, one nearer an area, that is to say, one the luminance of incident light from which is higher in an area is selected and lit. Because the amount of a correction corresponding to the amount of a decrease in the intensity of light which enters an area near a light source is small, light emission efficiency is good. As a result, power consumption is low compared with a display device in which a light source is disposed only near one side.

When an area is in the scattering state, light which enters the area is scattered in all directions. Therefore, part of a scattered light travels in a light traveling direction to the next and later areas. Part of a scattered light which travels to the next and later areas will be referred to as a leakage light. By driving an area which a leakage light enters so as to put the area into the scattering state, the leakage light is utilized as backlight light. As indicated in FIG. 18, the intensity of light which enters an area decreases as the distance between the area and a side increases. If areas are driven under the same conditions, the luminance of the backlight in an area distant in a light traveling direction is low. Therefore, by utilizing a leakage light, the luminance of the backlight is increased in a distant area in which the luminance of the backlight is low.

Ninth Embodiment

A display device according to a ninth embodiment will be described. With a display device according to a ninth embodiment, a light source current supplied to a first light source 241 and a second light source 242 one of which is lit is controlled to uniformize the luminance of a backlight.

FIG. 33 illustrates an example of a drive pattern of a display device according to a ninth embodiment. The same names are given to elements in FIG. 33 which are the same as those in FIG. 21 and descriptions of them will be omitted. Furthermore, a time zone corresponding to an area in which nothing is stated is a period during which the area is in the transmission state. Moreover, a time zone indicated by oblique lines is a period during which a corresponding area is driven so as to be in the scattering state. In addition, a thick dotted line indicates image scanning. These are the same with FIG. 21. With the drive pattern in the ninth embodiment, a backlight scanning period is uniformly distributed to all areas to set drive periods td. Furthermore, on the basis of the intensity of light which enters an area, the first light source 241 or the second light source 242 is selected and a light source current of a selected light source is controlled.

With the drive pattern illustrated in FIG. 33, the second light source 242 is on and the first light source 241 is off, during scattering time of areas CH1 through CH5 near the second light source 242. In addition, the first light source 241 is on and the second light source 242 is off, during scattering time of areas CH6 through CH10 near the first light source 241. This is the same with FIGS. 32A and 32B. Furthermore, with the areas CH1, CH2, CH3, CH4, and CH5 for which the second light source 242 is selected, the intensity of light from the second light source 242 which enters each area decreases according to the distance from a second side in the order of CH1>CH2>CH3>CH4>CH5. An LS2 current of the second light source 242 is increased to the amount of a decrease in the intensity of light from the second light source 242 in the order of i21(CH1)<i22(CH2)<i23(CH3)<i24(CH4)<i25(CH5). i21 is an LS2 current supplied during the drive period of the area CH1. i22 through i25 are also LS2 currents supplied during the drive periods of the areas CH2, CH3, CH4, and CH5 respectively. Similarly, an LS1 current of the first light source 241 is controlled on the basis of the intensity of light from the first light source 241 which enters each area. An LS1 current of the first light source 241 is decreased in the order of i16(CH6)>i17(CH7)>i18(CH8)>i19(CH9)>i110(CH10). i16 is an LS1 current supplied during the drive period of the area CH6. i17 through i110 are also LS1 currents supplied during the drive periods of the areas CH7, CH8, CH9, and CH10 respectively.

As has been described, on the basis of the amount of a decrease in the luminance of incident light corresponding to each of the distance between a target area and the first side and the distance between the target area and the second side, a light source is selected and a light source current is controlled. By doing so, the luminance of the backlight is uniformized. By adopting the drive pattern illustrated in FIG. 33, the luminance distribution of the backlight and the effect indicated in FIGS. 32A and 32B are obtained.

By the way, there are cases where a luminance increase is performed in a display process by a LCD panel 120 to perform display with luminance higher than luminance in normal display. By doing so, any portion of a displayed image is highlighted. A drive pattern for performing a luminance increase will now be described.

Tenth Embodiment

A display device according to a tenth embodiment will be described. With a display device according to a tenth embodiment, one of two light sources is lit at normal time. This is the same with the eighth embodiment. When a luminance increase is performed, the two light sources are lit at the same time during a drive period of a target area to increase the luminance of a backlight.

Figure 34:
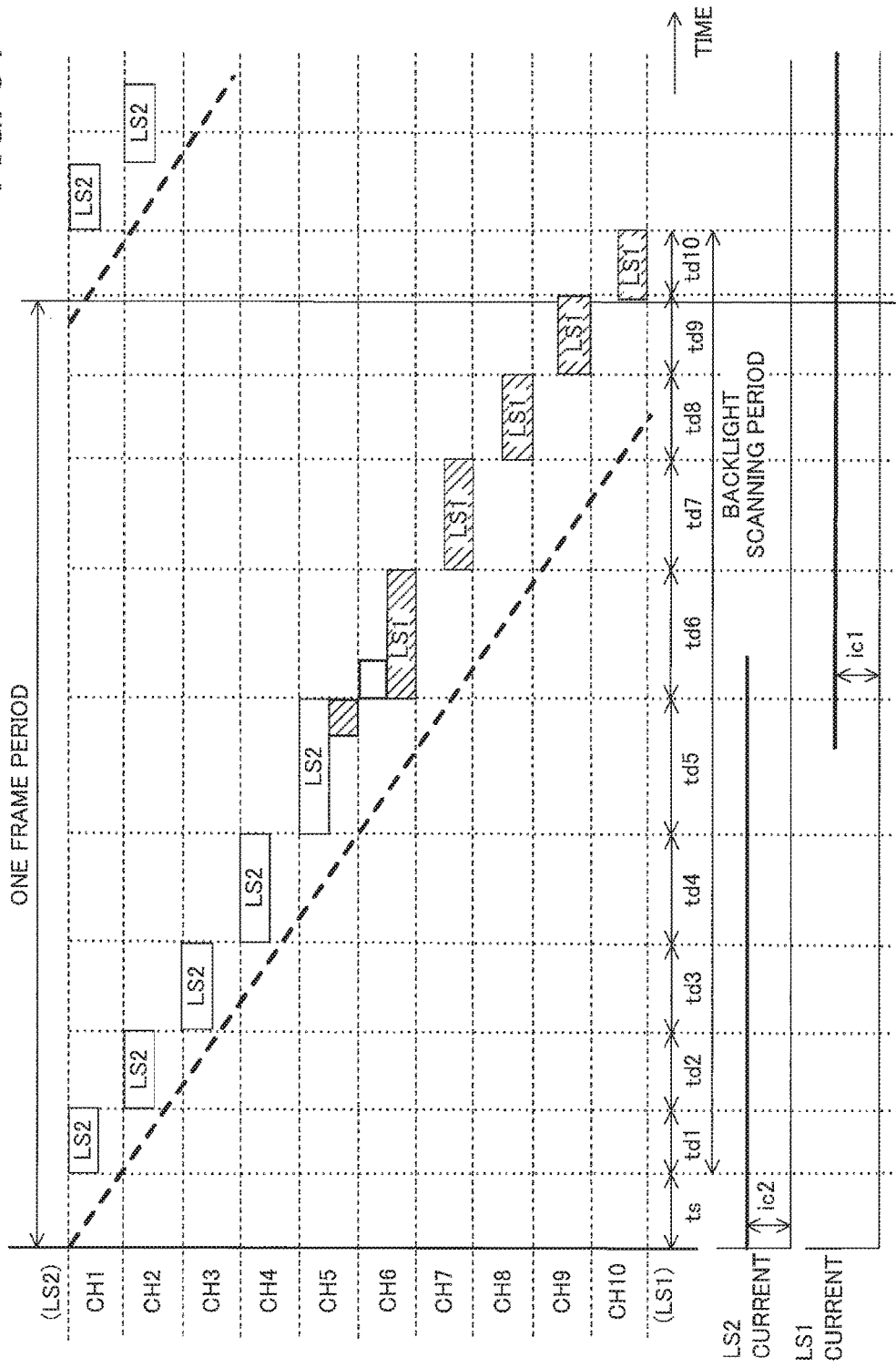
FIG. 34 illustrates an example of a drive pattern of a display device according to a tenth embodiment.

FIG. 34 illustrates an example of a drive pattern of a display device according to a tenth embodiment. The same names are given to elements in FIG. 34 which are the same as those in FIG. 21 and descriptions of them will be omitted. Furthermore, a time zone corresponding to an area in which nothing is stated is a period during which the area is in the transmission state. Moreover, a time zone indicated by oblique lines is a period during which a corresponding area is driven so as to be in the scattering state. In addition, a thick dotted line indicates image scanning. These are the same with FIG. 21.

With the drive pattern illustrated in FIG. 34, a luminance increase is performed on areas CH5 and CH6. Only a second light source 242 is lit for areas CH1, CH2, CH3, and CH4 and a drive period is controlled according to the distance between each area and a second side. This is the same with the eighth embodiment. For the area CH5, a drive period during which the second light source 242 is lit is set on the basis of the distance between the area CH5 and the second side and a drive period during which a first light source 241 is lit is set. In order to scatter light emitted from the second light source 242, the area CH5 is driven during its drive period so as to be in the scattering state. In addition, light emitted from the first light source 241 is scattered. As a result, the luminance is increased. The amount of an increase in the luminance is controlled by time for which the first light source 241 is lit and the value of an LS1 current. Similarly, for the area CH6, a drive period during which the first light source 241 is lit is set on the basis of the distance between the area CH6 and a first side and a drive period during which the second light source 242 is lit is set. The amount of an increase in the luminance is controlled by time for which the second light source 242 is lit and the value of an LS2 current.

Figure 35A:
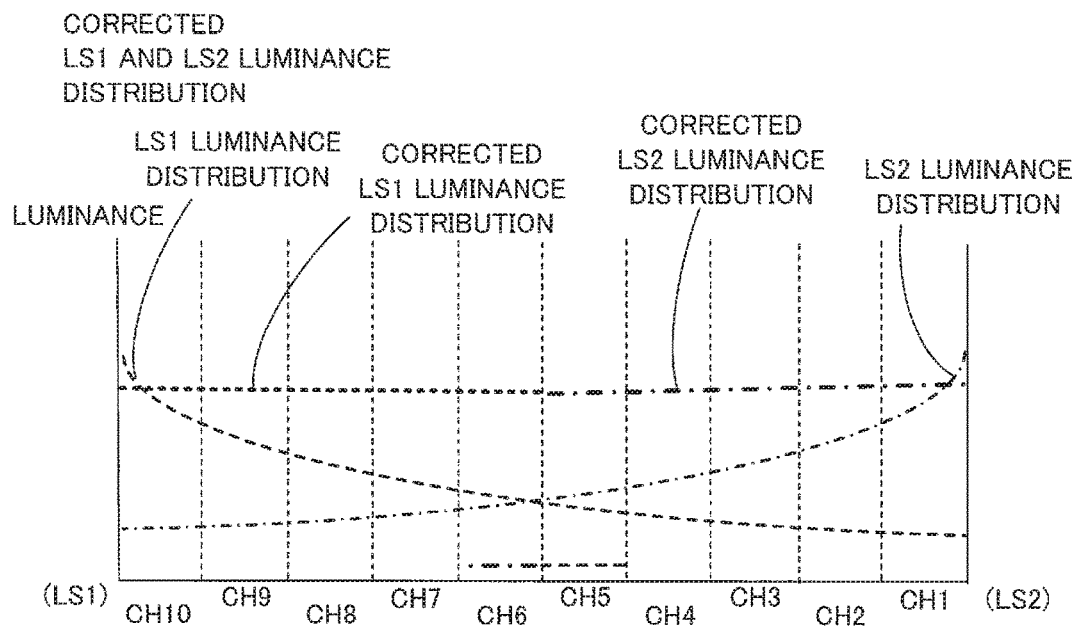
FIGS. 35A and 35B illustrate the luminance distribution of a backlight in the display device according to the tenth embodiment.
Figure 35B:
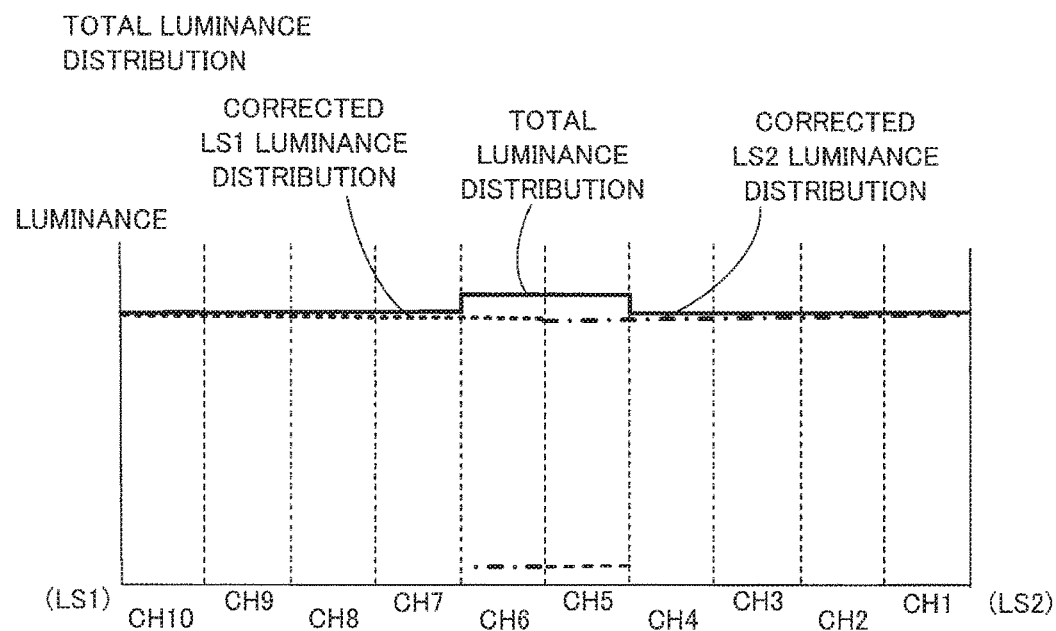

FIGS. 35A and 35B illustrate the luminance distribution of the backlight in the display device according to the tenth embodiment.

Corrected LS1 luminance distribution and corrected LS2 luminance distribution in FIG. 35A describe the luminance distribution of the first light source (LS1) after a correction and the luminance distribution of the second light source (LS2) after a correction, respectively, at the time of performing backlight scanning on the basis of the drive pattern in the tenth embodiment.

The corrected LS1 luminance distribution indicates the intensity distribution of light from the first light source 241 emitted from an emission surface 139 as backlight light at the time of driving each area on the basis of the drive pattern in the tenth embodiment so as to put each area into the scattering state. The corrected LS2 luminance distribution indicates the intensity distribution of light from the second light source 242 emitted from the emission surface 139 as backlight light at the time of driving each area on the basis of the drive pattern in the tenth embodiment so as to put each area into the scattering state. The corrected LS1 luminance distribution is the same as the corrected LS1 luminance distribution in FIG. 32A based on the drive pattern in the eighth embodiment for the areas CH6 through CH10. An increase in the luminance is caused in the area CH5. The corrected LS2 luminance distribution is the same as the corrected LS2 luminance distribution in FIG. 32A based on the drive pattern in the eighth embodiment for the areas CH1 through CH5. An increase in the luminance is caused in the area CH6.

Total luminance distribution in FIG. 35B indicates the luminance distribution of the backlight in each area after a correction made on the basis of the drive pattern in the tenth embodiment. By totalizing the corrected LS1 luminance distribution after the correction and the corrected LS2 luminance distribution after the correction, the total luminance distribution uniform in all the areas except the areas on which a luminance increase is performed is obtained. Luminance based on light emitted from another lit light source is added to total luminance in the areas on which a luminance increase is performed to increase the luminance of the backlight.

With the drive pattern in the tenth embodiment, not only the same effect that is obtained by the drive pattern in the eighth embodiment but also an increase in luminance in any area is realized. An area on which a luminance increase is performed and the amount of an increase in luminance are calculated by image analysis or the like.

Eleventh Embodiment

A display device according to an eleventh embodiment will be described. With a display device according to an eleventh embodiment, one of two light sources is lit at normal time. This is the same with the ninth embodiment. When a luminance increase is performed, the two light sources are lit at the same time during a drive period of a target area to increase the luminance of a backlight.

Figure 36:
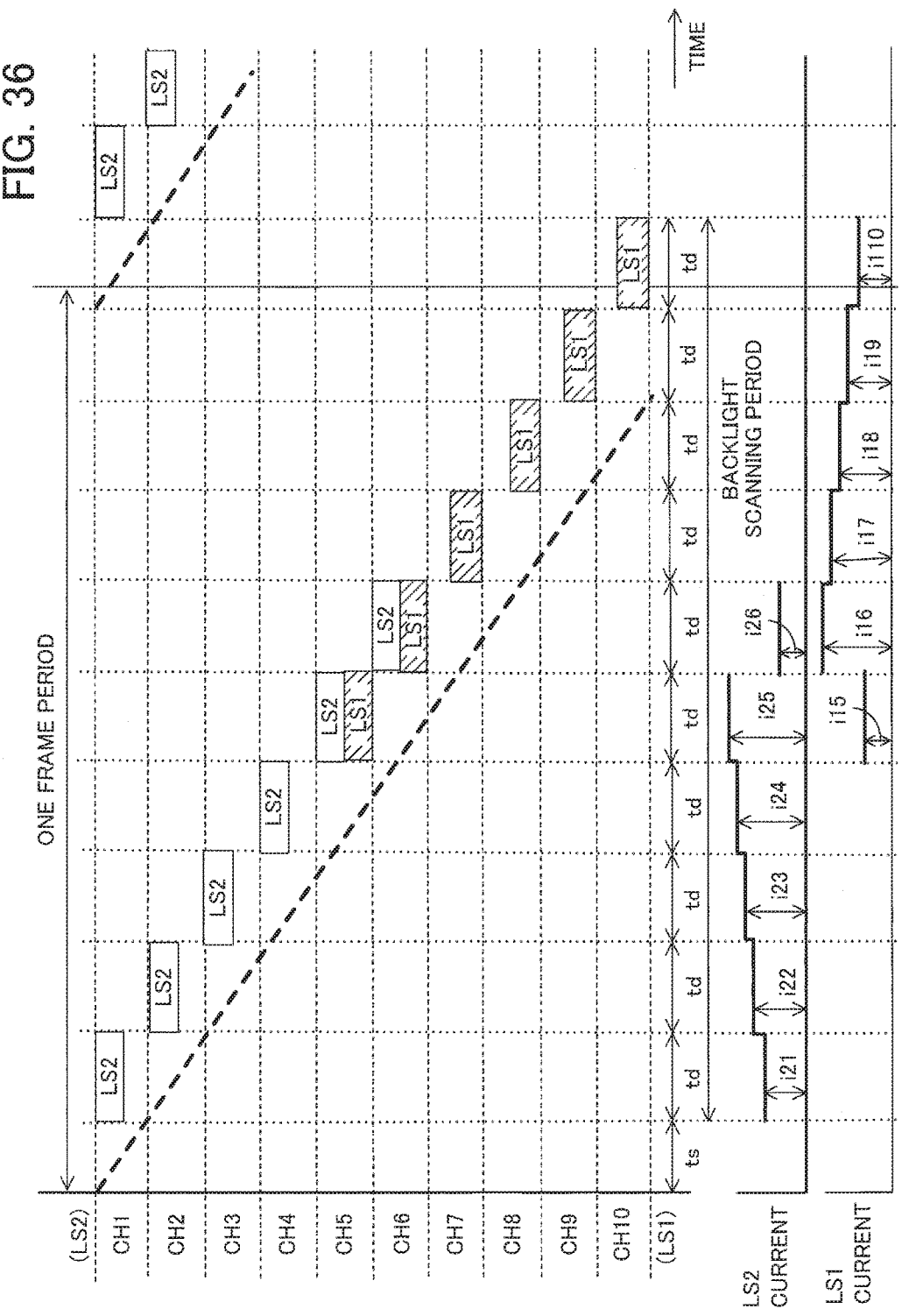
FIG. 36 illustrates an example of a drive pattern of a display device according to an eleventh embodiment.

FIG. 36 illustrates an example of a drive pattern of a display device according to an eleventh embodiment. The same names are given to elements in FIG. 36 which are the same as those in FIG. 21 and descriptions of them will be omitted. Furthermore, a time zone corresponding to an area in which nothing is stated is a period during which the area is in the transmission state. Moreover, a time zone indicated by oblique lines is a period during which a corresponding area is driven so as to be in the scattering state. In addition, a thick dotted line indicates image scanning. These are the same with FIG. 21. In the example of FIG. 36, a luminance increase is performed on areas CH5 and CH6.

With the drive pattern illustrated in FIG. 36, a drive period is uniformly assigned to each area, as with the ninth embodiment, except the areas on which a luminance increase is performed. A light source current is controlled to uniformize luminance. As with the ninth embodiment, only a second light source 242 is lit for areas CH1, CH2, CH3, and CH4 and an LS2 current is controlled on the basis of the distance between each area and the second light source 242. For the area CH5, an LS2 current of the second light source 242 is set on the basis of the distance between the area CH5 and the second light source 242 and a first light source 241 is lit by supplying a determined LS1 current. Not only light emitted from the second light source 242 but also light emitted from the first light source 241 is scattered during the drive period of the area CH5 to increase luminance. The amount of an increase in the luminance is controlled by the value of an LS1 current of the first light source 241. Similarly, during the drive period of the area CH6, an LS1 current of the first light source 241 is set on the basis of the distance between the area CH6 and the first light source 241 and the second light source 242 is lit by supplying an LS2 current. The amount of an increase in luminance is controlled by the value of an LS2 current of the second light source 242.

The luminance distribution of the backlight obtained at the time of driving each area on the basis of the drive pattern illustrated in FIG. 36 is the same as the luminance distribution of the backlight in FIG. 35 obtained at the time of driving each area on the basis of the drive pattern in the tenth embodiment.

With the drive pattern in the eleventh embodiment, not only the same effect that is obtained by the drive pattern in the ninth embodiment but also an increase in luminance in any area is realized. An area on which a luminance increase is performed and the amount of an increase in luminance are calculated by image analysis or the like.

Twelfth Embodiment

A display device according to a twelfth embodiment will be described. In the fourth through eleventh embodiments, scattering time of plural areas does not overlap. In a twelfth embodiment, however, control is exercised so that scattering time of an area will coincide with scattering time of another area.

Figure 37:
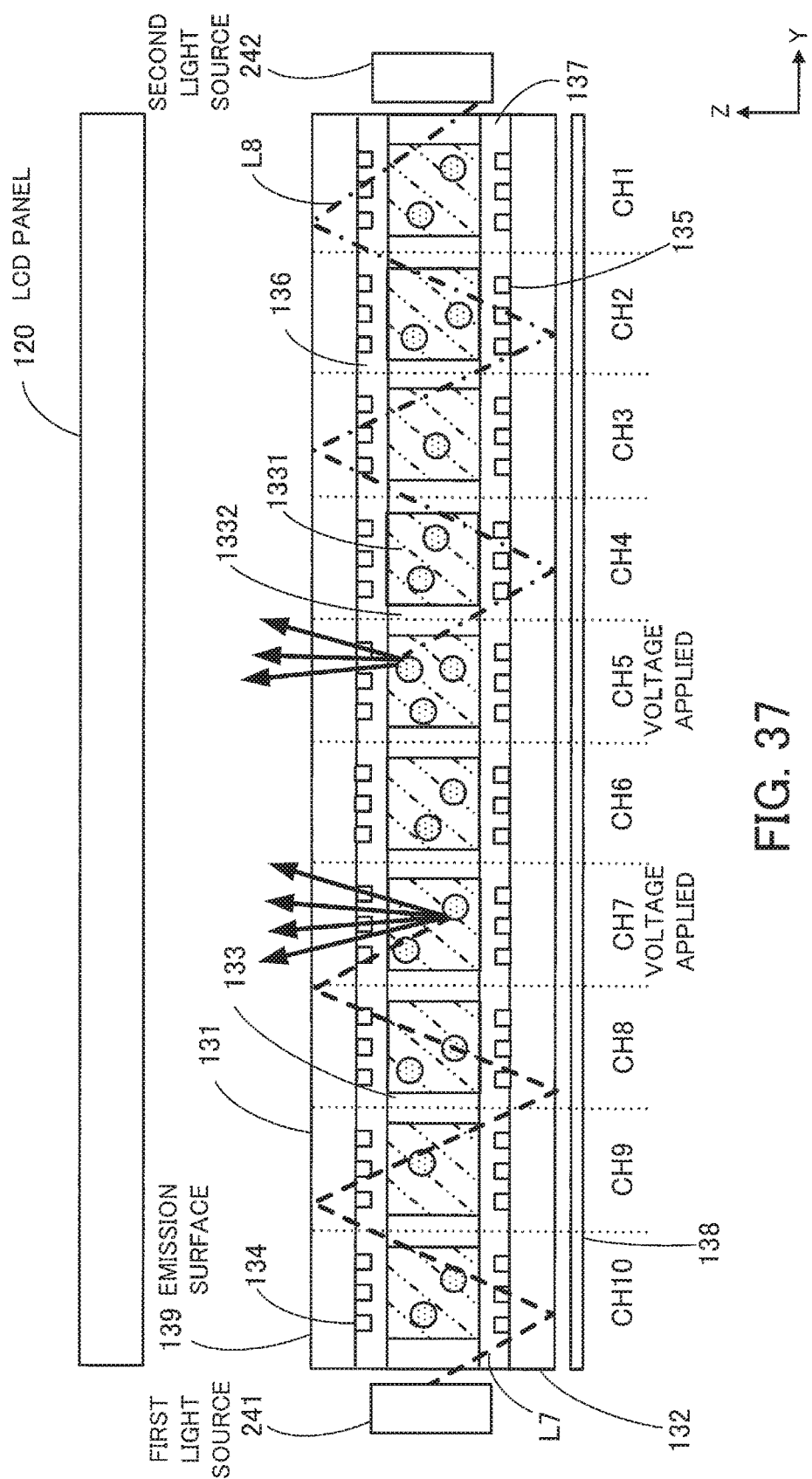
FIG. 37 illustrates partial drive of a backlight in a display device according to a twelfth embodiment.

FIG. 37 illustrates partial drive of a backlight in a display device according to a twelfth embodiment.

In FIG. 37, light L7 from a first light source 241 which enters a PDLC layer 133 is indicated by a thick dotted line and light L8 from a second light source 242 which enters the PDLC layer 133 is indicated by a dot-dash line.

If the light L7 is not scattered in the PDLC layer 133, the light L7 travels in a Y direction from an area CH10 to an area CH1 while being totally reflected by transparent substrates 131 and 132. If the light L8 is not scattered in the PDLC layer 133, the light L8 travels in a direction from the area CH1 to the area CH10 reverse to the Y direction while being totally reflected by the transparent substrates 131 and 132. The light L7 and the light L8 travel straight in a spacer 1332.

A drive voltage is applied to area electrodes in each of the area CH7 and the area CH 5 and the area CH7 and the area CH5 are put into the scattering state. At this time the other areas are put into the transmission state. The light L7 travels in the areas CH10, CH9, and CH8 in the transmission state and enters the area CH7. Because the area CH7 is in the scattering state, the light L7 is scattered. On the other hand, the light L8 travels in the areas CH1, CH2, CH3, and CH4 in the transmission state and enters the area CH5. Because the area CH5 is in the scattering state, the light L8 is scattered. Part of the light L7 scattered in the area CH7 and part of the light L8 scattered in the area CH5 are emitted toward a LCD panel 120. Light which travels to the transparent substrate 132 side is returned into a PDLC 1331 by a reflection sheet 138. At this time it is visually recognized from the LCD panel 120 side that a light guide section 130 is in a state in which the area CH7 and the area CH5 are luminous and in which the other areas are not luminous.

As has been described, light from the two light sources is utilized. This enables two areas to become luminous at the same time. If a first area is considered as reference, then a second area is selected from among areas from an area next to the first area to an area adjacent to the second light source 242 in a direction in which light from the first light source 241 travels. In the example of FIG. 37, if the area CH7 is set as a first area, then a second area is selected from among the areas CH6 through CH1. A drive pattern in which two areas become luminous at the same time will be described.

Figure 38:
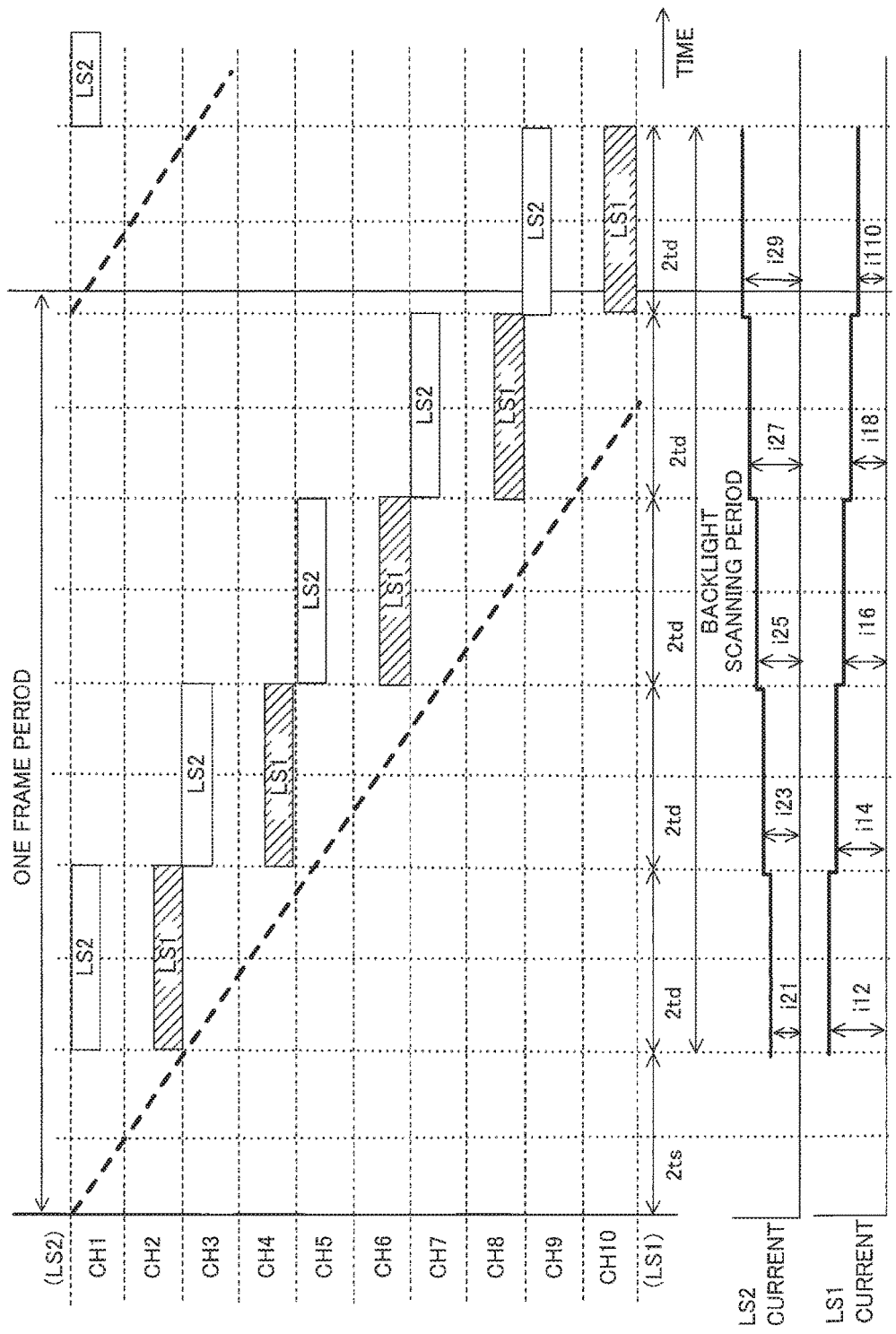
FIG. 38 illustrates an example of a drive pattern of the display device according to the twelfth embodiment.

FIG. 38 illustrates an example of a drive pattern of the display device according to the twelfth embodiment. The same names are given to elements in FIG. 38 which are the same as those in FIG. 21 and descriptions of them will be omitted. Furthermore, a time zone corresponding to an area in which nothing is stated is a period during which the area is in the transmission state. Moreover, a time zone indicated by oblique lines is a period during which a corresponding area is driven so as to be in the scattering state. In addition, a thick dotted line indicates image scanning. These are the same with FIG. 21. With the drive pattern of the display device according to the twelfth embodiment, a first area in which light emitted from the first light source 241 is scattered and a second area in which light emitted from the second light source 242 is scattered are driven at the same time.

With the drive pattern illustrated in FIG. 38, the areas CH1 and CH2 are considered as one set, the areas CH3 and CH4 are considered as one set, the areas CH5 and CH6 are considered as one set, the areas CH7 and CH8 are considered as one set, and the areas CH9 and CH10 are considered as one set. Control is exercised so that two areas will be in the scattering state at the same time. Furthermore, a backlight scanning period is uniformly distributed to these sets to set drive periods for all the areas. In addition, after image scanning on areas included in a set ends, backlight scanning is begun.

In the example of FIG. 38, at the time when image scanning (2ts) on a set of the areas CH1 and CH2 ends, the drive periods (2td) of the areas CH1 and CH2 are begun. 2ts indicates a period during which image scanning on two areas is performed. 2td indicates that a period twice a drive period (td) per area obtained in the case of uniformly distributing the backlight scanning period to all the areas is assigned. Furthermore, an LS1 current of the first light source 241 and an LS2 current of the second light source 242 during a drive period of each set are controlled according to areas included in each set. With a set of the areas CH1 and CH2 light from the second light source 242 adjacent to the area CH1 enters the area CH1. Accordingly, an LS2 current i21 is small compared with an area included in another set. On the other hand, light from the first light source 241 distant from the area CH2 enters the area CH2. Accordingly, an LS1 current i12 is large compared with an area included in another set.

A set of the areas CH3 and CH4 is selected next to the set of the areas CH1 and CH2. A drive period assigned to the set of the areas CH3 and CH4 is equal to that assigned to the set of the areas CH1 and CH2. Furthermore, because the area CH3 is more distant from the second light source 242 than the area CH1, an LS2 current i23 is larger than the LS2 current i21. Because the area CH4 is nearer to the first light source 241 than the area CH2, an LS1 current i14 is smaller than the LS1 current i12. In this way, each set is selected in order and an LS1 current and an LS2 current during a drive period are controlled.

Figure 39:
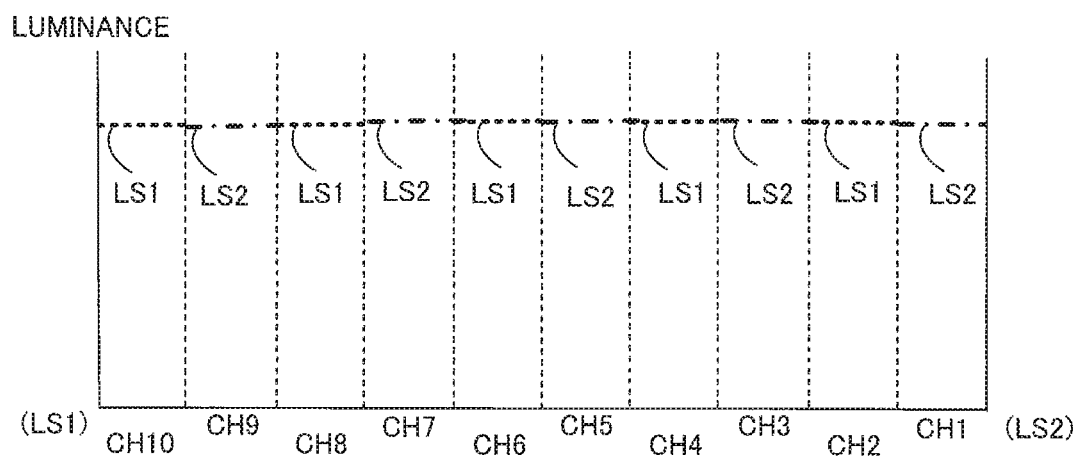
FIG. 39 illustrates the luminance distribution of a backlight in the display device according to the twelfth embodiment.

FIG. 39 illustrates the luminance distribution of the backlight in the display device according to the twelfth embodiment. FIG. 39 indicates total luminance distribution after a correction. LS1 indicates corrected luminance distribution of the backlight based on light from the first light source 241. LS2 indicates corrected luminance distribution of the backlight based on light from the second light source 242.

The total luminance distribution is obtained by totalizing the corrected LS2 luminance distribution for the areas CH1, CH3, CH5, CH7, and CH9 and the corrected LS1 luminance distribution for the areas CH2, CH4, CH6, CH8, and CH10.

As has been described, with the drive pattern in the twelfth embodiment two areas become luminous at the same time. As illustrated in FIG. 38, a drive period per area is doubled by causing two areas to become luminous at the same time. This increases the luminance of each area.

The drive patterns have been described. The above drive patterns may be used independently of one another or a combination of two or more of them may be used. For example, the drive pattern in which a drive period assigned to an area is controlled according to the distance between the area and a light source is adopted and control of a light source current supplied to the light source during the drive period of the area may be added.

Thirteenth Embodiment

A display device according to a thirteenth embodiment will be described. In the fourth through twelfth embodiments, a frame memory is not used. In a thirteenth embodiment, however, a display device which includes a frame memory and which performs an image analysis on one screen will be described.

Figure 40:
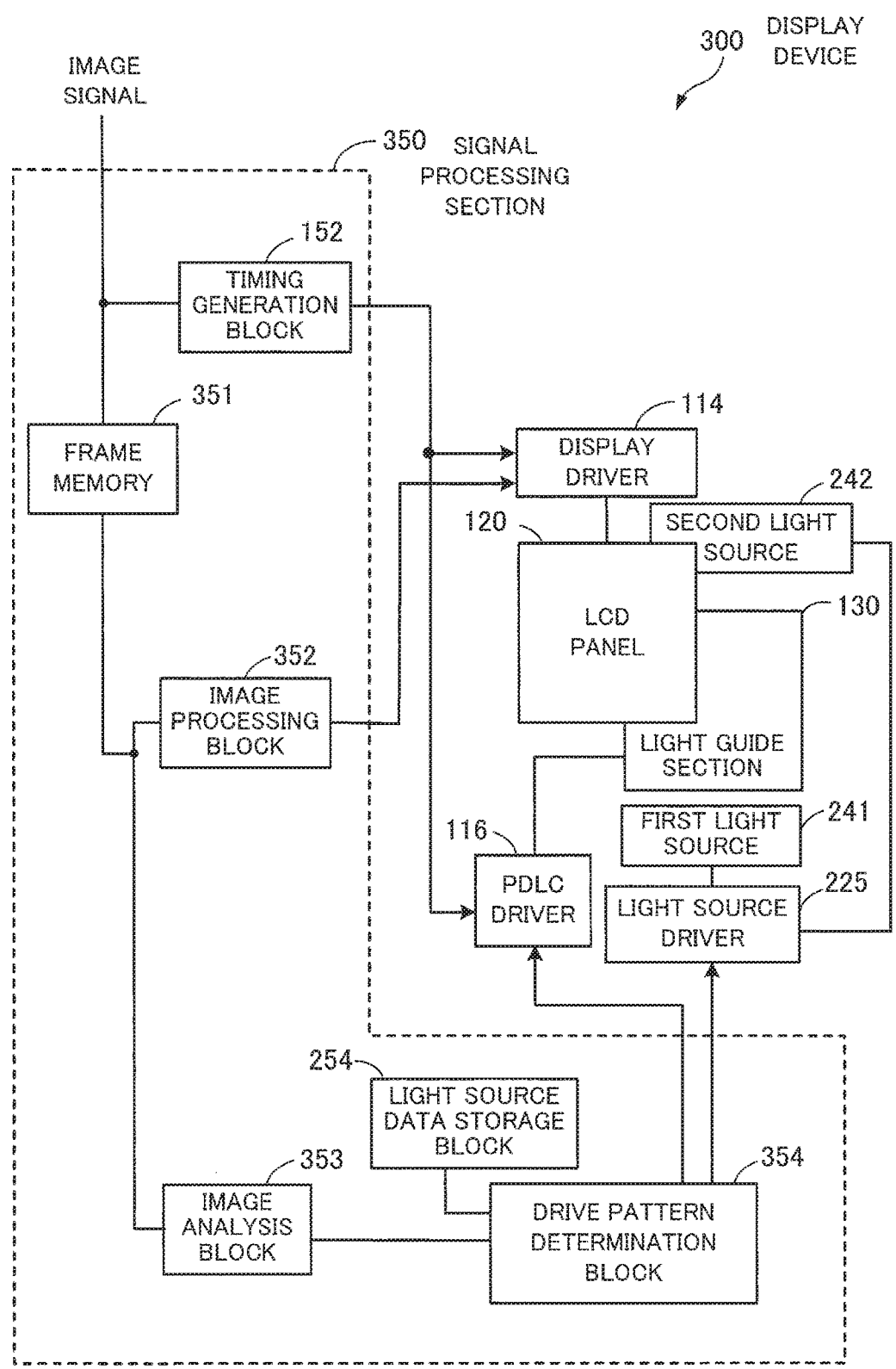
FIG. 40 illustrates an example of the structure of the functions of a display device according to a thirteenth embodiment.

FIG. 40 illustrates an example of the structure of the functions of a display device according to a thirteenth embodiment. Components in FIG. 40 which are the same as those illustrated in FIG. 19 are marked with the same numerals and descriptions of them will be omitted. A display device 300 according to a thirteenth embodiment includes a frame memory 351 in a signal processing section 350. An image analysis block 353 analyzes an image stored in the frame memory 351.

The frame memory 351 stores image signals corresponding to at least one frame inputted to the signal processing section 350. The frame memory 351 is realized as a storage area secured in, for example, a RAM 112.

An image processing block 352 processes image signals stored in the frame memory 351 and outputs them to a display driver 114.

In a vertical blanking period, for example, the image analysis block 353 analyzes image signals corresponding to one frame stored in the frame memory 351 and draws up a luminance profile of a backlight. The luminance profile is information obtained by calculating the luminance of the backlight based on an image for each analysis unit such as area.

A drive pattern determination block 354 determines a drive pattern on the basis of a luminance profile of the backlight corresponding to one frame the image analysis block 353 draws up. The drive pattern determination block 354 properly selects a drive pattern on the basis of a luminance profile. The drive pattern determination block 354 selects a drive pattern which meets a predetermined condition, such as the condition that power efficiency is best, and determines a first light source 241, a second light source 242, drive periods, and the like. A user may set a condition in advance.

Figure 41:
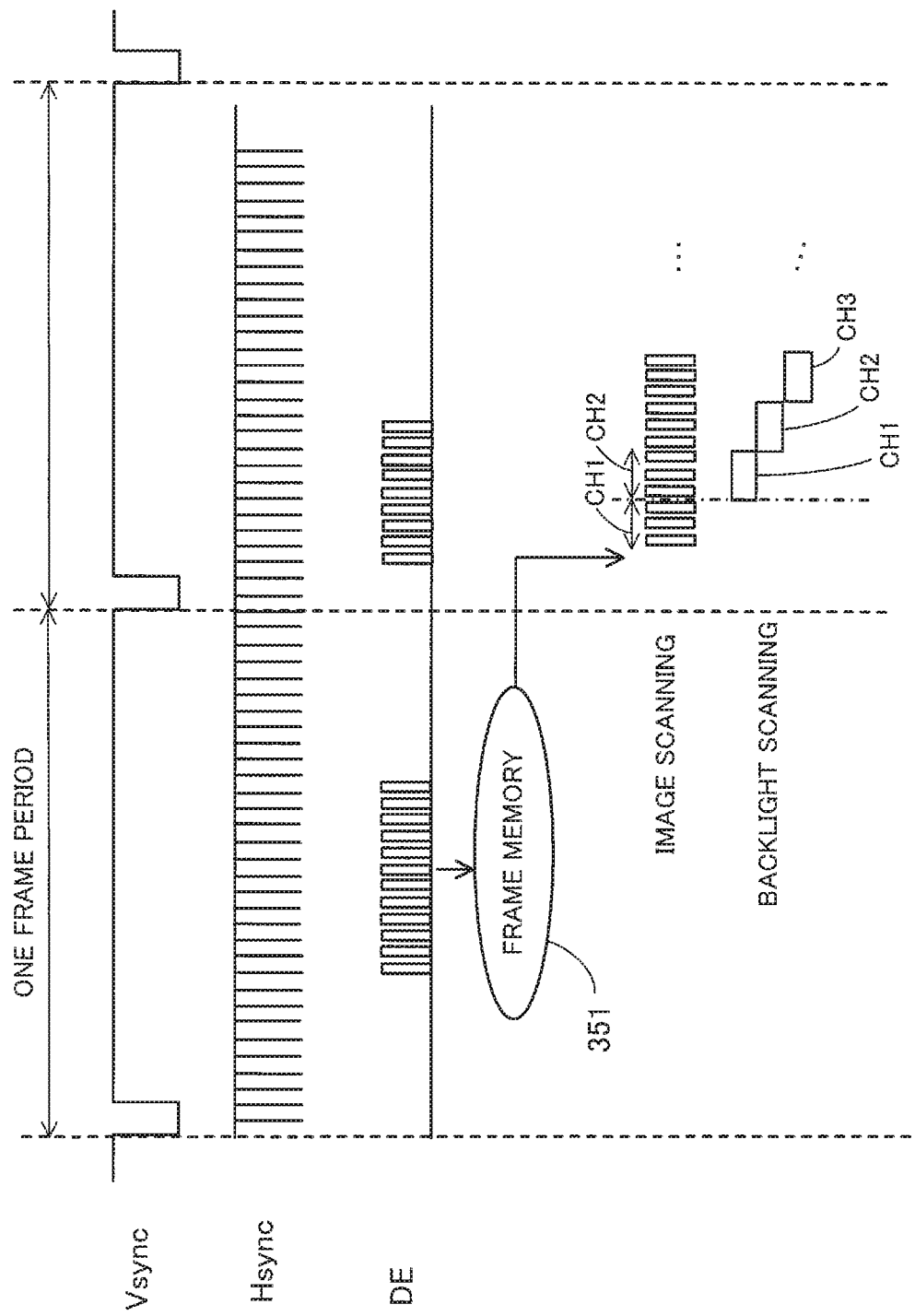
FIG. 41 illustrates drive timing of each functional section of the display device according to the thirteenth embodiment.

FIG. 41 illustrates drive timing of each functional section of the display device according to the thirteenth embodiment. The same names are given to elements in FIG. 41 which are the same as those in FIG. 10 and descriptions of them will be omitted.

With the display device 300 image signals DE inputted to the signal processing section 350 are stored in order in the frame memory 351. At the time when an image scanning period in one frame ends, image signals corresponding to the one frame are stored in the frame memory 351. In a vertical blanking period, for example, the image analysis block 353 analyzes the image signals stored in the frame memory 351 and draws up a luminance profile of the backlight. The drive pattern determination block 354 determines a drive pattern on the basis of the luminance profile and luminance distribution tables stored in a light source data storage block 254. In the next frame period, the image processing block 352 processes the image signals stored in the frame memory 351, generates display signals, and outputs the display signals to the display driver 114. Furthermore, the drive pattern determination block 354 controls a PDLC driver 116 and a light source driver 225 on the basis of the determined drive pattern. The display driver 114, the PDLC driver 116, and the light source driver 225 are driven on the basis of a timing signal generated by a timing generation block 152. The display driver 114 performs image scanning in synchronization with the timing signal. The PDLC driver 116 and the light source driver 225 perform backlight scanning in synchronization with the timing signal. The PDLC driver 116 drives area electrodes to put an area into the scattering state. Light which enters the area is scattered. The light source driver 225 drives the first light source 241 and the second light source 242 to make them emit light. The light enters the area.

Drive control exercised by drawing up a luminance profile will now be described.

Figure 42:
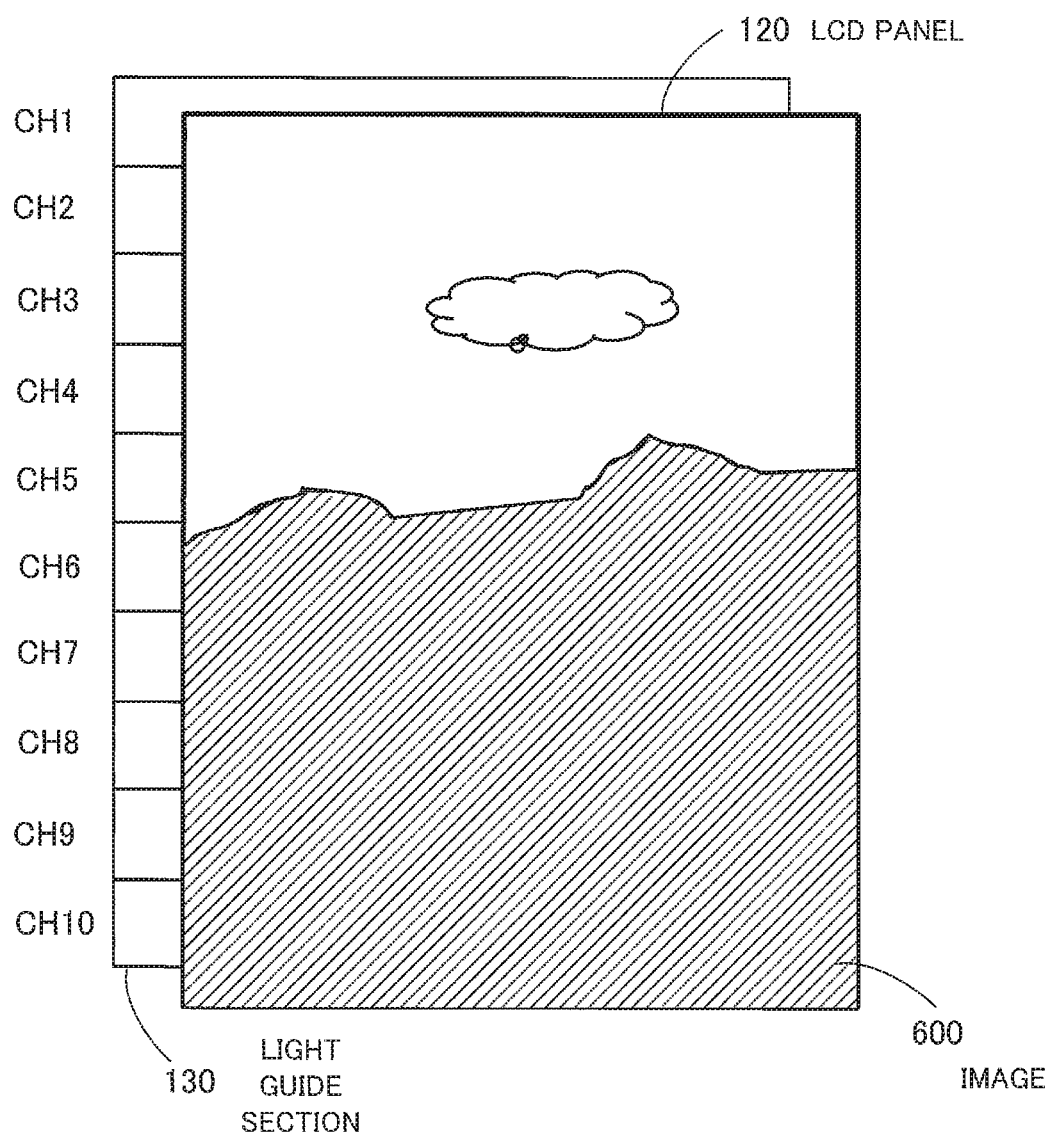
FIG. 42 illustrates an example of a display screen of the display device according to the thirteenth embodiment.

FIG. 42 illustrates an example of a display screen of the display device according to the thirteenth embodiment.

An image 600 is an example of an image displayed on a display screen of a LCD panel 120. A portion of the image 600 indicated by oblique lines is a dark image. CH1, CH2, CH3, CH4, CH5, CH6, CH7, CH8, CH9, and CH10 indicate areas of a light guide section 130.

In the example of FIG. 42, the dark image is displayed on a lower portion of the screen corresponding to the areas CH6, CH7, CH8, CH9, and CH10. On the other hand, a bright image is displayed on an upper portion of the screen corresponding to the areas CH1, CH2, CH3, CH4, and CH5. Therefore, in a luminance profile of the backlight calculated by the image analysis block 353, luminance is high in the areas CH1, CH2, CH3, CH4, and CH5 and luminance is low in the areas CH6, CH7, CH8, CH9, and CH10. On the basis of this luminance profile, the drive pattern determination block 354 selects the drive pattern in the ninth embodiment illustrated in FIG. 33 as a drive pattern in which power efficiency is best. With the drive pattern in the ninth embodiment, one of the two light sources nearer an area is lit and a light source current for driving the light source is controlled according to the distance between the area and the light source.

Figure 43:
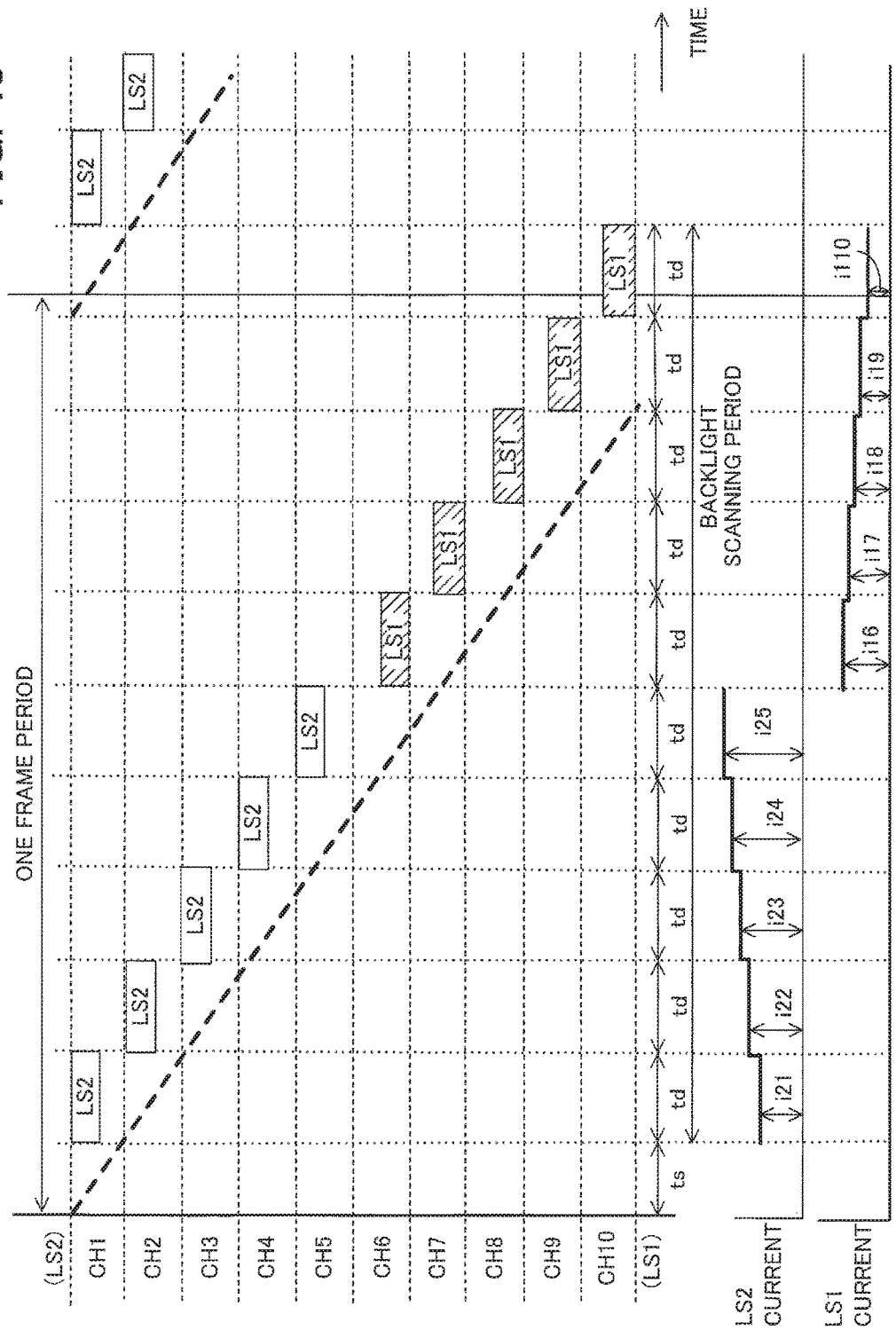
FIG. 43 illustrates an example of a drive pattern of the display device according to the thirteenth embodiment.

FIG. 43 illustrates an example of a drive pattern of the display device according to the thirteenth embodiment. The same names are given to elements in FIG. 43 which are the same as those in FIG. 21 and descriptions of them will be omitted. Furthermore, a time zone corresponding to an area in which nothing is stated is a period during which the area is in the transmission state. Moreover, a time zone indicated by oblique lines is a period during which a corresponding area is driven so as to be in the scattering state. In addition, a thick dotted line indicates image scanning. These are the same with FIG. 21.

With the drive pattern illustrated in FIG. 43, only the second light source 242 is lit for the areas CH1, CH2, CH3, CH4, and CH5 near the second light source 242. On the other hand, only the first light source 241 is lit for the areas CH6, CH7, CH8, CH9, and CH10 near the first light source 241. As described above with reference to the screen of FIG. 42, the image in the upper portion corresponding to the areas CH1, CH2, CH3, CH4, and CH5 is brighter than that in the lower portion corresponding to the areas CH6, CH7, CH8, CH9, and CH10, and therefore the luminance of the areas CH1, CH2, CH3, CH4, and CH5 is higher than that of the areas CH6, CH7, CH8, CH9, and CH10 in the luminance profile. Since the luminance is high in the areas CH1, CH2, CH3, CH4, and CH5 in the luminance profile, an LS2 current of the second light source 242 lit during drive periods assigned to these areas is increased. Furthermore, the distance from the second light source 242 increases in the order of the areas CH1, CH2, CH3, CH4, and CH5. Therefore, control is exercised so that an LS2 current will increase in the order of $i21(CH1)<i22(CH2)<i23(CH3)<i24(CH4)<i25(CH5)$. On the other hand, as described above with reference to the screen of FIG. 42, the image in the lower portion corresponding to the areas CH6, CH7, CH8, CH9, and CH10 is darker than that in the upper portion corresponding to the areas CH1, CH2, CH3, CH4, and CH5, and therefore the luminance of the areas CH6, CH7, CH8, CH9, and CH10 is lower than that of the areas CH1, CH2, CH3, CH4, and CH5 in the luminance profile. Since the luminance is low in the areas CH6, CH7, CH8, CH9, and CH10 in the luminance profile, an LS1 current of the first light source 241 lit during drive periods assigned to these areas is set to a value lower than that of the LS2 current. In addition, the distance from the first light source 241 decreases in the order of the areas CH6, CH7, CH8, CH9, and CH10. Accordingly, control is exercised so that an LS1 current will decrease in the order of $i16(CH6)>i17(CH7)>i18(CH8)>i19(CH9)>i110(CH10)$. In this case, the following method may also be used. An LS1 current and an LS2 current are made constant and luminance is controlled by controlling lighting time for each area. This is the same with the second embodiment and the fifth through seventh embodiments.

Figure 44:
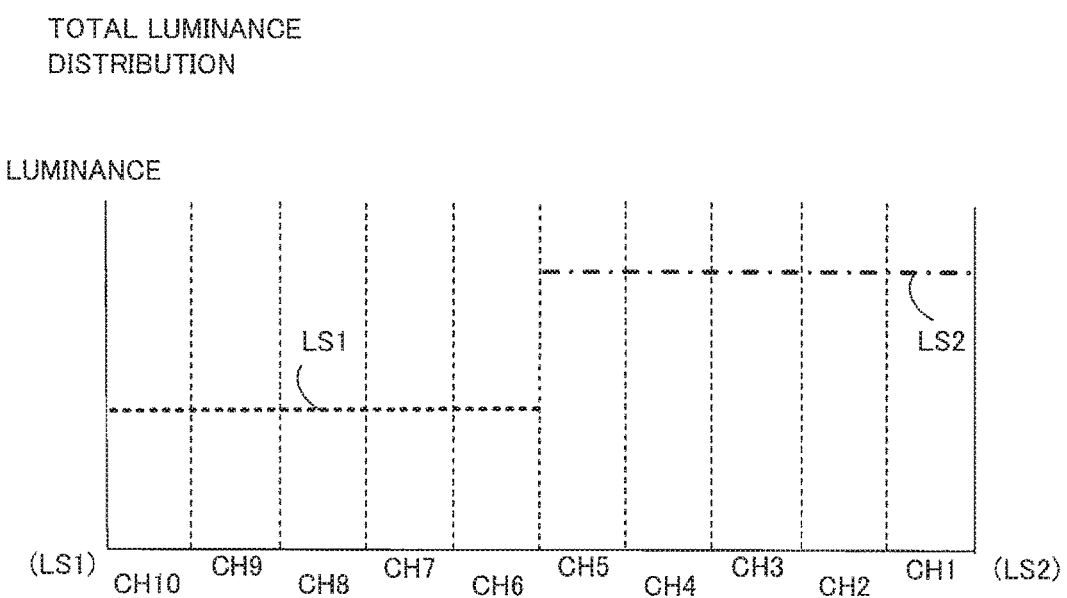
FIG. 44 illustrates the luminance distribution of a backlight in the display device according to the thirteenth embodiment.

FIG. 44 illustrates the luminance distribution of the backlight in the display device according to the thirteenth embodiment. FIG. 44 indicates total luminance distribution after a correction. LS1 indicates corrected luminance distribution of the backlight based on light from the first light source 241. LS2 indicates corrected luminance distribution of the backlight based on light from the second light source 242.

The total luminance distribution is obtained by totalizing the corrected LS2 luminance distribution for the areas CH1, CH2, CH3, CH4, and CH5 and the corrected LS1 luminance distribution for the areas CH6, CH7, CH8, CH9, and CH10. With the drive pattern illustrated in FIG. 43, an LS1 current for driving the first light source 241 is smaller than an LS2 current for driving the second light source 242. In this way, on the basis of a luminance profile, the value of a light source current supplied to a light source is set to a small value if high luminance is not needed. As a result, light utilization efficiency is increased and driving is performed by supplying low power. As has been described, by drawing up a luminance profile before backlight scanning and determining a drive pattern on the basis of the luminance profile, a drive pattern more suitable for an image is generated.

The above processing functions can be realized with a computer. In that case, a program in which the contents of the functions that the display device has are described is provided. By executing this program on the computer, the above processing functions are realized on the computer. This program may be recorded on a computer readable record medium. A computer readable record medium may be a magnetic storage device, an optical disk, a magneto-optical recording medium, a semiconductor memory, or the like. A magnetic storage device may be a hard disk drive (HDD), a flexible disk (FD), a magnetic tape, or the like. An optical disk may be a digital versatile disc (DVD), a DVD-RAM, a compact disc (CD)-ROM, a CD-recordable(R)/rewritable (RW), or the like. A magneto-optical recording medium may be a magneto-optical disk (MO) or the like.

To place the program on the market, portable record media, such as DVDs or CD-ROMs, on which it is recorded are sold. Alternatively, the program is stored in advance in a storage unit of a server computer and is transferred from the server computer to another computer via a network.

When a computer executes this program, it will store the program, which is recorded on a portable record medium or which is transferred from the server computer, in, for example, its storage unit. Then the computer reads the program from its storage unit and performs processes in compliance with the program. The computer may read the program directly from a portable record medium and perform processes in compliance with the program. Furthermore, each time the program is transferred from the server computer connected via a network, the computer may perform processes in order in compliance with the program it receives.

In addition, at least part of the above processing functions may be realized by an electronic circuit such as a digital signal processor (DSP), an ASIC, or a programmable logic device (PLD).

The present disclosure includes the following aspects.

(1) A display device including:
an image display panel which updates an image in a frame cycle including an image scanning period and a vertical blanking period;
a light modulation layer disposed at a back of the image display panel and switched to a scattering state in which incident light is scattered or a transmission state in which the incident light is transmitted according to an electric field applied;
a light source which emits light that enters the light modulation layer from a side thereof and travels in the light modulation layer;
electrodes which are formed according to divided areas of the light modulation layer arranged in a direction in which the light from the light source travels and which apply the electric field to the light modulation layer; and
a controller which drives the electrodes in synchronization with image scanning and switches in order the divided areas to be put into the scattering state, during a first period corresponding to the image scanning period, and which drives the electrodes according to distances from the side to control the scattering state according to the divided areas, during a second period corresponding to the vertical blanking period.

(2) The display device according to (1), wherein the controller puts the divided areas into the scattering state in an order in which the image display panel ends the image scanning.

(3) The display device according to (1), wherein the controller controls scattering time for which the divided areas are put into the scattering state during the second period on the basis of amounts of decreases in luminances of the light from the light source which enters the light modulation layer from the side corresponding to distances to the divided areas.

(4) The display device according to (1), wherein the controller controls scattering time according to deficiencies when luminances of light emitted from the divided areas in the first period do not reach required luminances on the basis of luminance distribution tables in which luminances of light emitted from the divided areas when the divided areas are put into the scattering state under same drive conditions are registered.

(5) The display device according to (1) further including a second light source which emits light that enters the light modulation layer from a second side opposite a first side from which the light from the light source enters the light modulation layer and traveling in the light modulation layer, wherein the controller controls the scattering state in the divided areas on the basis of distances between the divided areas and the first side and distances between the divided areas and the second side.

(6) A display device including:
an image display panel which updates an image in a frame cycle;
a light modulation layer disposed at a back of the image display panel and switched to a scattering state in which incident light is scattered or a transmission state in which the incident light is transmitted according to an electric field applied;
a first light source which emits light that enters the light modulation layer from a first side thereof and travels in a first direction in the light modulation layer;
a second light source which emits light that enters the light modulation layer from a second side opposite the first side and travels in a second direction reverse to the first direction in the light modulation layer;
electrodes which are formed according to divided areas of the light modulation layer arranged in the first and second directions and which apply the electric field to the light modulation layer; and
a controller which selects the divided areas in a determined order, which drives the electrodes corresponding to the divided areas on the basis of distances between the selected divided areas and the first side and distances between the selected divided areas and the second side, and which controls the scattering state according to the divided areas, during a backlight scanning period corresponding to a frame period.

(7) The display device according to (6), wherein the controller puts the divided areas into the scattering state in an order in which the image display panel ends image scanning.

(8) The display device according to (6), wherein the controller:

sets, during the backlight scanning period, assigned drive periods during which control is exercised so as to put the divided areas into scattering state; and controls a drive current for driving at least one of the first light source and the second light source during the assigned drive periods of the divided areas on the basis of first amounts of decreases in luminances of the light from the first light source which enters the light modulation layer from the first side corresponding to distances to the divided areas and second amounts of decreases in luminances of the light from the second light source which enters the light modulation layer from the second side corresponding to distances to the divided areas.

(9) The display device according to (6), wherein the controller controls, during the backlight scanning period, scattering time for which the divided areas are put into the scattering state on the basis of first amounts of decreases in luminances of the light from the first light source which enters the light modulation layer from the first side corresponding to distances to the divided areas and second amounts of decreases in luminances of the light from the second light source which enters the light modulation layer from the second side corresponding to distances to the divided areas.

(10) The display device according to (6), wherein the controller:

sets assigned drive periods by uniformly distributing the backlight scanning period to the divided areas; and assigns an idle time of a first divided area whose scattering time for obtaining a required luminance is shorter than the assigned drive period to a scattering time of a second divided area whose scattering time is longer than the assigned drive period on the basis of first amounts of decreases in luminances of the light from the first light source which enters the light modulation layer from the first side corresponding to distances to the divided areas and second amounts of decreases in luminances of the light from the second light source which enters the light modulation layer from the second side corresponding to distances to the divided areas.

(11) The display device according to any of (6) to (10), wherein the controller controls the scattering state according to the divided areas on the basis of first amounts of decreases in luminances of the light from the first light source which enters the light modulation layer from the first side corresponding to distances to the divided areas and second amounts of decreases in luminances of the light from the second light source which enters the light modulation layer from the second side corresponding to distances to the divided areas and on the basis of total luminance obtained by totalizing luminances of the light from the first light source which enters the divided areas and luminances of the light from the second light source which enters the divided areas.

(12) The display device according to (6), wherein on the basis of first amounts of decreases in luminances of the light from the first light source which enters the light modulation layer from the first side corresponding to distances to the divided areas and second amounts of decreases in luminances of the light from the second light source which enters the light modulation layer from the second side corresponding to distances to the divided areas, the controller:

selects one of the first light source and the second light source luminances of incident light from which are higher in the divided areas; and makes the first light source or the second light source selected on and makes the first light source or the second light source not selected off, for periods for which the divided areas are put into the scattering state.

(13) The display device according to (12), wherein the controller controls scattering time for which the divided areas are put into the scattering state on the basis of the first amounts of decreases in luminances or the second amounts of decreases in luminances corresponding to the first light source or the second light source selected.

(14) The display device according to (12), wherein the controller controls, in periods in which the divided areas are put into the scattering state, a drive current for driving the first light source or the second light source selected for scattering time for which the divided areas are put into the scattering state on the basis of the first amounts of decreases in luminances or the second amounts of decreases in luminances corresponding to the first light source or the second light source selected.

(15) The display device according to (12), wherein the controller:

analyzes image signals written to areas of the image display panel corresponding to the divided areas; and makes, when a divided area is a target of a luminance increase on the basis of an analysis result by which an intensity of light emitted from the divided area is higher than intensities of light emitted from surrounding divided areas, the first light source and the second light source on for scattering time for which the divided area is put into the scattering state.

(16) The display device according to (6), wherein the controller:

selects a first divided area and a second divided area disposed between the first divided area and the second side; and exercises control so that a first scattering time for which the light from the first light source entering the first divided area is scattered coincides with a second scattering time for which the light from the second light source entering the second divided area is scattered.

(17) The display device according to (6) further including a frame memory which stores image signals corresponding to at least one frame period inputted in order, wherein the controller:

analyzes image signals corresponding to one frame period stored in the frame memory;

calculates a luminance profile of a backlight; and generates, on the basis of the luminance profile of the backlight, a drive pattern for driving the first light source, the second light source, and the electrodes.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A display device comprising:
   an image display panel which updates an image in a frame cycle including an image scanning period and a vertical blanking period;
   a light modulation layer disposed at a back of the image display panel and switched to a scattering state in which incident light is scattered or a transmission state in which the incident light is transmitted according to an electric field applied;
   a light source which emits light that enters the light modulation layer from a side thereof and travels in the light modulation layer;
   electrodes which are formed according to divided areas of the light modulation layer arranged in a direction in which the light from the light source travels and which apply the electric field to the light modulation layer; and
   a controller which drives the electrodes in synchronization with image scanning and switches in order the divided areas to be put into the scattering state, during a first period corresponding to the image scanning period, and which drives the electrodes according to distances from the side to control the scattering state according to the divided areas, during a second period corresponding to the vertical blanking period.

2. The display device according to claim 1, wherein the controller puts the divided areas into the scattering state in an order in which the image display panel ends the image scanning.

3. The display device according to claim 1, wherein the controller controls scattering time for which the divided areas are put into the scattering state during the second period on the basis of amounts of decreases in luminances of the light from the light source which enters the light modulation layer from the side corresponding to distances to the divided areas.

4. The display device according to claim 1, wherein the controller controls scattering time according to deficiencies when luminances of light emitted from the divided areas in the first period do not reach required luminances on the basis of luminance distribution tables in which luminances of light emitted from the divided areas when the divided areas are put into the scattering state under same drive conditions are registered.

5. The display device according to claim 1 further comprising a second light source which emits light that enters the light modulation layer from a second side opposite a first side from which the light from the light source enters the light modulation layer and traveling in the light modulation layer, wherein the controller controls the scattering state in the divided areas on the basis of distances between the divided areas and the first side and distances between the divided areas and the second side.

* * * * *